US012798509B2

(12) United States Patent
Stroebe et al.

(10) Patent No.: US 12,798,509 B2
(45) Date of Patent: Nov. 17, 2026

(54) COMPONENT FOR VEHICLE INTERIOR

(71) Applicant: Yanfeng International Automotive Technology Co., Ltd., Novi, MI (US)

(72) Inventors: Jennifer A Stroebe, Holland, MI (US); Dale Todd Glynn, Holland, MI (US); Bart W Fox, Zeeland, MI (US)

(73) Assignee: Yanfeng International Automotive Technology Co., Ltd., Novi, MI (US)

( * ) Notice: Subject to any disclaimer, the term of this patent is extended or adjusted under 35 U.S.C. 154(b) by 0 days.

(21) Appl. No.: 19/374,633

(22) Filed: Oct. 30, 2025

(65) Prior Publication Data

US 2026/0054679 A1 Feb. 26, 2026

Related U.S. Application Data

(63) Continuation of application No. PCT/US2024/027320, filed on May 1, 2024.
(Continued)

(51) Int. Cl.
*B60R 21/215* (2011.01)
*B29C 45/14* (2006.01)
(Continued)

(52) U.S. Cl.
CPC ............ *B60R 21/215* (2013.01); *B29C 45/14* (2013.01); *B60R 21/203* (2013.01);
(Continued)

(58) Field of Classification Search
CPC ........ B60R 2021/21537; B60R 21/215; B60R 21/216; B60R 21/2165; B60R 21/205;
(Continued)

(56) References Cited

U.S. PATENT DOCUMENTS 5,316,822 A 5/1994 Nishijima et al.
5,611,565 A 3/1997 Inaba et al.
(Continued)

FOREIGN PATENT DOCUMENTS

DE 10223302 A1 * 12/2003 ......... B60R 21/2165
JP 2020083016 A * 6/2020
(Continued)

OTHER PUBLICATIONS

International Search Report and Written Opinion for International Application No. PCT/US24/27320 dated Oct. 9, 2024, 21 pages.

*Primary Examiner* — Keith J Frisby
(74) *Attorney, Agent, or Firm* — Amin Turocy & Watson, LLP

(57) ABSTRACT

A component for a vehicle interior may comprise a composite structure comprising a structural substrate to provide an opening for deployment of an airbag and a structure for the airbag. A door may be formed to provide the opening in the composite structure during deployment of the airbag. The composite structure may comprise a hinge area for the door and a reinforcement area for the hinge area. The reinforcement area may reinforce the hinge area for the door. The reinforcement area may provide retention so that the door does not separate from the composite structure at deployment of the airbag. The reinforcement area may be provided at an interface of the structural substrate and the structure for the airbag. The structure for the airbag may comprise a feature/molded feature to provide the reinforcement area. A process to form the component is disclosed.

20 Claims, 26 Drawing Sheets

Related U.S. Application Data

(60) Provisional application No. 63/523,905, filed on Jun. 28, 2023, provisional application No. 63/499,585, filed on May 2, 2023.

(51) Int. Cl.

| | |
|---|---|
| ***B60R 21/203*** | (2006.01) |
| ***B60R 21/205*** | (2011.01) |
| ***B60R 21/216*** | (2011.01) |
| ***B60R 21/2165*** | (2011.01) |
| *B29L 31/30* | (2006.01) |

(52) U.S. Cl.
CPC ........ *B60R 21/216* (2013.01); *B60R 21/2165* (2013.01); *B60R 21/21656* (2013.01); *B29L 2031/3038* (2013.01); *B60R 2021/21537* (2013.01)

(58) Field of Classification Search
CPC ............ B60R 21/21656; B60R 21/203; B60R 21/206; B29L 2031/3038; B29C 45/14
USPC ........................... 280/728.3, 731, 732, 728.2
See application file for complete search history.

(56) References Cited

U.S. PATENT DOCUMENTS

| | | | | | |
|---|---|---|---|---|---|
| 5,639,115 | A * | 6/1997 | Kelley | B60R 21/2165 | 280/732 |
| 5,691,017 | A | 11/1997 | Inaba et al. | | |
| 6,210,797 | B1 | 4/2001 | Sato et al. | | |
| 6,630,232 | B1 * | 10/2003 | Muser | B29C 44/321 | 428/297.4 |
| 6,742,803 | B2 | 6/2004 | Ueno et al. | | |
| 7,806,430 | B2 | 10/2010 | Cowelchuk et al. | | |
| 8,336,908 | B1 | 12/2012 | Kalisz et al. | | |
| 8,474,861 | B1 | 7/2013 | Twork | | |
| 9,205,796 | B2 | 12/2015 | Nonoyama et al. | | |
| 11,560,111 | B2 | 1/2023 | Sherman et al. | | |
| 2004/0164531 | A1 | 8/2004 | Riha et al. | | |
| 2008/0203709 | A1 * | 8/2008 | Schlemmer | B60R 21/2165 | 280/728.3 |
| 2012/0104732 | A1 * | 5/2012 | An | B60R 21/215 | 280/728.3 |
| 2013/0001932 | A1 | 1/2013 | Kanno | | |
| 2014/0375029 | A1 * | 12/2014 | Pauthier | B60R 21/215 | 264/259 |
| 2015/0258957 | A1 | 9/2015 | Liu et al. | | |
| 2016/0167612 | A1 * | 6/2016 | Svensson | B29C 45/1418 | 264/259 |
| 2020/0079311 | A1 * | 3/2020 | Lee | B60R 21/215 | |
| 2020/0391421 | A1 | 12/2020 | Stroebe et al. | | |
| 2021/0261082 | A1 * | 8/2021 | Kobayashi | B60R 21/215 | |
| 2022/0332271 | A1 * | 10/2022 | Dai | D03D 1/00 | |
| 2024/0217469 | A1 * | 7/2024 | Skapof | B29C 45/0081 | |

FOREIGN PATENT DOCUMENTS

| | | | | |
|---|---|---|---|---|
| KR | 102335517 B1 | | 12/2021 | |
| WO | WO-03082632 A2 | * | 10/2003 | B60R 21/16 |

* cited by examiner

START

↓

PROVIDE SUBSTRATE (FIBER PANEL)

↓

APPLY RESIN FOR STRUCTURE (HOUSING) WITH REINFORCEMENT SECTION/FEATURE

↓

FORM COMPOSITE STRUCTURE (OF SUBSTRATE AND STRUCTURE) WITH REINFORCEMENT AREA AT HINGE AREA

↓

APPLY COVER TO SUBSTRATE

↓

COMPONENT/PANEL WITH STRUCTURE AND REINFORCEMENT AREA

↓

END

COMPONENT FOR VEHICLE INTERIOR

CROSS-REFERENCE TO RELATED APPLICATIONS

The present application is a continuation of PCT/International Patent Application No. PCT/US24/27320 titled "COMPONENT FOR VEHICLE INTERIOR" filed May 1, 2024, which claims the benefit of U.S. Provisional Application No. 63/499,585 titled "COMPONENT FOR VEHICLE INTERIOR" filed May 2, 2023, and U.S. Provisional Patent Application No. 63/523,905 titled "COMPONENT FOR VEHICLE INTERIOR" filed Jun. 28, 2023.

The present application claims priority to and incorporates by reference in full the following patent applications: (1) PCT/International Patent Application No. PCT/US24/27320 titled "COMPONENT FOR VEHICLE INTERIOR" filed May 1, 2024; and (2) U.S. Provisional Patent Application No. 63/499,585 titled "COMPONENT FOR VEHICLE INTERIOR" filed May 2, 2023; and (3) U.S. Provisional Patent Application No. 63/523,905 titled "COMPONENT FOR VEHICLE INTERIOR" filed Jun. 28, 2023.

FIELD

The present invention relates to a component for a vehicle interior configured to facilitate deployment of an airbag.

The present invention relates to a method of manufacturing a component for a vehicle interior configured to facilitate deployment of an airbag.

BACKGROUND

It is known to provide a component for a vehicle interior configured to facilitate deployment of an airbag and comprising a cover and a substrate.

It would be advantageous to provide an improved component for a vehicle interior comprising an airbag chute configured to be retained to a substrate during deployment of an airbag.

SUMMARY

The present invention relates to a component for a vehicle interior configured to provide an opening for deployment of an airbag into the vehicle interior comprising a composite structure comprising a structural substrate configured to provide the opening for deployment of the airbag and a structure configured for the airbag; a door may be configured to be formed to provide the opening in the composite structure during deployment of the airbag; the composite structure may comprise a hinge area for the door and a reinforcement area for the hinge area; the reinforcement area may be provided at an interface of the structural substrate and the structure configured for the airbag; the reinforcement area may be configured to reinforce the hinge area for the door; the structure configured for the airbag may comprise a feature configured to provide the reinforcement area; the structural substrate may comprise a fiber panel comprising fibers and resin material; the feature may comprise a molded feature; the molded feature may comprise at least one of a tab and/or a flange and/or a web and/or a rib and/or a resin feature; the feature may comprise a tether; the structure configured for the airbag may comprise a resin material; the structural substrate may comprise a resin material; the structure may be molded to the structural substrate; the composite structure may comprise a cover; the cover may comprise an injection-molded cover; the structure for the airbag may comprise a housing; the housing may comprise a wall structure configured to provide an enclosure for the airbag; the housing may comprise an inner flange extending from the wall structure toward the enclosure and an outer flange extending from the wall structure away from the enclosure; the inner flange may be bonded to the structural substrate; the outer flange may be bonded to the structural substrate; the wall structure and the inner flange and the outer flange may be molded on the structural substrate; the structural substrate may be configured to provide a door upon deployment of the airbag to facilitate deployment of the airbag and the hinge area for the door; the reinforcement area may be configured to retain the door to the composite structure; the structure for the airbag may comprise an airbag chute; the tether may comprise material of the structural substrate and/or material of the airbag chute; the structural substrate may comprise an indentation configured to facilitate rupture of the structural substrate to form the door upon deployment of the airbag to facilitate deployment of the airbag; the indentation may comprise a first indentation on an underside of the structural substrate and a second indentation; the cover may be configured to fit in the second indentation; the component may further comprise a cover comprising an outer surface and an inner surface opposite the outer surface coupled to the structural substrate; the cover may be configured to fit in an indentation of the structural substrate; the component may be formed by a process comprising the steps of forming a structural substrate, forming a housing configured to be coupled to the structural substrate, and forming a reinforcement area comprising a reinforcement configured to reinforce a hinge area of the structural substrate during movement of the door during deployment of the airbag; the reinforcement may be configured to secure the door to the structural substrate during deployment of the airbag; material of the structural substrate and material of the airbag chute intermingle during forming of the airbag chute; the step of forming the structural substrate may comprise injection molding the structural substrate; the method may further comprise the step of forming an indentation at the hinge area of the structural substrate configured to facilitate movement of the door during deployment of the airbag; the method may further comprise the step of forming the structural substrate comprising compressing a first portion of a fiber mat in a mold to a first thickness and compressing a second portion of the fiber mat in the mold to a second thickness less than the first thickness adjacent the hinge area of the structural substrate; the method may further comprise the step of molding a cover on the structural substrate by injection molding thermoplastic material; the method may further comprise the step of forming the reinforcement area may comprise forming a reinforcement comprising a tapered wall of the airbag chute extending from the hinge area of the structural substrate along an underside of the structural substrate; the component may comprise at least one of an instrument panel and/or a door panel and/or a trim panel and/or a trim component.

The present invention relates to a component for a vehicle interior configured for deployment of an airbag into the vehicle interior comprising a structural substrate configured to provide a door upon deployment of the airbag to facilitate deployment of the airbag and a hinge area for the door, a housing molded onto the structural substrate, and a reinforcement area comprising a reinforcement configured to reinforce the hinge area during movement of the door during deployment of the airbag; the reinforcement may be configured to secure the at least one door to the structural substrate during deployment of the airbag; the reinforcement area may comprise an area of variable thickness in the composite structure; the composite structure may comprise an injection molded component.

The present invention relates to a component for a vehicle interior configured to provide an opening for deployment of an airbag into the vehicle interior comprising a composite structure comprising a structural substrate configured to provide the opening for deployment of the airbag and a structure configured for the airbag. A door may be configured to be formed to provide the opening in the composite structure during deployment of the airbag. The composite structure may comprise a hinge area for the door and a reinforcement area for the hinge area. The reinforcement area may be configured to reinforce the hinge area for the door. The reinforcement area may be configured to provide retention so that the door does not separate from the composite structure at deployment of the airbag. The reinforcement area may be provided at an interface of the structural substrate and the structure configured for the airbag. The structure configured for the airbag may comprise a feature configured to provide the reinforcement area. The feature may comprise a molded feature. The feature may comprise a projection. The feature may comprise a set of projections. The feature may comprise a set of molded features. The feature may comprise at least one of (a) a tab; (b) a flange; (c) a web. The feature may comprise a rib. The feature may comprise a resin feature. The feature may comprise a tether. The structure configured for the airbag may comprise a housing. The structure configured for the airbag may comprise a molded housing with the feature. The structure configured for the airbag may be molded on the structural substrate. The structure configured for the airbag may comprise a resin material; the structural substrate may comprise a resin material; the structure may be molded to the structural substrate. The structure configured for the airbag may comprise a resin material; the structural substrate may comprise the resin material; the structure may be molded into the structural substrate. The structure configured for the airbag may comprise a resin material; the structural substrate may comprise the resin material; the structure may be bonded with the structural substrate. The structure configured for the airbag may comprise a resin material; the structural substrate may comprise the resin material; the structure may be configured to compress the structural substrate. The structure configured for the airbag may be configured to compress the structural substrate. The structure configured for the airbag may comprise a resin material; the structural substrate may comprise the resin material; the structure may be bonded with the structural substrate to provide the reinforcement area. The structure configured for the airbag may be bonded with the structural substrate to provide the hinge area. The structure configured for the airbag may comprise a molded housing providing an airbag chute configured to contain an airbag configured for deployment. The structure configured for the airbag may comprise a reinforcement feature configured to provide the reinforcement area. The structure configured for the airbag may comprise a reinforcement configured to provide the reinforcement area. The structure configured for the airbag may comprise a feature at the reinforcement area. The structure configured for the airbag may comprise a reinforcement at the reinforcement area. The reinforcement may comprise a molded feature. The structure may be coupled to the structural substrate. The composite structure may comprise a cover. A cover may be provided on the composite structure. The cover may be molded onto the structural substrate. The cover may comprise an injection-molded skin. The structural substrate may comprise a fiber panel. The structural substrate may comprise a panel comprising fibers. The fibers may comprise natural fibers. The panel may comprise a resin material. The panel may comprise a compression-formed panel. The panel may be formed from a fiber mat. The structural substrate may comprise a seam configured to facilitate formation of the opening for deployment of the airbag. The structural substrate may comprise a seam configured to facilitate formation of a door for the opening for deployment of the airbag. The seam may comprise at least one of (a) a groove; (b) a recess; (c) a line; (d) a line with a curved section; (e) a line with a stagger; (f) a tear line. The reinforcement area may comprise a reinforcement configured to reinforce the hinge area during movement of a door at the opening during deployment of the airbag; the reinforcement may be configured to secure the at least one door to the structural substrate during deployment of the airbag. The hinge area may be configured to form a hinge for a door for the opening for deployment of the airbag. The hinge area may comprise a variable thickness in the structural substrate. The hinge area may comprise a variable thickness in the composite structure. The reinforcement area may comprise an area of variable thickness in the structure for the airbag. The reinforcement area may comprise an area of variable thickness in the composite structure. The structural substrate may be configured to provide (1) a door upon deployment of the airbag to facilitate deployment of the airbag and (2) the hinge area for the door. The reinforcement area may be configured to retain the door to the airbag chute. The reinforcement area may comprise a tether; the structure for the airbag may comprise an airbag chute; the tether may comprise material of the structural substrate and/or material of the airbag chute. The reinforcement area may comprise a shoulder of the airbag chute at the hinge area of the structural substrate. The reinforcement area may comprise a tapered wall of the airbag chute extended from the hinge area of the structural substrate along an underside of the structural substrate. The tapered wall of the airbag chute may be formed by molding the airbag chute on the structural substrate. The structure for the airbag may comprise a housing. The reinforcement area may comprise an interface; the interface may be formed from material of the housing and material from the structural substrate. Material of the housing and material of the structural substrate intermingle during formation of the housing on the structural substrate. The reinforcement may comprise an interface; the interface may comprise a composite material; the composite material may comprise material of the housing and material of the structural substrate. The interface may be formed by molding the housing on the structural substrate. The housing may comprise a wall structure configured to provide an enclosure for the airbag. The housing may comprise an inner flange extending from the wall structure toward the enclosure and an outer flange extending from the wall structure away from the enclosure. The inner flange may be bonded to the structural substrate; the outer flange may be bonded to the structural substrate. The component may comprise a cover coupled to the structural substrate; the outer flange may be coupled to the cover. The wall structure and the inner flange and the outer flange may be molded on the structural substrate. The housing may comprise at least one of (a) a set of tabs at the hinge area of the structural substrate; (b) a set of ribs extending from a wall of the housing toward the structural substrate; (c) a set of ribs configured to strengthen an angle of the housing; (d) a set of gussets. The housing may comprise a TPO material. The structural substrate may comprise at least one of (a) a compression-formed component; (b) a generally rigid fiber mat; (c) a panel comprised at least partially of fibers; (d) a fiber panel; (e) a substrate formed by compressing a fiber mat in a mold. The structural substrate may comprise a fiber mat compressed to a first thickness; a portion of the fiber mat may be compressed to a second thickness less than the first thickness adjacent the hinge area. The composite structure may comprise an injection molded component. The component may comprise a cover comprising an outer surface and an inner surface opposite the outer surface coupled to the structural substrate. The cover may comprise an injection molded thermoplastic material. The cover may comprise at least one of (a) a TPE material; (b) a TPV material; (c) a PU material. The cover may be configured to provide a surface of the component visible in the vehicle interior. The cover may be overmolded on the structural substrate. The cover may be configured to cover a top side of the structural substrate and an edge of the structural substrate. The cover may extend along a top side of the structural substrate to an edge of the structural substrate and to an underside of the structural substrate. The cover may be bonded to material of the hinge area. The structural substrate may comprise an indentation configured to facilitate formation of the door during deployment of the airbag. The cover may be configured to fit in the indentation of the structural substrate. The indentation of the structural substrate may be adjacent the hinge area. The structural substrate may comprise an indentation configured to facilitate rupture of the structural substrate to form the door upon deployment of the airbag to facilitate deployment of the airbag. The indentation may comprise a first indentation on an underside of the structural substrate and a second indentation; the cover may be configured to fit in the second indentation. The indentation may be configured to form a tear seam to form the door. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The component may comprise at least one of an instrument panel; a door panel; a trim panel; a trim component.

The present invention relates to a method of producing a component for a vehicle interior comprising a composite structure configured to provide an opening for deployment of an airbag into the vehicle interior comprising the steps of providing a structural substrate, forming a structure for the airbag molded as a housing with at least one reinforcement feature onto the structural substrate to provide a hinge area and a reinforcement area, and providing a cover for the structural substrate. The step of forming the structure for the airbag molded as the housing with at least one reinforcement feature onto the structural substrate to provide the hinge area and the reinforcement area may comprise injection molding of the structure onto the structural substrate. The reinforcement area may be formed by molding of material of the structure into material the structural substrate The reinforcement area may be formed by molding of resin material of the structure into resin material the structural substrate.

The present invention relates to a method of manufacturing a component configured to provide a door upon deployment of an airbag to facilitate deployment of the airbag into a vehicle interior comprising forming a structural substrate, forming a housing onto the structural substrate, and forming a reinforcement area configured to reinforce a hinge area of the structural substrate during movement of the door during deployment of the airbag. The reinforcement area may be configured to secure the door to the structural substrate during deployment of the airbag.

The present invention relates to a method of manufacturing a component configured to provide a door upon deployment of an airbag to facilitate deployment of the airbag into a vehicle interior comprising forming a structural substrate, forming a housing comprising an airbag chute configured to be coupled to the structural substrate, and forming a reinforcement area comprising a reinforcement configured to reinforce a hinge area of the structural substrate during movement of the door during deployment of the airbag. The reinforcement may be configured to secure the door to the structural substrate during deployment of the airbag. The reinforcement area may be configured to retain the door to the airbag chute. The reinforcement may comprise material of the structural substrate and/or material of the airbag chute. The step of forming the reinforcement may comprise forming a shoulder of the airbag chute at the hinge area of the structural substrate. The step of forming the reinforcement may comprise forming a tapered wall of the airbag chute extending from the hinge area of the structural substrate along an underside of the structural substrate. The step of forming the structural substrate may comprise forming an indentation in the structural substrate; the step of forming the reinforcement may comprise forming a protrusion of the airbag chute in the indentation of the structural substrate. The step of forming the airbag chute may comprise forming an indentation at the hinge area of the structural substrate configured to facilitate movement of the door during deployment of the airbag. The step of forming the indentation at the hinge area of the structural substrate may comprise molding the airbag chute on a protrusion of the structural substrate. The step of forming the structural substrate may comprise forming a protrusion in the structural substrate; the step of forming the airbag chute may comprise forming an indentation in the airbag chute; the reinforcement may comprise the protrusion of the structural substrate fit in the indentation of the airbag chute. The step of forming the reinforcement may comprise forming the reinforcement from a composite material; the composite material may comprise material of the airbag chute and material of the structural substrate. Material of the structural substrate and material of the airbag chute intermingle during forming of the airbag chute. The step of forming the airbag chute may comprise molding the airbag chute onto a compression-formed component. The step of forming the structural substrate may comprise compressing a fiber mat in a mold. The step of forming the structural substrate may comprise compressing a first portion of a fiber mat in a mold to a first thickness and compressing a second portion of the fiber mat in the mold to a second thickness less than the first thickness adjacent the hinge area of the structural substrate. The step of forming the structural substrate may comprise injection molding the structural substrate. The method may comprise a step of molding a cover on the structural substrate. The step of molding the cover on the structural substrate may comprise molding the cover in an indentation in the structural substrate. The step of molding the cover on the structural substrate may comprise injection molding thermoplastic material.

The present invention relates to a component for a vehicle interior configured for deployment of an airbag into the vehicle interior comprising a structural substrate configured to provide (1) a door upon deployment of the airbag to facilitate deployment of the airbag and (2) a hinge area for the door, a housing comprising an airbag chute coupled to the structural substrate, and a reinforcement area comprising a reinforcement configured to reinforce the hinge area during movement of the door during deployment of the airbag. The reinforcement may be configured to secure the at least one door to the structural substrate during deployment of the airbag.

The present invention relates to a component for a vehicle interior configured to provide an opening for deployment of an airbag into the vehicle interior comprising a composite structure comprising a structural substrate configured to provide the opening for deployment of the airbag and a structure configured for the airbag. A door may be configured to be formed to provide the opening in the composite structure during deployment of the airbag. The composite structure may comprise a hinge area for the door and a reinforcement area for the hinge area. The reinforcement area may be configured to reinforce the hinge area for the door. The reinforcement area may be configured to provide retention so that the door does not separate from the composite structure at deployment of the airbag. The reinforcement area may be provided at an interface of the structural substrate and the structure configured for the airbag. The structure configured for the airbag may comprise a feature configured to provide the reinforcement area. The feature may comprise a molded feature. The feature may comprise a projection. The feature may comprise a set of projections. The feature may comprise a set of molded features. The feature may comprise a tab. The feature may comprise a flange. The feature may comprise a web. The feature may comprise a rib. The feature may comprise a rounded feature. The feature may comprise a resin feature. The feature may comprise a tether. The structure configured for the airbag may comprise a housing. The structure configured for the airbag may comprise the housing and the feature. The structure configured for the airbag may comprise a molded housing with the feature. The structure configured for the airbag may be molded on the structural substrate. The structure configured for the airbag may be molded into the structural substrate. The structure configured for the airbag may comprise a resin material; the structural substrate may comprise a resin material; the structure may be molded into the structural substrate. The structure configured for the airbag may comprise a resin material; the structural substrate may comprise the resin material; the structure may be molded into the structural substrate. The structure configured for the airbag may comprise a resin material; the structural substrate may comprise the resin material; the structure may be bonded with the structural substrate. The structure configured for the airbag may comprise a resin material; the structural substrate may comprise the resin material; the structure may be pressed into the structural substrate. The structure configured for the airbag may comprise a resin material; the structural substrate may comprise the resin material; the structure may be configured to compress the structural substrate. The structure configured for the airbag may be configured to compress the structural substrate. The structure configured for the airbag may comprise a resin material; the structural substrate may comprise the resin material; the structure may be bonded with the structural substrate to provide the reinforcement area. The structure configured for the airbag may be bonded with the structural substrate to provide the hinge area. The structure configured for the airbag may be bonded onto the structural substrate to provide the reinforcement area. The structure configured for the airbag may comprise a molded housing with overmolding. The structure configured for the airbag may comprise a molded housing providing an airbag chute. The structure configured for the airbag may be configured to contain an airbag configured for deployment. The structure configured for the airbag may comprise a reinforcement feature configured to provide the reinforcement area. The structure configured for the airbag may comprise a reinforcement configured to provide the reinforcement area. The structure configured for the airbag may comprise a feature at the reinforcement area. The structure configured for the airbag may comprise a reinforcement at the reinforcement area. The reinforcement may comprise a molded feature. The structure configured for the airbag may comprise a housing. The structure may comprise an airbag chute. The structure may be coupled to the structural substrate. The composite structure may comprise a cover. A cover may be provided on the composite structure. The cover may be molded onto the structural substrate. The cover may be overmolded onto the structural substrate. The cover may comprise an injection-molded skin. The structural substrate may comprise a void; the void may be filled with material of the cover. The structural substrate may comprise a fiber panel. The structural substrate may comprise a panel comprising fibers. The fibers comprise natural fibers. The panel may comprise a resin material. The panel may comprise a compression-formed panel. The panel may comprise a fiber panel. The panel may be formed from a fiber mat. The structural substrate may comprise a seam configured to facilitate formation of the opening for deployment of the airbag. The structural substrate may comprise a seam configured to facilitate formation of a door for the opening for deployment of the airbag. The seam may comprise a groove. The seam may comprise a recess. The seam may comprise a line. The seam may comprise a line with a curved section. The seam may comprise a line with a stagger. The seam may comprise a tear line. The structure for the airbag may be configured to contain an airbag. The structure for the airbag may comprise a housing configured to contain an airbag. The housing may comprise an airbag chute coupled to the structural substrate. The reinforcement area may comprise a reinforcement configured to reinforce the hinge area during movement of a door at the opening during deployment of the airbag. The hinge area may be configured to form a hinge for a door for the opening for deployment of the airbag. The hinge area may comprise a variable thickness in the structural substrate. The hinge area may comprise a variable thickness in the composite structure. The reinforcement area may comprise an area of variable thickness in the structure for the airbag. The reinforcement area may comprise an area of variable thickness in the composite structure. The reinforcement may be configured to secure the at least one door to the structural substrate during deployment of the airbag. The structural substrate may be configured to provide (1) a door upon deployment of the airbag to facilitate deployment of the airbag and (2) the hinge area for the door. The structure for the airbag may comprise an airbag chute coupled to the structural substrate. The reinforcement area may comprise a reinforcement configured to reinforce the hinge area during movement of the door during deployment of the airbag. The reinforcement may be configured to secure the at least one door to the structural substrate during deployment of the airbag. The reinforcement area may be configured to retain the door to the airbag chute. The reinforcement area may comprise a tether; the structure for the airbag may comprise an airbag chute; the tether may comprise material of the structural substrate and/or material of the airbag chute. The reinforcement may comprise a shoulder of the airbag chute at the hinge area of the structural substrate. The reinforcement area may comprise a tapered wall of the airbag chute extended from the hinge area of the structural substrate along an underside of the structural substrate. The tapered wall of the airbag chute may be formed by molding the airbag chute on the structural substrate. The structure for the airbag may comprise a housing. The reinforcement may comprise an interface; the interface may be formed from material of the housing and material from the structural substrate. The material may comprise a resin. The reinforcement area may comprise a reinforcement comprising a rounded feature molded into the structural substrate. Material of the housing and material of the structural substrate intermingle during formation of the housing on the structural substrate. The housing may comprise an airbag chute. The reinforcement may comprise an interface; the interface may comprise a composite material; the composite material may comprise material of the airbag chute and material of the structural substrate. The interface may be formed by molding the airbag chute on the structural substrate. The airbag chute may comprise a wall structure configured to provide an enclosure for the airbag. The airbag chute may comprise an inner flange extending from the wall structure toward the enclosure and an outer flange extending from the wall structure away from the enclosure. The inner flange may be bonded to the structural substrate; The outer flange may be bonded to the structural substrate. The component may comprise a cover coupled to the structural substrate; the outer flange may be coupled to the cover. The wall structure and the inner flange and the outer flange are molded on the structural substrate. The airbag chute may comprise a set of tabs at the hinge area of the structural substrate. The set of tabs may comprise a first tab separated from a second tab by material of the airbag chute. The set of tabs may comprise a first tab separated from a second tab by material of the structural substrate. The set of tabs may be configured to facilitate flexure of the door. The set of tabs may comprise a set of ribs extending from a wall of the airbag chute toward the structural substrate. The set of tabs may comprise a set of ribs configured to strengthen an angle of the airbag chute. The set of tabs may comprise a set of gussets. The air bag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness less than the first thickness adjacent the hinge area. The fiber mat may be compressed to a thickness of between 1.0 mm and 1.7 mm. The fiber mat may be compressed to a thickness of between 1.7 mm and 1.8 mm. The structural substrate may comprise an injection molded component. The component may comprise a cover comprising an outer surface and an inner surface opposite the outer surface coupled to the structural substrate. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The cover may be molded on the structural substrate. The cover may be configured to cover a top side of the structural substrate and an edge of the structural substrate. The cover may extend along a top side of the structural substrate to an edge of the structural substrate and to an underside of the structural substrate. The cover may be bonded to material of the airbag hinge. The structural substrate may comprise an indentation configured to facilitate movement of the door during deployment of the airbag. The cover may be configured to fit in the indentation of the structural substrate. The indentation of the structural substrate may be adjacent the hinge area. The structural substrate may comprise an indentation configured to facilitate rupture of the structural substrate to form the door upon deployment of the airbag to facilitate deployment of the airbag. The cover may be configured to fit in the indentation of the structural substrate. The indentation may comprise a first indentation on an underside of the structural substrate and a second indentation; the cover may be configured to fit in the second indentation. The indentation may be configured to form a tear seam to form the door. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The reinforcement may comprise a protrusion of the airbag chute configured to fit in an indentation of the structural substrate. The protrusion of the airbag chute may be formed by molding the airbag chute into the indentation of the structural substrate. The airbag chute may comprise an indentation at the hinge area configured to facilitate movement of the door during deployment of the airbag. The indentation of the airbag chute may be formed by molding the airbag chute on a protrusion of the structural substrate. The reinforcement may comprise a protrusion of the structural substrate configured to fit in an indentation of the airbag chute. The component may comprise at least one of an instrument panel; a door panel; a trim panel; a trim component. The component may be formed from a process comprising the steps of (a) providing the structural substrate and (b) forming the composite structure with the structure for the airbag molded onto the structural substrate. The composite structure may be formed from a process comprising the steps of (a) providing the structural substrate and (b) forming the structure for the airbag molded onto the structural substrate. The composite structure may be formed from a process comprising the steps of (a) providing the structural substrate and (b) forming the structure for the airbag molded as a housing onto the structural substrate to provide the hinge area. The composite structure may be formed from a process comprising the steps of (a) providing the structural substrate and (b) forming the structure for the airbag molded as a housing onto the structural substrate to provide the hinge area and the reinforcement area. The composite structure may be formed from a process comprising the steps of (a) providing the structural substrate and (b) forming the structure for the airbag molded as a housing with at least one reinforcement feature onto the structural substrate to provide the hinge area and the reinforcement area. The composite structure may be formed from a process comprising the steps of (a) providing the structural substrate and (b) forming the structure for the airbag molded onto the structural substrate and (c) forming the cover onto the structural substrate.

The present invention relates to a method of producing a component for a vehicle interior comprising a composite structure configured to provide an opening for deployment of an airbag into the vehicle interior comprising the steps of (a) providing a structural substrate, (b) forming a structure for the airbag molded as a housing with at least one reinforcement feature onto the structural substrate to provide a hinge area and a reinforcement area, and (c) providing a cover for the structural substrate. The step of forming the structure for the airbag molded as the housing with at least one reinforcement feature onto the structural substrate to provide the hinge area and the reinforcement area may comprise injection molding of the structure onto the structural substrate. The reinforcement area may be formed by molding of material of the structure into material the structural substrate. The reinforcement area may be formed by molding of resin material of the structure into resin material the structural substrate.

The present invention relates to a component for a vehicle interior configured for deployment of an airbag into the vehicle interior comprising a structural substrate; an airbag chute coupled to the structural substrate; and a door configured to facilitate deployment of the airbag. The airbag chute may be configured to provide a hinge for the door. The airbag chute may be configured to secure the door during deployment of the airbag. The airbag chute may be formed by molding the airbag chute on the structural substrate. The door may comprise material of the structural substrate and material of the airbag chute. The door may comprise a leading edge opposite the hinge, a top edge and a bottom edge. The structural substrate may be configured to provide the leading edge of the door. The structural substrate may be configured to provide the top edge of the door and the bottom edge of the door. The structural substrate may comprise a front side providing a surface and a rear side configured for contact from the airbag to establish an opening for deployment of the airbag. The structural substrate may comprise a recess formed as a depression in the rear side of the structural substrate to establish the opening for deployment of the airbag. The front side of the structural substrate may comprise a substantially continuous surface opposite the recess. The airbag chute may comprise a wall extending from the hinge of the airbag chute along the rear side of the structural substrate. The wall of the airbag chute may be formed by molding the airbag chute on the structural substrate. The door may comprise an interface between the structural substrate and the airbag hinge. The interface may comprise a composite material; the composite material may comprise material of the airbag chute and material of the structural substrate. The interface may be formed by molding the airbag chute on the structural substrate. Material of the airbag chute and material of the structural substrate may intermingle during formation of the airbag chute on the structural substrate. The structural substrate may be coupled to the airbag chute at a butt joint. The structural substrate may comprise a first thickness and a second thickness greater than the first thickness. The second thickness may comprise a thickness along an edge of the structural substrate at an interface with the airbag chute. The airbag chute may comprise a thickness at the interface; the thickness of the airbag chute may be greater than the second thickness of the structural substrate. The second thickness may be configured for bonding of the structural substrate and the airbag chute. The first thickness may be configured for an edge of the door. The structural substrate may comprise a void; the airbag chute may comprise a protrusion configured to fit in the void in the structural substrate. The protrusion of the airbag chute may be configured to adhere the structural substrate to the airbag chute. The airbag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness greater than the first thickness adjacent the airbag chute. The structural substrate may comprise an injection molded component. The component may comprise a cover comprising an outer surface and an inner surface opposite the outer surface coupled to the airbag chute. The inner surface of the cover may be coupled to the structural substrate. The component may comprise a cover molded on the airbag chute. The cover may be molded on the structural substrate. The component may comprise a cover configured to cover the structural substrate and the airbag chute. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The structural substrate may comprise an underside configured for contact from the airbag to facilitate deployment of the airbag. The airbag chute may comprise a wall extending from the hinge configured for contact from the airbag to facilitate deployment of the airbag. At least one of the structural substrate and/or the airbag chute may be configured to support an airbag module comprising the airbag. The airbag chute and the hinge may comprise a unitary structure. The hinge may be formed as a unitary part of the airbag chute. The hinge may comprise at least one rib or protrusion extending from a rear surface of the airbag chute away from the interior of the vehicle. The hinge may comprise at least one rib or protrusion configured to reinforce the hinge. The hinge may comprise at least one rib or protrusion extending in a direction generally perpendicular to the hinge. The airbag chute may comprise a first wall, a second wall opposite the first wall, a first flange extending from the first wall toward the second wall, and a second wall extending from the second wall toward the first wall. The hinge may comprise a flange of the airbag chute extending from a wall of the airbag chute. The component may comprise at least one of an instrument panel; a door panel; a trim panel; a trim component.

The present invention relates to a component for a vehicle interior configured for deployment of an airbag into the vehicle interior comprising (a) a structural substrate configured to provide (1) a door upon deployment of the airbag to facilitate deployment of the airbag and (2) a hinge area for the door; (b) an airbag chute coupled to the structural substrate; and (c) a reinforcement configured to reinforce the hinge area during movement of the door during deployment of the airbag. The reinforcement may be configured to secure the at least one door to the structural substrate during deployment of the airbag. The reinforcement may be configured to retain the door to the airbag chute. The reinforcement may comprise a tether; the tether may comprise material of the structural substrate and/or material of the airbag chute. The reinforcement may comprise a shoulder of the airbag chute at the hinge area of the structural substrate. The reinforcement may comprise a tapered wall of the airbag chute extended from the hinge area of the structural substrate along an underside of the structural substrate. The tapered wall of the airbag chute may be formed by molding the airbag chute on the structural substrate. The reinforcement may comprise a protrusion of the airbag chute configured to fit in an indentation of the structural substrate. The protrusion of the airbag chute may be formed by molding the airbag chute into the indentation of the structural substrate. The airbag chute may comprise an indentation at the hinge area configured to facilitate movement of the door during deployment of the airbag. The indentation of the airbag chute may be formed by molding the airbag chute on a protrusion of the structural substrate. The reinforcement may comprise a protrusion of the structural substrate configured to fit in an indentation of the airbag chute. The reinforcement may comprise an interface; the interface may comprise a composite material; the composite material may comprise material of the airbag chute and material of the structural substrate. The interface may be formed by molding the airbag chute on the structural substrate. Material of the airbag chute and material of the structural substrate may intermingle during formation of the airbag chute on the structural substrate. The reinforcement may comprise a rounded feature molded into the structural substrate. The airbag chute may comprise a set of tabs at the hinge area of the structural substrate. The set of tabs may comprise a first tab separated from a second tab by material of the structural substrate. The set of tabs may be configured to facilitate flexure of the door. The air bag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness less than the first thickness adjacent the hinge area. The fiber mat may be compressed to a thickness of between 1.0 mm and 1.7 mm. The fiber mat may be compressed to a thickness of between 1.7 mm and 1.8 mm. The structural substrate may comprise an injection molded component. The component may comprise a cover comprising an outer surface and an inner surface opposite the outer surface coupled to the structural substrate. The cover may be molded on the structural substrate. The structural substrate may comprise an indentation configured to facilitate movement of the door during deployment of the airbag. The cover may be configured to fit in the indentation of the structural substrate. The indentation of the structural substrate may be adjacent the hinge area. The structural substrate may comprise an indentation configured to facilitate rupture of the structural substrate to form the door upon deployment of the airbag to facilitate deployment of the airbag. The cover may be configured to fit in the indentation of the structural substrate. The indentation may comprise a first indentation on an underside of the structural substrate and a second indentation; the cover may be configured to fit in the second indentation. The indentation may be configured to form a tear seam to form the door. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The component may comprise at least one of an instrument panel; a door panel; a trim panel; a trim component.

The present invention also relates to a method of manufacturing a component configured to provide a door upon deployment of an airbag to facilitate deployment of the airbag into a vehicle interior comprising (a) forming a structural substrate; (b) forming an airbag chute configured to be coupled to the structural substrate; and (c) forming a reinforcement configured to reinforce a hinge area of the structural substrate during movement of the door during deployment of the airbag. The reinforcement may be configured to secure the door to the structural substrate during deployment of the airbag. The reinforcement may be configured to retain the door to the airbag chute. The reinforcement may comprise material of the structural substrate and/or material of the airbag chute. The step of forming the reinforcement may comprise forming a shoulder of the airbag chute at the hinge area of the structural substrate. The step of forming the reinforcement may comprise forming a tapered wall of the airbag chute extending from the hinge area of the structural substrate along an underside of the structural substrate. The step of forming the structural substrate may comprise forming an indentation in the structural substrate; the step of forming the reinforcement may comprise forming a protrusion of the airbag chute in the indentation of the structural substrate. The step of forming the airbag chute may comprise forming an indentation at the hinge area of the structural substrate configured to facilitate movement of the door during deployment of the airbag. The step of forming the indentation at the hinge area of the structural substrate may comprise molding the airbag chute on a protrusion of the structural substrate. The step of forming the structural substrate may comprise forming a protrusion in the structural substrate; the step of forming the airbag chute may comprise forming an indentation in the airbag chute; the reinforcement may comprise the protrusion of the structural substrate fit in the indentation of the airbag chute. The step of forming the reinforcement may comprise forming the reinforcement from a composite material; the composite material may comprise material of the airbag chute and material of the structural substrate. Material of the structural substrate and material of the airbag chute may intermingle during forming of the airbag chute. Forming the reinforcement may comprise forming a rounded feature into the structural substrate. Forming the airbag chute may comprise forming a set of tabs at the hinge area of the structural substrate. The step of forming the structural substrate may comprise compressing a consolidated mat between a first surface of a mold and a second surface of the mold to form the consolidated mat into a compression-formed component having a shape corresponding to a first contour of the first surface and a second contour of the second surface. The step of forming the airbag chute may comprise molding the airbag chute onto the compression-formed component. The step of forming the airbag chute may comprise molding the airbag chute and welding the airbag chute onto the compression-formed component. The step of forming the structural substrate may comprise compressing a fiber mat in a mold. The step of forming the structural substrate may comprise compressing a first portion of a fiber mat in a mold to a first thickness and compressing a second portion of the fiber mat in the mold to a second thickness less than the first thickness adjacent the hinge area of the structural substrate. The step of forming the structural substrate may comprise injection molding the structural substrate. The method may comprise a step of molding a cover on the structural substrate. The step of molding the cover on the structural substrate may comprise molding the cover in an indentation in the structural substrate. The indentation of the structural substrate may be adjacent the hinge area of the structural substrate. The indentation of the structural substrate may be configured to facilitate rupture of the structural substrate to form the door upon deployment of the airbag to facilitate deployment of the airbag. The step of molding the cover on the structural substrate may comprise injection molding thermoplastic material. The thermoplastic material may comprise at least one of (a) a TPE material; (b) a TPV material; (c) a PU material. The structural substrate may comprise an underside configured for contact from the airbag to facilitate deployment of the airbag. The method may comprise a step of assembling an airbag module comprising the airbag to the underside of the structural substrate. The method may comprise a step of forming at least one feature on the underside of the structural substrate from at least one of (a) a resin; (b) a thermoplastic resin; (c) polypropylene; (d) acrylonitrile butadiene styrene; (e) polycarbonate.

FIGURES

DESCRIPTION

Figure 1A:
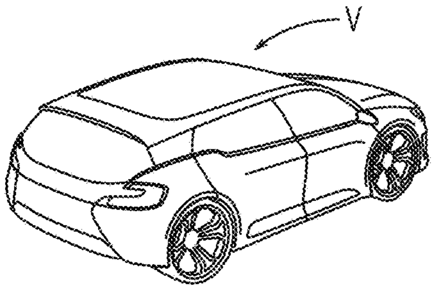
FIG. 1A is a schematic perspective view of a vehicle according to an exemplary embodiment.
Figure 1B:
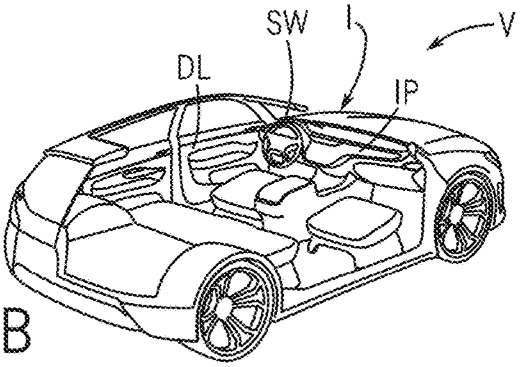
FIG. 1B is a schematic perspective cut-away view of a vehicle showing a vehicle interior according to an exemplary embodiment.
Figure 2:
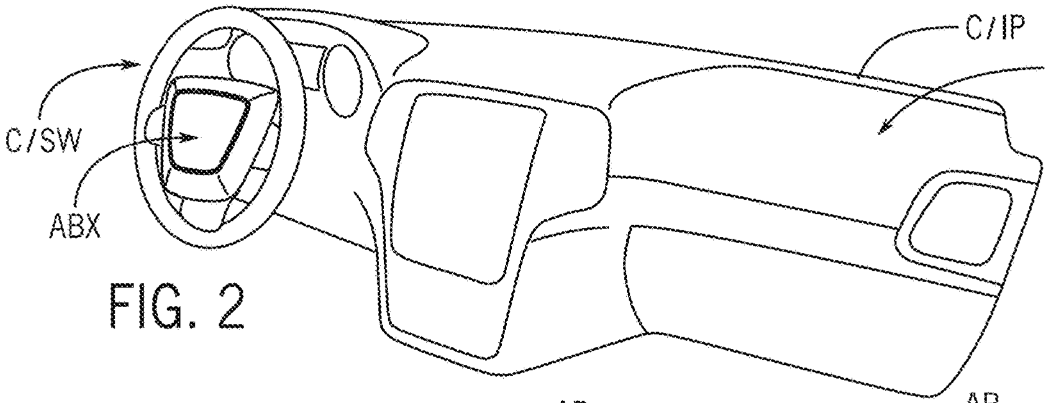
FIG. 2 is a schematic perspective view of a component for a vehicle interior shown as an instrument panel and a component for a vehicle interior shown as a steering wheel according to an exemplary embodiment.
Figure 3A:
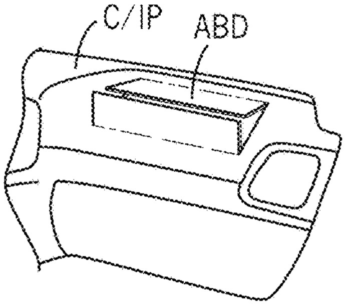
FIGS. 3A through 3C are schematic perspective views of a deployment of an airbag from a vehicle interior component according to an exemplary embodiment.
Figure 3B:
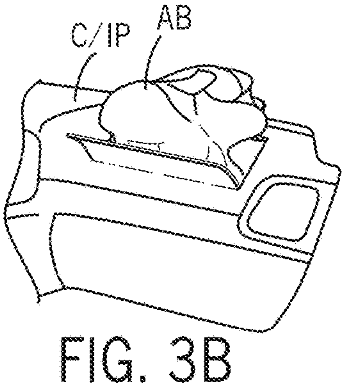
Figure 3C:
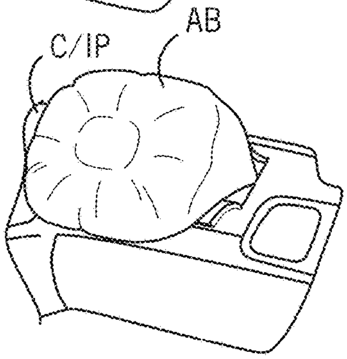
Figure 4A:
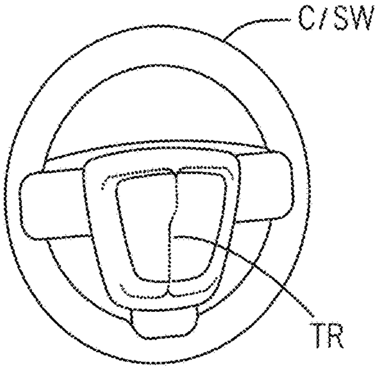
FIGS. 4A through 4C are schematic perspective views of a deployment of an airbag from a vehicle interior component according to an exemplary embodiment.
Figure 4B:
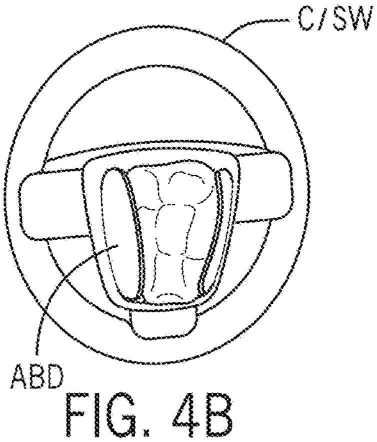
Figure 4C:
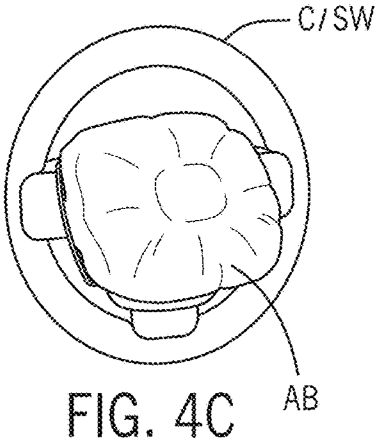
Figure 5A:
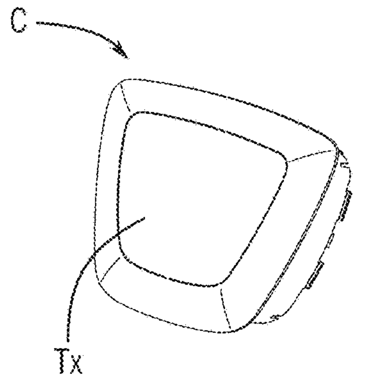
FIG. 5A is a schematic perspective view of a component for a vehicle interior according to an exemplary embodiment.
Figure 5B:
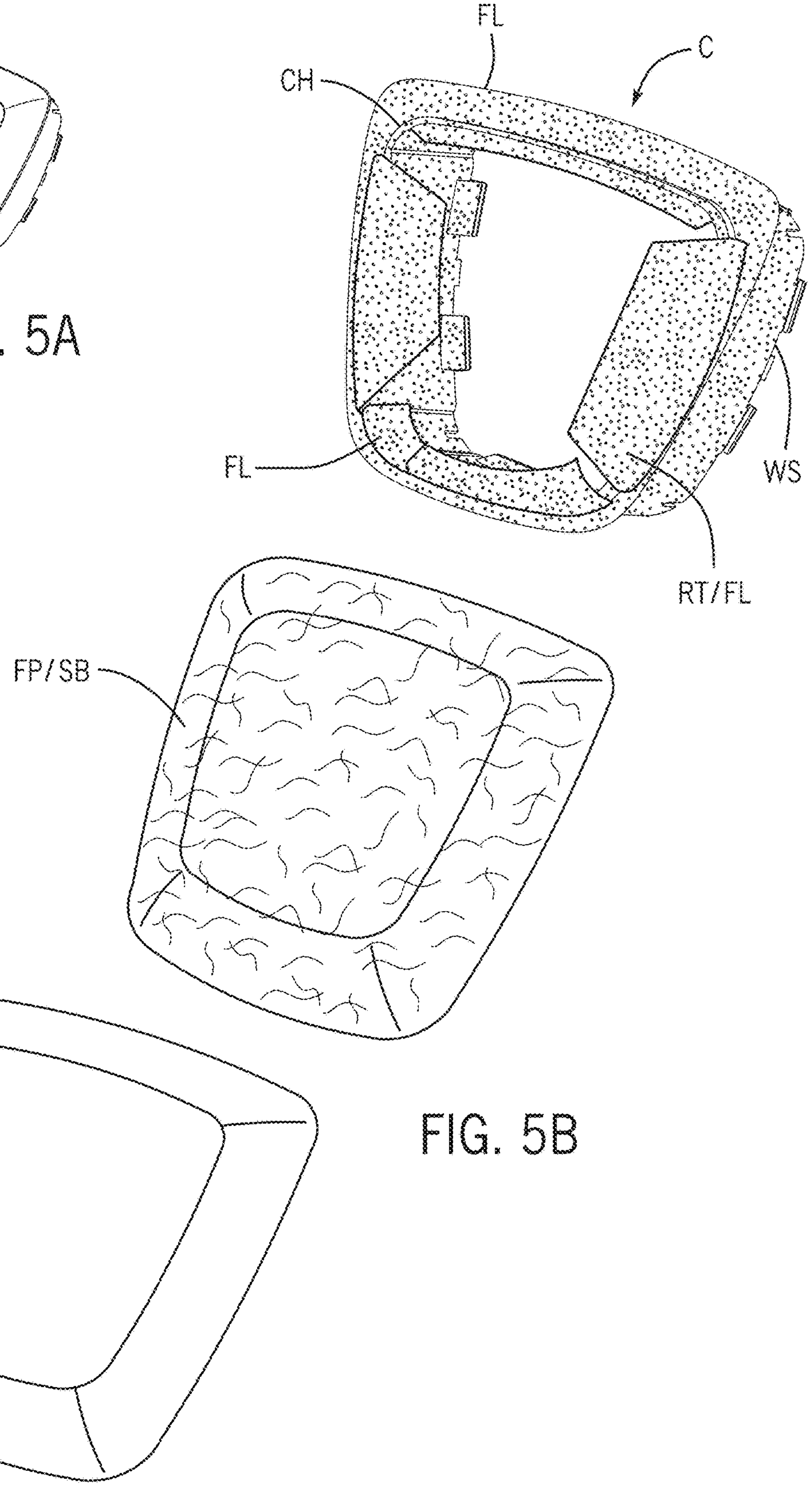
FIG. 5B is a schematic exploded perspective view of a component for a vehicle interior according to an exemplary embodiment.
Figure 6A:
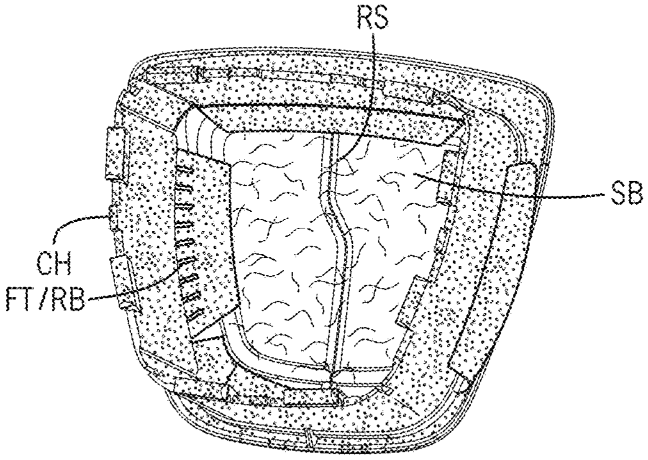
FIG. 6A is a schematic perspective view of a substrate and an airbag chute of a component for a vehicle interior according to an exemplary embodiment.
Figure 6B:
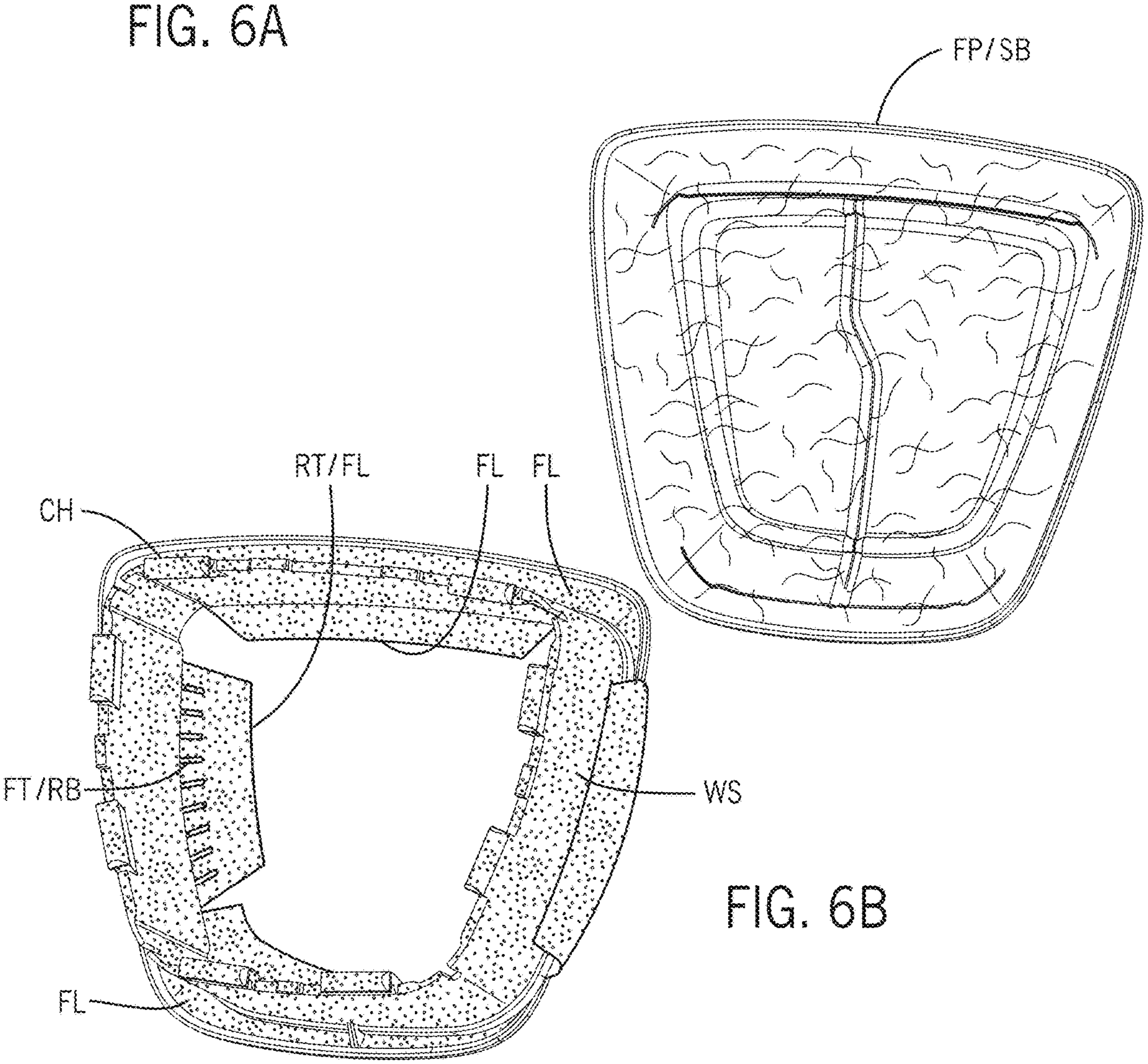
FIG. 6B is a schematic exploded perspective view of a substrate and an airbag chute of a component for a vehicle interior according to an exemplary embodiment.

Referring to FIGS. 1A-1B and 2, a vehicle V is shown including an interior I with components such an instrument panel IP and doors DL and steering wheel SW. See also FIGS. 3A-3C and 4A-4C. According to an exemplary embodiment, interior components of vehicle V such as instrument panel IP and doors DL and steering wheel SW and etc. may include panels such as trim panels. According to an exemplary embodiment, components such as instrument panel IP and doors DL and steering wheel SW (and other components/trim components) may provide visible surfaces in the vehicle interior of vehicle V. According to an exemplary embodiment, instrument panel IP and/or doors DL and steering wheel SW may provide at least one airbag (e.g. configured to deploy from an airbag module) that may be installed behind/within interior components such as instrument panel IP and/or doors DL and/or steering wheel SW. See FIGS. 2, 3A-3C and 4A-4C.

As indicated schematically according to an exemplary embodiment in FIGS. 2, 3A-3C and 4A-4C, a cover/surface of the composite structure of component C such as instrument panel IP or steering wheel SW may be configured to provide an area shown as airbag exit area ABX to provide an opening/door for deployment of the airbag (e.g. from an airbag module); the composite structure of component C may comprise a weakened line/area such as a seam shown as tear line TR to facilitate formation of an opening at airbag exit area ABX; the opening at airbag exit area ABX may be provided through a door shown as airbag door ABD through which an airbag AB may deploy (e.g. where the airbag will break through the cover of the composite structure of the component/panel during airbag deployment as intended). See FIGS. 3A-3C and 4A-4C. As indicated schematically in FIGS. 3A-3C, the composite structure of component C shown as instrument panel IP may provide a cover through which airbag AB may progressively develop an opening at a seam shown as a tear line to provide airbag door ABD and through which airbag AB may deploy into the vehicle interior. As indicated schematically in FIGS. 4A-4C, the composite structure of component C shown as steering wheel SW may provide a cover through which airbag AB may progressively develop an opening at a seam shown as tear line TR to provide airbag door ABD and through which airbag AB may deploy into the vehicle interior. As indicated schematically in FIGS. 3A-3C, 4A-4C, 5A-5B and 6A-6B, tear line TR in structural substrate SB of composite structure CS may comprise a recess RS provided in form/shape such as an I-shape, a U-shape, an H-shape, etc.

According to an exemplary embodiment as shown schematically in FIGS. 2, 3A-3C, 4A-4C, 5A-5B, 6A-6B and 8A-8B, a component C for a vehicle interior configured to provide an opening for deployment of an airbag into the vehicle interior may comprise a composite structure CS comprising a structural substrate SB configured to provide the opening for deployment of the airbag and a structure/housing CH configured for airbag AB; a door ABD may be configured to be formed to provide the opening in composite structure CS during deployment of airbag AB; the composite structure may comprise a hinge area HG for the door and a reinforcement area RR for hinge area HG. See also FIGS. 8A-8B, 9A-9B, 12, 13, 14, 15, 16, 17, 18, 19, 20, 21, 22, 23A-23B, 24A-24B and 27A-27D.

According to an exemplary embodiment as shown schematically in FIGS. 3A-3C, 4A-4C, 8A-8B, 9A-9B, 12, 13, 14, 15, 16, 17, 18, 19, 20, 21, 22, 23A-23B, 24A-24B and 27A-27D, the composite structure with structural substrate SB and structure/housing CH may comprise a reinforcement area RR configured to reinforce hinge area HG for the door for deployment of the airbag through composite structure CS; reinforcement area RR may be configured to provide retention so that the door does not separate from composite structure CS at deployment of the airbag; reinforcement area RR may be provided at an interface NT of structural substrate SB shown as fiber panel FP and the structure/housing shown as airbag chute CH configured for airbag AB.

According to an exemplary embodiment as shown schematically in FIGS. 8A-8B, 9A-9B, 12, 13, 14, 15, 16, 17, 18, 19, 20, 21, 22, 23A-23B, 24A-24B and 27A-27D, structure/housing CH configured for airbag AB may comprise a feature FT configured to provide reinforcement area RR; feature FT may comprise a molded feature; feature FT may comprise a projection; feature FT may comprise a set of projections; feature FT may comprise a set of molded features; feature FT may comprise a tab; feature FT may comprise a flange FL; feature FT may comprise a web; feature FT may comprise a rib RB; feature FT may comprise a rounded feature; feature FT may comprise a resin feature; feature FT may comprise a tether; feature FT may comprise a reinforcement RT.

According to an exemplary embodiment as shown schematically in FIGS. 5A-5B, 6A-6B and 8A-8B, structure/housing CH configured for the airbag may comprise a housing shown as airbag chute CH. Structure/housing CH may comprise the housing and the feature; structure/housing CH may comprise a molded housing with the feature; structure/housing CH may be molded on structural substrate SB; structure/housing CH may be molded into structural substrate SB; structure/housing CH may comprise a resin material; structural substrate SB may comprise a resin material; structure/housing CH may be molded into structural substrate SB; structural substrate SB may comprise the resin material; structure/housing CH may be molded into structural substrate SB; structural substrate SB may comprise the resin material; structure/housing CH may be bonded with structural substrate SB; structural substrate SB may comprise the resin material; structure/housing CH may be pressed into structural substrate SB; structural substrate SB may comprise the resin material; structure/housing CH may be configured to compress structural substrate SB; structure/housing CH may be configured to compress structural substrate SB; structural substrate SB may comprise the resin material; structure/housing CH may be bonded with structural substrate SB to provide reinforcement area RR; structure/housing CH may be bonded with structural substrate SB to provide hinge area HG; structure/housing CH may be bonded onto structural substrate SB to provide reinforcement area RR; structure/housing CH may comprise a molded housing with overmolding; structure/housing CH may comprise a molded housing providing an airbag chute; structure/housing CH may be configured to contain an airbag configured for deployment; structure/housing CH may comprise a reinforcement feature configured to provide reinforcement area RR; structure/housing CH may comprise a reinforcement configured to provide reinforcement area RR; structure/housing CH may comprise a feature at reinforcement area RR; structure/housing CH may comprise a reinforcement at reinforcement area RR. See also FIGS. 8A-8B, 9A-9B, 12, 13, 14, 15, 16, 17, 18, 19, 20, 21, 22, 23A-23B, 24A-24B and 27A-27D. The reinforcement may comprise a molded feature; structure/housing CH may comprise a housing. The structure may comprise an airbag chute. Structure/housing CH may be coupled to structural substrate SB.

Figure 25A:
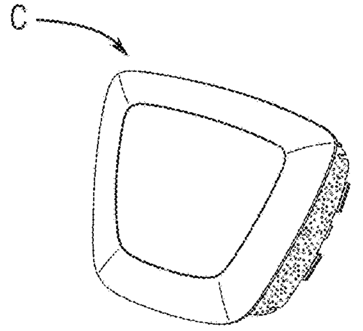
FIG. 25A is a schematic perspective view of a component for a vehicle interior according to an exemplary embodiment.
Figure 25B:
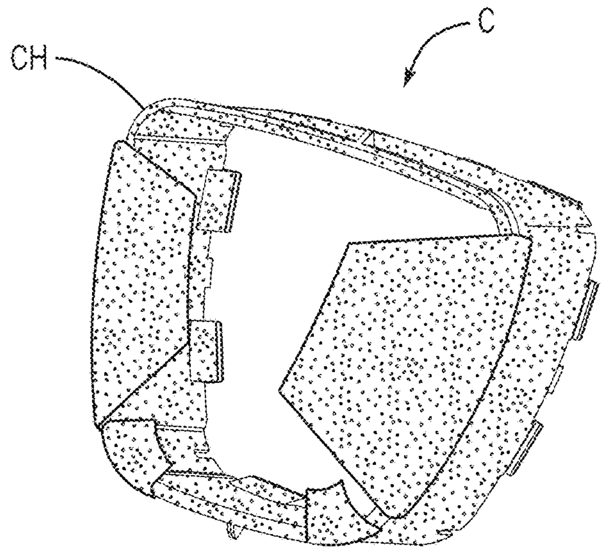
FIG. 25B is a schematic exploded perspective view of a component for a vehicle interior according to an exemplary embodiment.
Figure 25B:
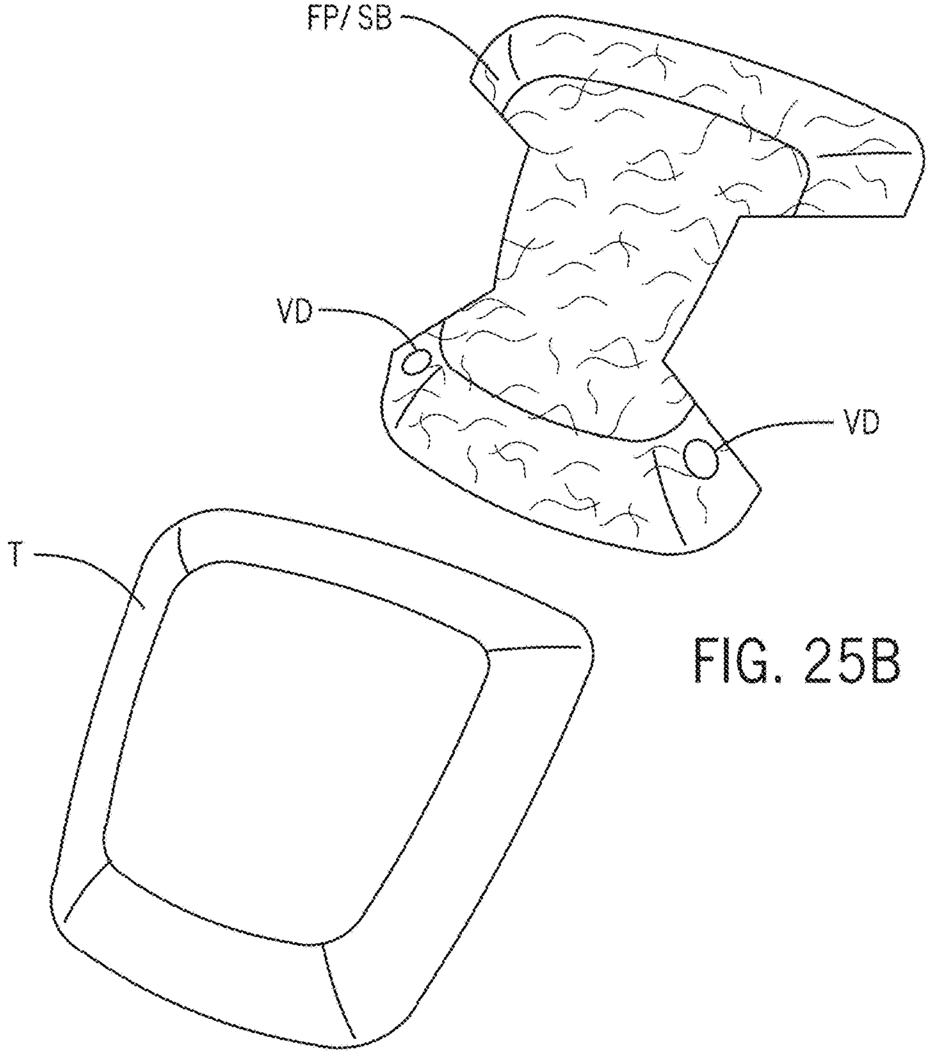
Figure 26A:
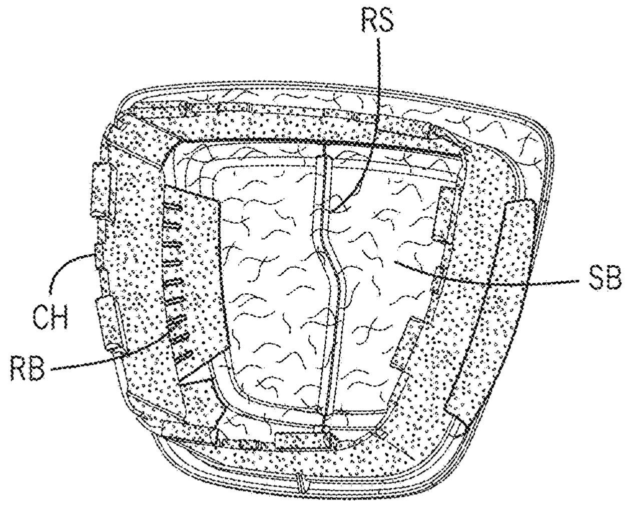
FIG. 26A is a schematic perspective view of a substrate and an airbag chute of a component for a vehicle interior according to an exemplary embodiment.
Figure 26B:
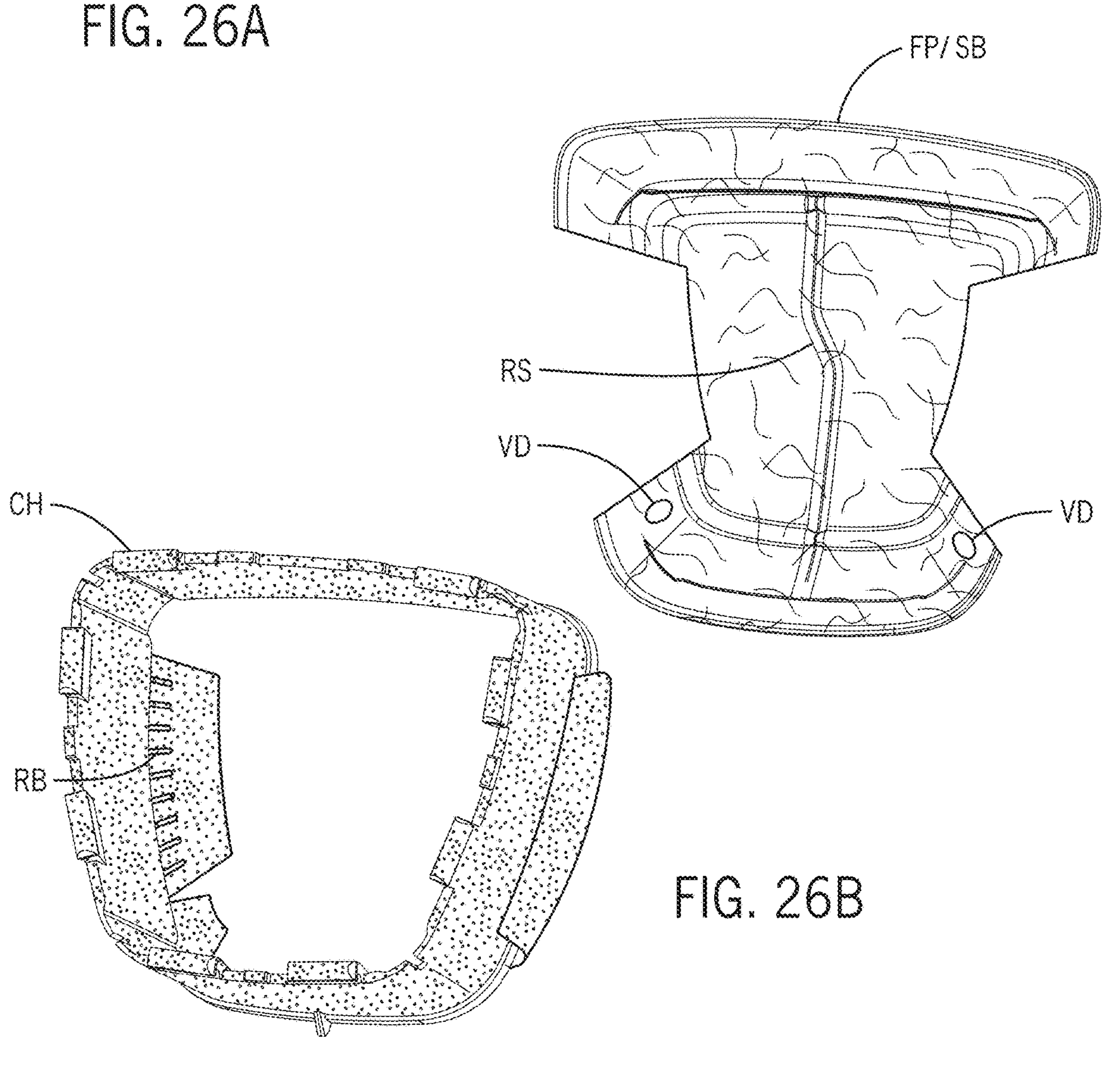
FIG. 26B is a schematic exploded perspective view of a substrate and an airbag chute of a component for a vehicle interior according to an exemplary embodiment.
Figure 27A:
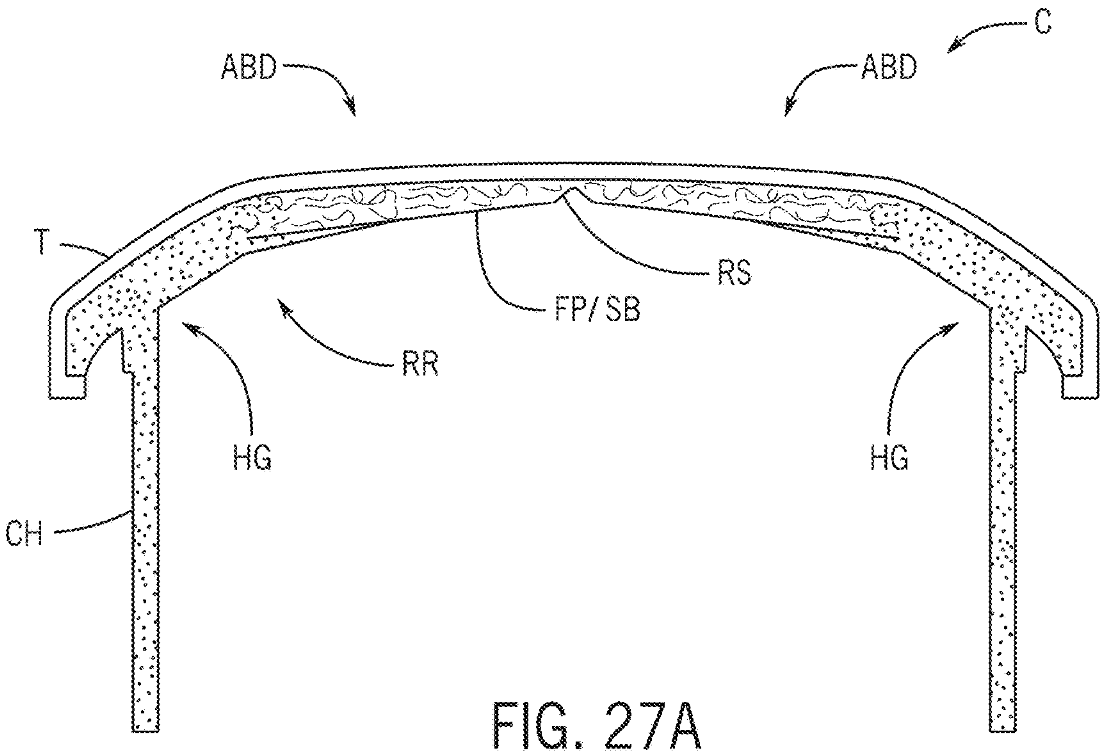
FIG. 27A is a schematic section view of a component for a vehicle interior according to an exemplary embodiment.
Figure 27B:
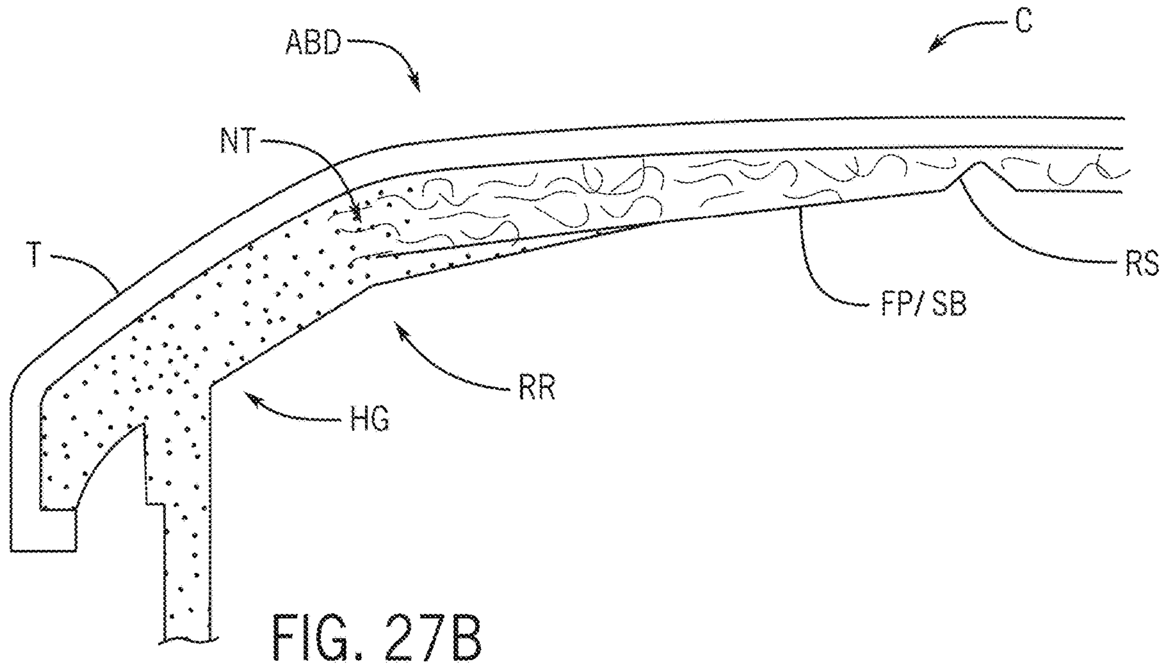
FIG. 27B is a schematic partial section view of a component for a vehicle interior according to an exemplary embodiment.
Figure 27C:
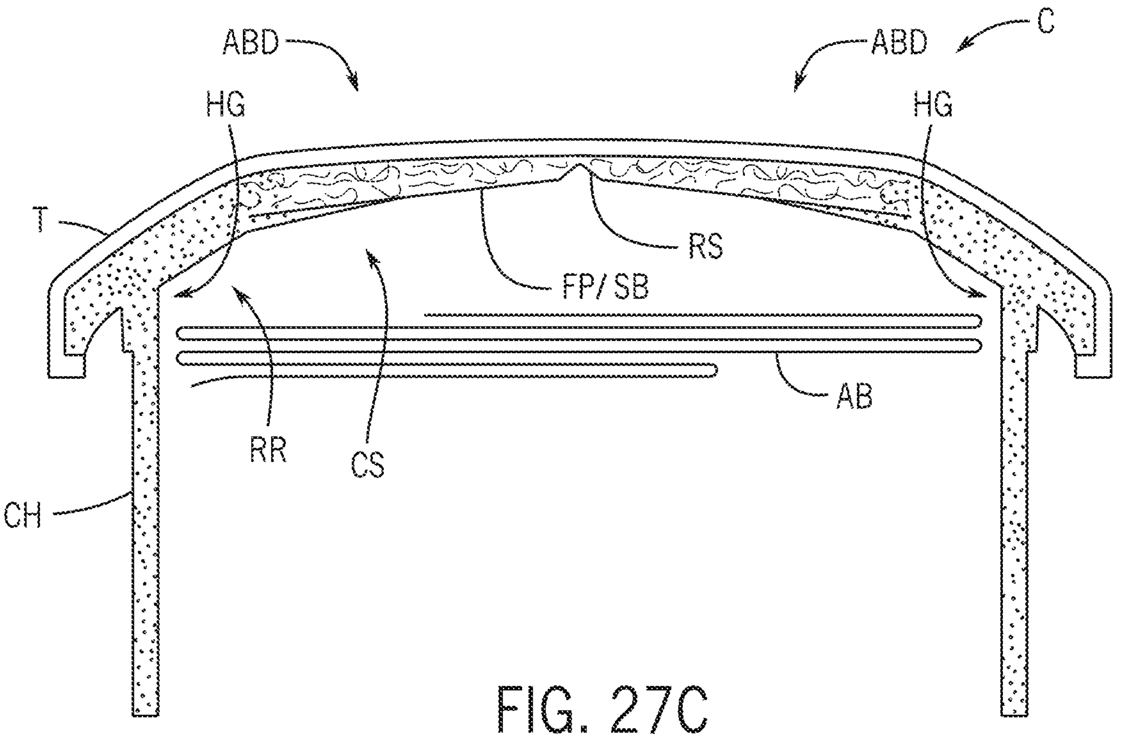
FIGS. 27C and 27D are schematic section views of a deployment of an airbag from a vehicle interior component according to an exemplary embodiment.
Figure 27D:
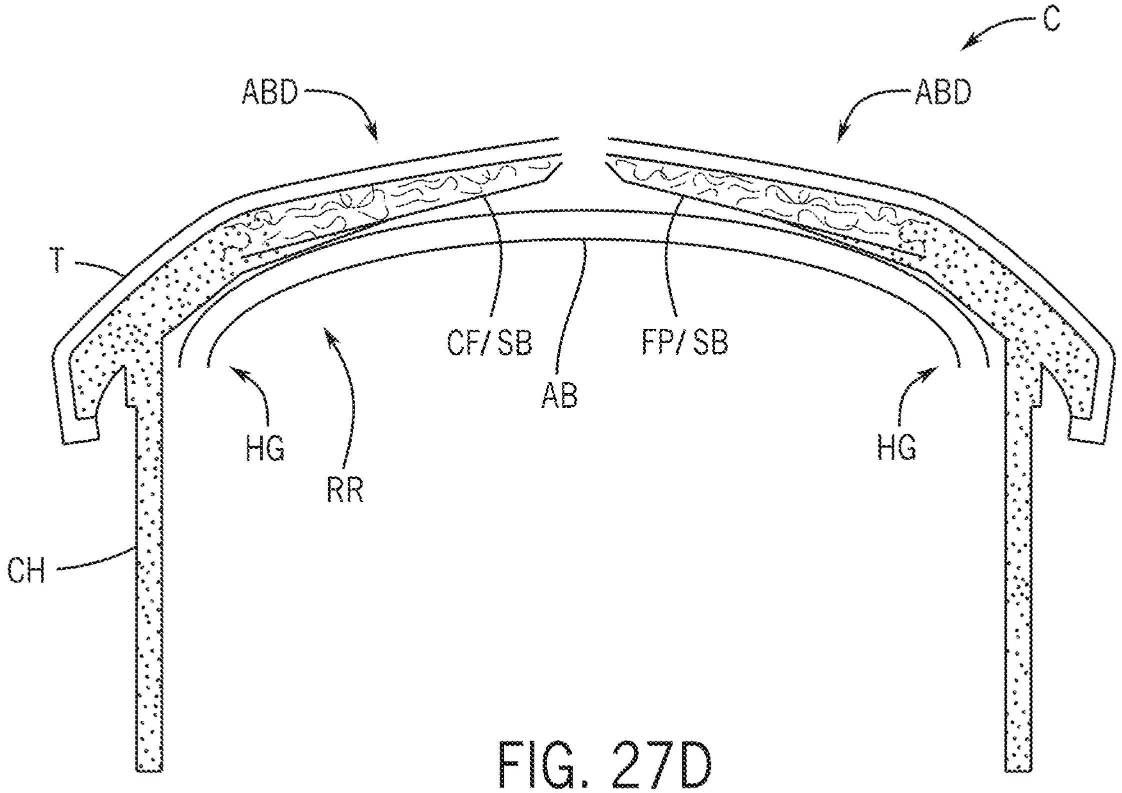
Figure 28A:
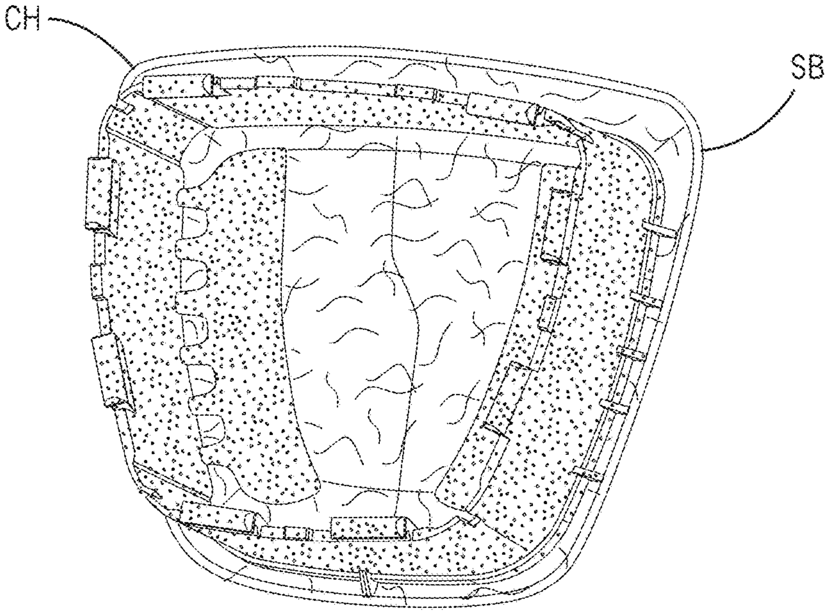
FIG. 28A is a schematic perspective view of a component for a vehicle interior according to an exemplary embodiment.
Figure 28B:
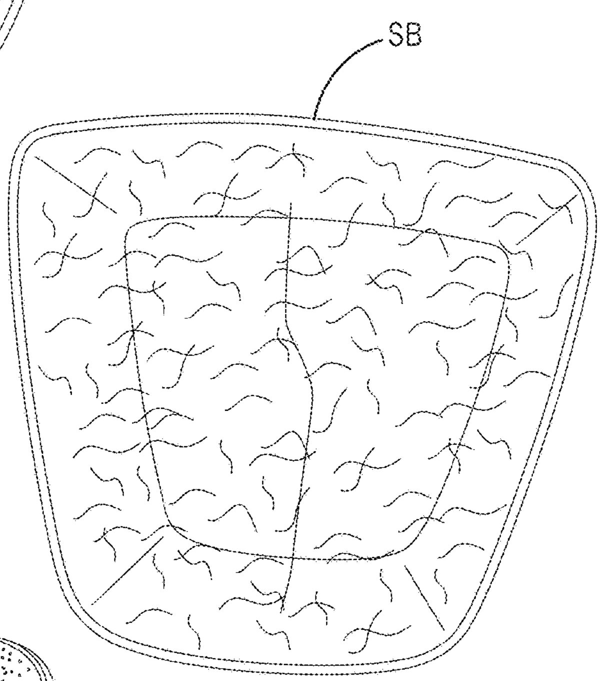
FIG. 28B is a schematic exploded perspective view of a component for a vehicle interior according to an exemplary embodiment.
Figure 28B:
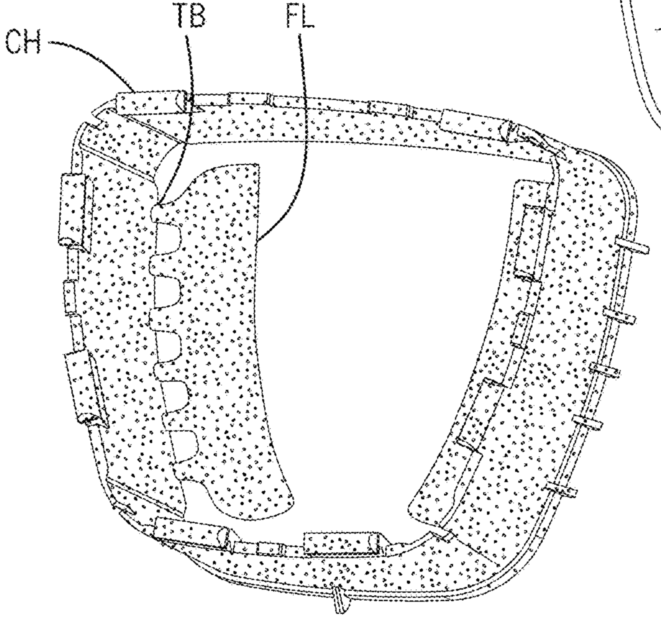

According to an exemplary embodiment as shown schematically in FIGS. 3A-3C, 4A-4C, 5A-5B, 8A-8B, 9A-9B and 10A-10B, composite structure CS may comprise a cover T; cover T may be provided on composite structure CS; cover T may provide an exterior surface Tx; cover T may be molded onto structural substrate SB; cover T may be overmolded onto structural substrate SB; cover T may comprise an injection-molded skin. See also FIGS. 12, 13, 14, 15, 16, 17, 18, 19, 20, 21, 22, 23A-23B, 24A-24B and 27A-27D. Structural substrate SB may comprise a void; the void may be filled with material of cover T. See FIGS. 25A-25B.

According to an exemplary embodiment as shown schematically in FIGS. 2, 3A-3C, 4A-4C, 5A-5B, 8A-8B, 9A-9B and 10A-10B, structural substrate SB may comprise a fiber panel FP; structural substrate SB may comprise a panel FP comprising fibers. See also FIGS. 7A-7F. The fibers may comprise natural fibers. The panel may comprise a resin material. The panel may comprise a compression-formed panel; the panel may comprise a fiber panel FP; the panel may be formed from a fiber mat.

According to an exemplary embodiment as shown schematically in FIGS. 6A-6B, 7F, 8A-8B, 9A-9B, 12, 13, 14, 15, 16, 17, 18 and 19, structural substrate SB of composite structure CS may comprise a recess RS configured to facilitate formation of the opening for deployment of airbag AB from structure/housing CH; structural substrate SB may comprise a seam TR configured to facilitate formation of a door for the opening for deployment of airbag AB from structure/housing CH; seam TR may comprise a groove; seam TR may comprise a recess; seam TR may comprise a line; seam TR may comprise a line with a curved section; seam TR may comprise a line with a stagger; seam TR may comprise a tear line. See also FIGS. 2, 3A-3C and 4A-4C.

According to an exemplary embodiment as shown schematically in FIGS. 5A-5B, 6A-6B and 8A-8B, structure/housing CH for the airbag may be configured to contain airbag AB or an airbag module; the structure for the airbag may comprise a housing CH with a wall structure WS configured to contain an airbag; the housing may comprise an airbag chute coupled to structural substrate SB. See also FIGS. 27A-27D and 28A-28B.

According to an exemplary embodiment as shown schematically in FIGS. 8A-8B, 9A-9B, 12, 13, 14, 15, 16, 17, 18, 19, 20, 21, 22, 23A-23B, 24A-24B and 27A-27D, reinforcement area RR may comprise a reinforcement configured to reinforce hinge area HG during movement of a door at the opening during deployment of the airbag; hinge area HG may be configured to form a hinge for a door for the opening for deployment of the airbag; hinge area HG may comprise a variable thickness in structural substrate SB; hinge area HG may comprise a variable thickness in the composite structure. Reinforcement area RR may comprise an area of variable thickness/material in structure/housing CH for the airbag; reinforcement area RR may comprise an area of variable thickness/material in the composite structure. See also FIGS. 8A-8B, 9A-9B, 12, 13, 14, 15, 16, 17, 18, 19, 20, 21, 22, 23A-23B and 24A-24B. According to an exemplary embodiment as shown schematically in FIGS. 25A-25B, 26A-26B, 27A-27D and 28A-28B, component C with composite structure of substrate SB and structure/housing CH with reinforcement area RR may comprise an area of variable thickness/material in structure/housing CH for the airbag; reinforcement area RR may comprise an area of variable thickness/material in the composite structure; reinforcement area RR may comprise an area substantially formed by the material of housing/structure CH with feature shown as flange FL.

According to an exemplary embodiment as shown schematically in FIGS. 8A-8B, 9A-9B, 12, 13, 14, 15, 16, 17, 18, 19, 20, 21, 22, 23A-23B, 24A-24B and 27A-27D, reinforcement area RR may comprise a feature/reinforcement FT/RT configured to reinforce hinge area HG during movement of the door during deployment of the airbag; the reinforcement may be configured to secure the at least one door to structural substrate SB during deployment of the airbag; reinforcement area RR may be configured to retain the door to the airbag chute; reinforcement area RR may comprise a tether; structure/housing CH for the airbag may comprise an airbag chute; the tether may comprise material of structural substrate SB and/or material of the airbag chute. See FIGS. 20, 21, 22, 23A-23B and 24A-24B.

According to an exemplary embodiment as shown schematically in FIGS. 20, 21, 22, 23A-23B and 24A-24B, structural substrate SB of composite structure CS may comprise a feature such as a recess RS and/or projection configured to facilitate formation of reinforcement area RR; feature FT of structure/housing CH may be configured to form reinforcement area RR with the feature of structural substrate SB; material of feature FT of structure/housing CH may be configured to form reinforcement area RR by forming with material of the feature of structural substrate SB; the materials may be configured to intermingle/mix to form the reinforcement area at the hinge area for the opening for deployment of airbag AB from structure/housing CH through composite structure CS. See also FIGS. 8A-8B, 9A-9B, 12, 13, 14, 15, 16, 17, 18 and 19.

According to an exemplary embodiment as shown schematically in FIGS. 2, 5A-5B, 6A-6B, 8A-8B, 9A-9B, 10A-10B and 11A-11B, structural substrate SB of composite structure CS of component C may be configured to provide an underside configured for contact from the airbag to facilitate deployment of the airbag from structure/housing CH. The method of producing the component may comprise a step of assembling an airbag module comprising the airbag to the underside of the structural substrate.

According to an exemplary embodiment as shown schematically in FIGS. 2, 5A-5B, 6A-6B, 8A-8B, 9A-9B, 10A-10B and 11A-11B, the structural substrate may comprise at least one of (a) a compression-formed component; (b) a generally rigid fiber mat; (c) a panel comprised at least partially of fibers; (d) a fiber panel. The structural substrate shown as panel/fiber panel may be formed by compressing a fiber mat in a mold; the fiber mat may be compressed to a first thickness; a portion of the fiber mat may be compressed to a second thickness less than the first thickness adjacent the hinge area.

According to an exemplary embodiment as indicated schematically in the FIGURES, the structure/housing shown as the air bag chute with feature/reinforcement may comprise (a) a resin; (b) a thermoplastic resin; (c) polypropylene; (d) acrylonitrile butadiene styrene; (e) polycarbonate. The structure/housing shown as the air bag chute with feature/reinforcement may comprise a TPO material. According to an exemplary embodiment as shown schematically in the FIGURES, the step of molding the cover on the structural substrate may comprise injection molding thermoplastic material; the thermoplastic material may comprise at least one of (a) a TPE material; (b) a TPV material; (c) a PU material.

Figure 29:
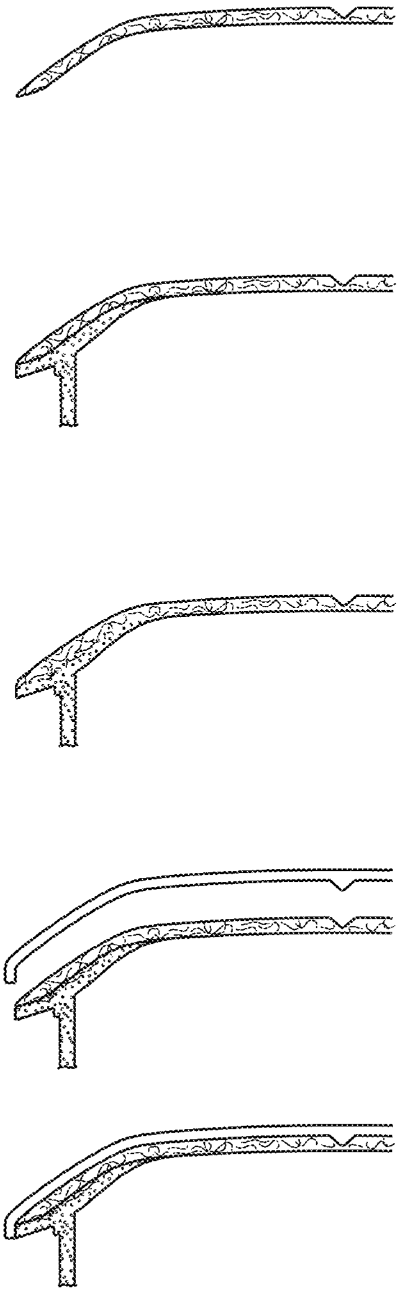
FIG. 29 is a schematic flow diagram of a process to manufacture a component for a vehicle interior according to an exemplary embodiment.

According to an exemplary embodiment as shown schematically in FIG. 29, a process to manufacture a component for a vehicle interior comprising a composite structure configured to form an opening/door for deployment of an airbag from a structure such as a housing may comprise providing a substrate (fiber panel), applying resin for a structure (housing) with a reinforcement section/feature, forming a composite structure (of substrate and structure) with a reinforcement area at a hinge area, applying a cover to the substrate, and providing a component/panel with structure and reinforcement area. See also FIGS. 7A-7F.

Figure 30:
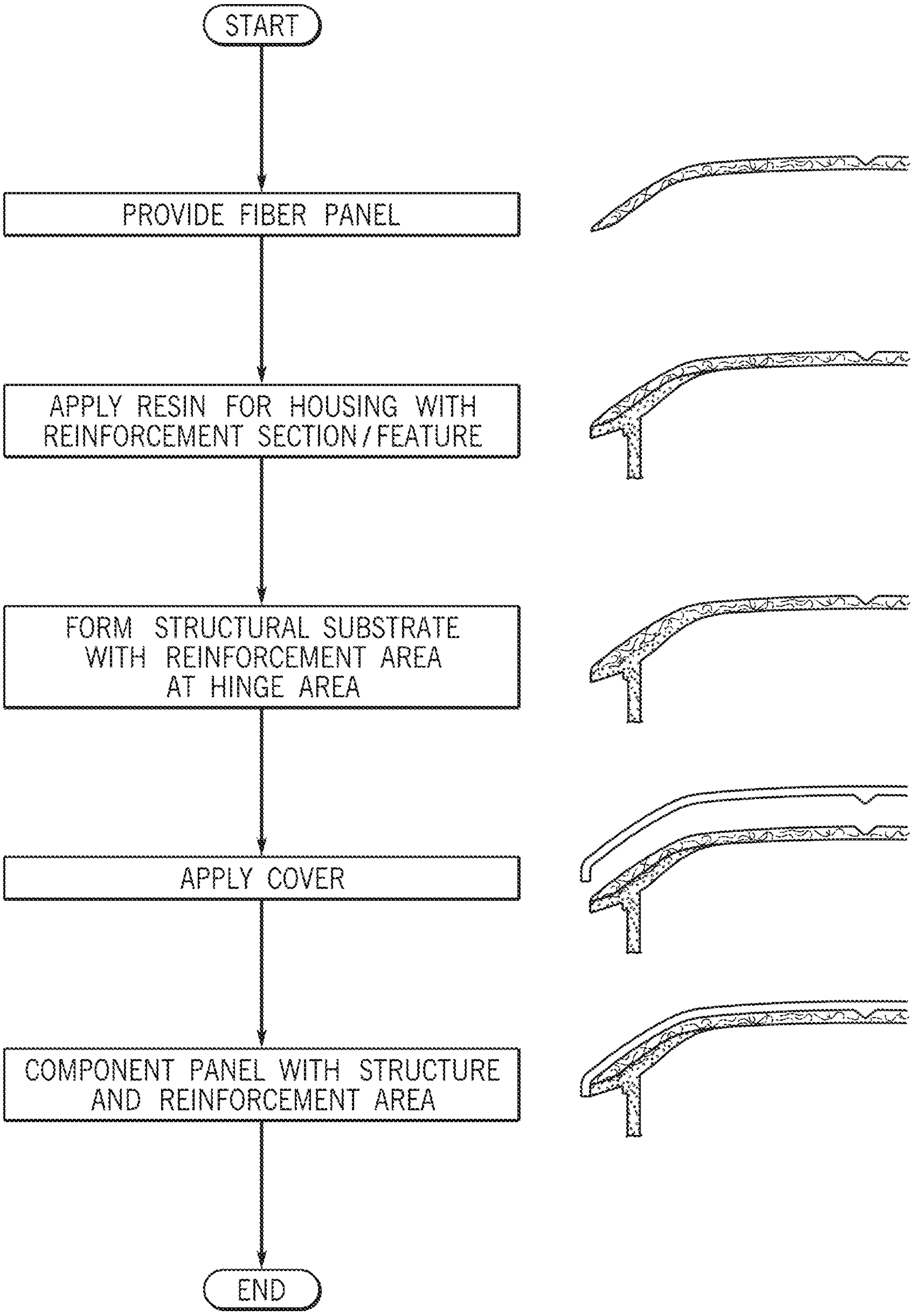
FIG. 30 is a schematic flow diagram of a process to manufacture a component for a vehicle interior according to an exemplary embodiment.

According to an exemplary embodiment as shown schematically in FIG. 30, a process to manufacture a component for a vehicle interior comprising a composite structure configured to form an opening/door for deployment of an airbag from a structure such as a housing may comprise providing a fiber panel, applying resin for a housing with a reinforcement section/feature, forming a structural substrate with a reinforcement area at a hinge area, applying a cover, and providing a component/panel with structure and reinforcement area. See also FIGS. 7A-7F.

Figure 31A:
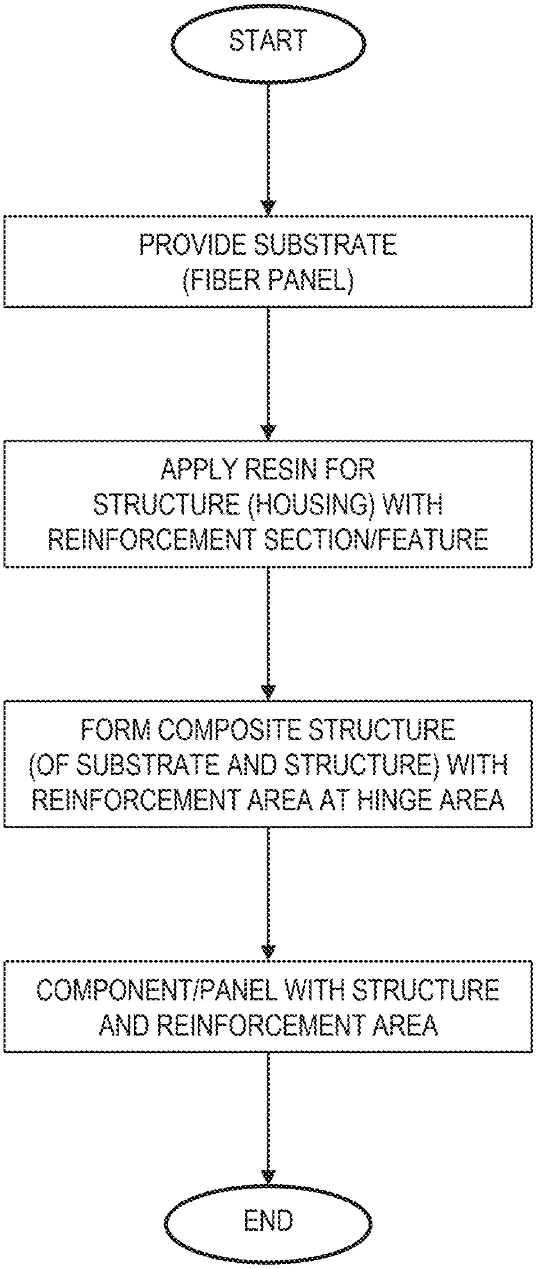
FIG. 31A is a schematic flow diagram of a process to manufacture a component for a vehicle interior according to an exemplary embodiment.

According to an exemplary embodiment as shown schematically in FIG. 31A, a process to manufacture a component for a vehicle interior comprising a composite structure configured to form an opening/door for deployment of an airbag from a structure such as a housing may comprise providing a substrate (fiber panel), applying resin for a structure (housing) with a reinforcement section/feature, forming a composite structure (of substrate and structure) with a reinforcement area at a hinge area, and providing a component/panel with structure and reinforcement area. See also FIGS. 7A-7F.

Figure 31B:
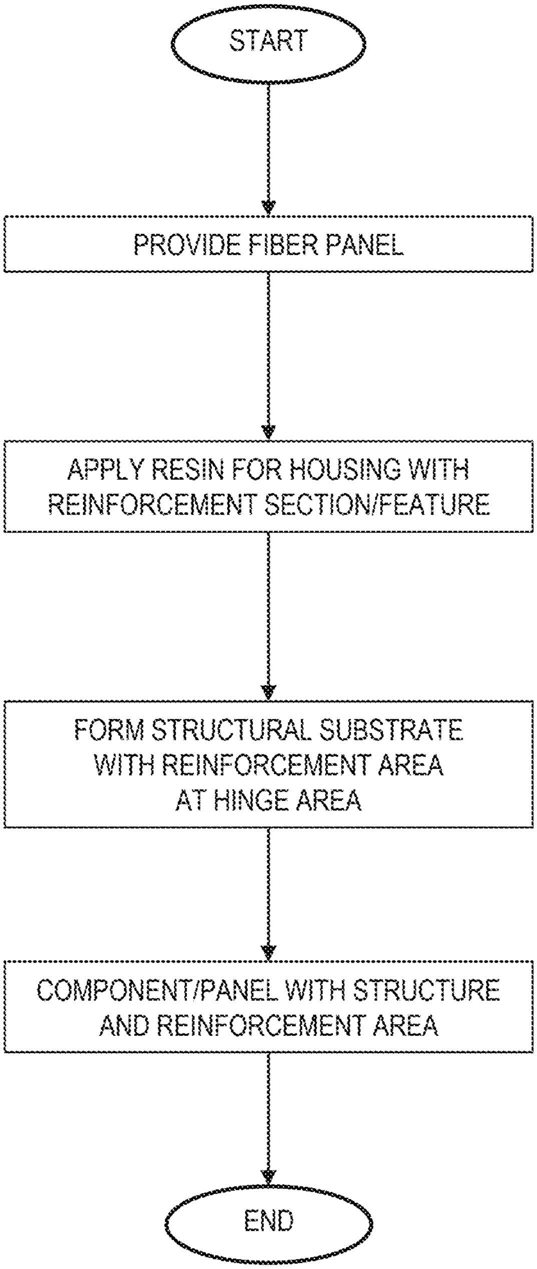
FIG. 31B is a schematic flow diagram of a process to manufacture a component for a vehicle interior according to an exemplary embodiment.

According to an exemplary embodiment as shown schematically in FIG. 31B, a process to manufacture a component for a vehicle interior comprising a composite structure configured to form an opening/door for deployment of an airbag from a structure such as a housing may comprise providing a fiber panel, applying resin for a housing with a reinforcement section/feature, forming a structural substrate with a reinforcement area at a hinge area, and providing a component/panel with structure and reinforcement area. See also FIGS. 7A-7F.

Figure 31C:
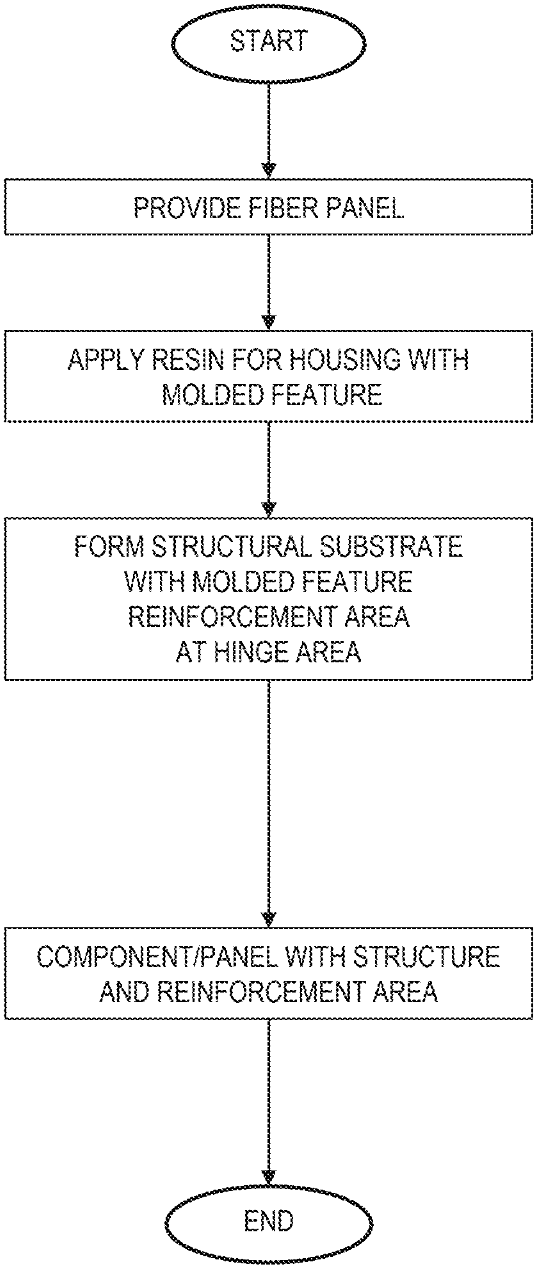
FIG. 31C is a schematic flow diagram of a process to manufacture a component for a vehicle interior according to an exemplary embodiment.

According to an exemplary embodiment as shown schematically in FIG. 31C, a process to manufacture a component for a vehicle interior comprising a composite structure configured to form an opening/door for deployment of an airbag from a structure such as a housing may comprise providing a fiber panel, applying resin for a housing with a molded feature, forming a structural substrate with a molded feature reinforcement area at a hinge area, and providing a component/panel with a structure and a reinforcement area. See also FIGS. 7A-7F.

Figure 31D:
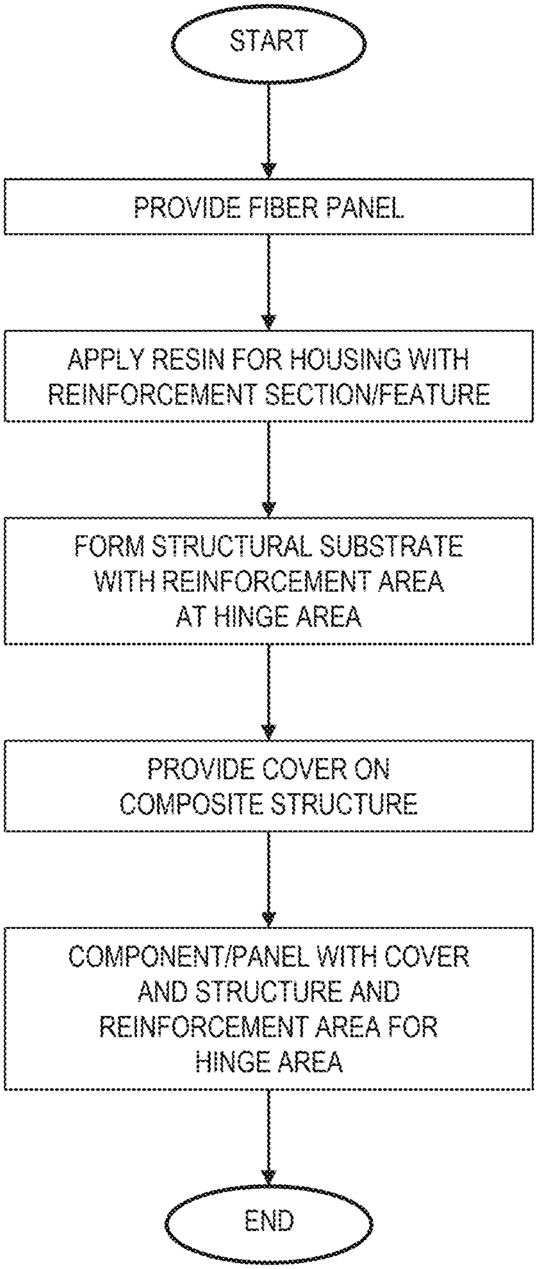
FIG. 31D is a schematic flow diagram of a process to manufacture a component for a vehicle interior according to an exemplary embodiment.

According to an exemplary embodiment as shown schematically in FIG. 31D, a process to manufacture a component for a vehicle interior comprising a composite structure configured to form an opening/door for deployment of an airbag from a structure such as a housing may comprise providing a fiber panel, applying resin for a housing with a reinforcement section/feature, forming a structural substrate with a reinforcement area at a hinge area, providing a cover on a composite structure, and providing a component/panel with the cover and a structure and the reinforcement area for the hinge area. See also FIGS. 7A-7F.

Figure 32A:
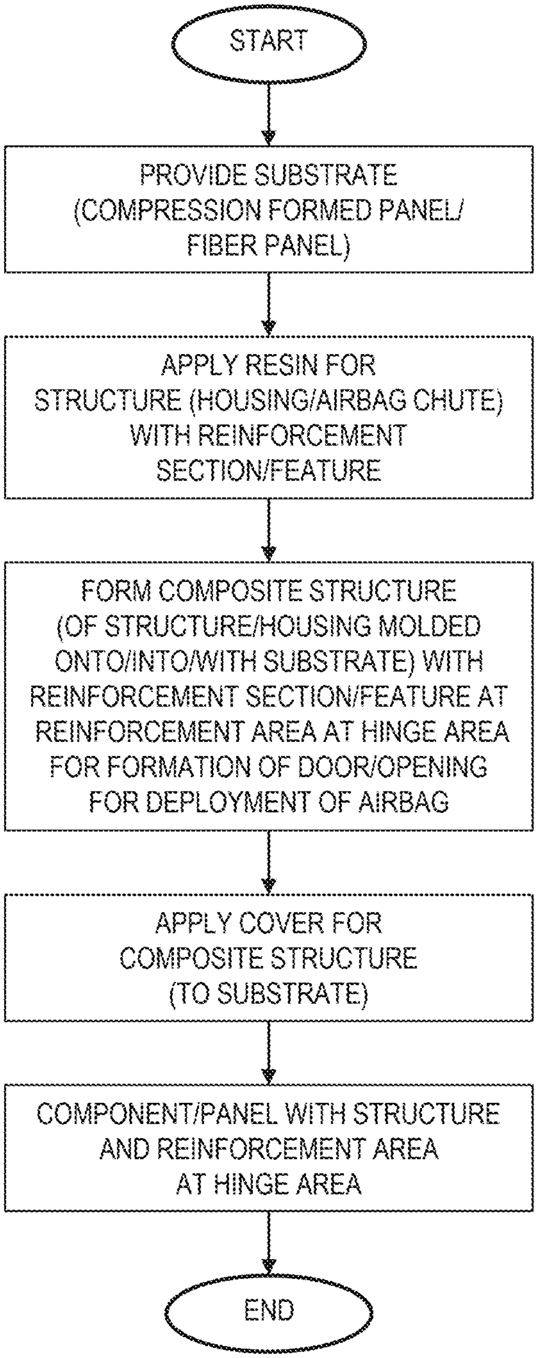
FIG. 32A is a schematic flow diagram of a process to manufacture a component for a vehicle interior according to an exemplary embodiment.

According to an exemplary embodiment as shown schematically in FIG. 32A, a process to manufacture a component for a vehicle interior comprising a composite structure configured to form an opening/door for deployment of an airbag from a structure such as a housing may comprise providing a substrate (compression formed panel/fiber panel), applying resin for a structure (housing/airbag chute) with a reinforcement section/feature, forming a composite structure (of structure/housing molded onto/into/with substrate) with the reinforcement section/feature at a reinforcement area at a hinge area for formation of a door/opening for deployment of an airbag, applying a cover for the composite structure (to substrate), and providing a component/panel with a structure and the reinforcement area at the hinge area. See also FIGS. 7A-7F.

Figure 32B:
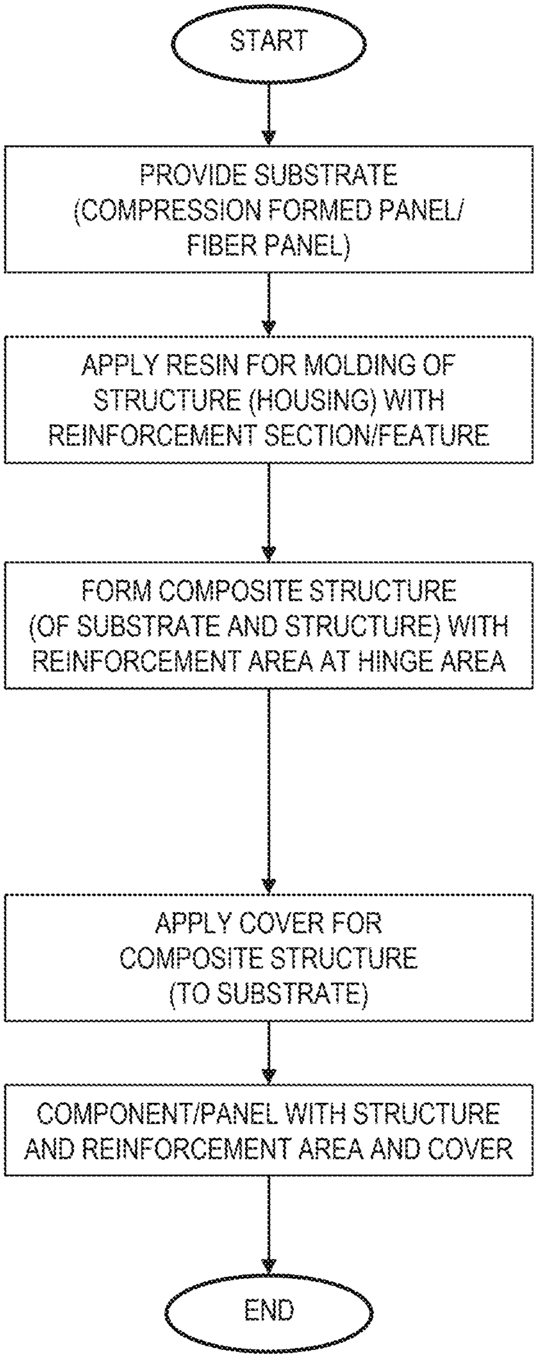
FIG. 32B is a schematic flow diagram of a process to manufacture a component for a vehicle interior according to an exemplary embodiment.

According to an exemplary embodiment as shown schematically in FIG. 32B, a process to manufacture a component for a vehicle interior comprising a composite structure configured to form an opening/door for deployment of an airbag from a structure such as a housing may comprise providing a substrate (compression formed panel/fiber panel), applying resin for molding of a structure (housing) with a reinforcement section/feature, forming a composite structure (of substrate and structure) with a reinforcement area at a hinge area, applying a cover for the composite structure (to substrate), and providing a component/panel with the structure and the reinforcement area and the cover. See also FIGS. 7A-7F.

Exemplary Embodiments A

According to an exemplary embodiment as shown schematically in the FIGURES, a component for a vehicle interior configured to provide an opening for deployment of an airbag into the vehicle interior may comprise a composite structure comprising a structural substrate configured to provide the opening for deployment of the airbag and a structure configured for the airbag; a door may be configured to be formed to provide the opening in the composite structure during deployment of the airbag; the composite structure may comprise a hinge area for the door and a reinforcement area for the hinge area; the reinforcement area may be provided at an interface of the structural substrate and the structure configured for the airbag; the reinforcement area may be configured to reinforce the hinge area for the door; the structure configured for the airbag may comprise a feature configured to provide the reinforcement area; the structural substrate may comprise a fiber panel comprising fibers and resin material; the feature may comprise a molded feature; the molded feature may comprise at least one of a tab and/or a flange and/or a web and/or a rib and/or a resin feature; the feature may comprise a tether; the structure configured for the airbag may comprise a resin material; the structural substrate may comprise a resin material; the structure may be molded to the structural substrate; the composite structure may comprise a cover; the cover may comprise an injection-molded cover; the structure for the airbag may comprise a housing; the housing may comprise a wall structure configured to provide an enclosure for the airbag; the housing may comprise an inner flange extending from the wall structure toward the enclosure and an outer flange extending from the wall structure away from the enclosure; the inner flange may be bonded to the structural substrate; the outer flange may be bonded to the structural substrate; the wall structure and the inner flange and the outer flange may be molded on the structural substrate; the structural substrate may be configured to provide a door upon deployment of the airbag to facilitate deployment of the airbag and the hinge area for the door; the reinforcement area may be configured to retain the door to the composite structure; the structure for the airbag may comprise an airbag chute; the tether may comprise material of the structural substrate and/or material of the airbag chute; the structural substrate may comprise an indentation configured to facilitate rupture of the structural substrate to form the door upon deployment of the airbag to facilitate deployment of the airbag; the indentation may comprise a first indentation on an underside of the structural substrate and a second indentation; the cover may be configured to fit in the second indentation; the component may further comprise a cover comprising an outer surface and an inner surface opposite the outer surface coupled to the structural substrate; the cover may be configured to fit in an indentation of the structural substrate; the component may be formed by a process comprising the steps of forming a structural substrate, forming a housing configured to be coupled to the structural substrate, and forming a reinforcement area comprising a reinforcement configured to reinforce a hinge area of the structural substrate during movement of the door during deployment of the airbag; the reinforcement may be configured to secure the door to the structural substrate during deployment of the airbag; material of the structural substrate and material of the airbag chute intermingle during forming of the airbag chute; the step of forming the structural substrate may comprise injection molding the structural substrate; the method may further comprise the step of forming an indentation at the hinge area of the structural substrate configured to facilitate movement of the door during deployment of the airbag; the method may further comprise the step of forming the structural substrate comprising compressing a first portion of a fiber mat in a mold to a first thickness and compressing a second portion of the fiber mat in the mold to a second thickness less than the first thickness adjacent the hinge area of the structural substrate; the method may further comprise the step of molding a cover on the structural substrate by injection molding thermoplastic material; the method may further comprise the step of forming the reinforcement area may comprise forming a reinforcement comprising a tapered wall of the airbag chute extending from the hinge area of the structural substrate along an underside of the structural substrate; the component may comprise at least one of an instrument panel and/or a door panel and/or a trim panel and/or a trim component.

According to an exemplary embodiment as shown schematically in the FIGURES, to a component for a vehicle interior configured for deployment of an airbag into the vehicle interior may comprise a structural substrate configured to provide a door upon deployment of the airbag to facilitate deployment of the airbag and a hinge area for the door, a housing molded onto the structural substrate, and a reinforcement area comprising a reinforcement configured to reinforce the hinge area during movement of the door during deployment of the airbag; the reinforcement may be configured to secure the at least one door to the structural substrate during deployment of the airbag; the reinforcement area may comprise an area of variable thickness in the composite structure; the composite structure may comprise an injection molded component.

According to an exemplary embodiment as shown schematically in the FIGURES, a component for a vehicle interior configured to provide an opening for deployment of an airbag into the vehicle interior may comprise a composite structure comprising a structural substrate configured to provide the opening for deployment of the airbag and a structure configured for the airbag. A door may be configured to be formed to provide the opening in the composite structure during deployment of the airbag. The composite structure may comprise a hinge area for the door and a reinforcement area for the hinge area. The reinforcement area may be configured to reinforce the hinge area for the door. The reinforcement area may be configured to provide retention so that the door does not separate from the composite structure at deployment of the airbag. The reinforcement area may be provided at an interface of the structural substrate and the structure configured for the airbag. The structure configured for the airbag may comprise a feature configured to provide the reinforcement area. The feature may comprise a molded feature. The feature may comprise a projection. The feature may comprise a set of projections. The feature may comprise a set of molded features. The feature may comprise a tab. The feature may comprise a flange. The feature may comprise a web. The feature may comprise a rib. The feature may comprise a rounded feature. The feature may comprise a resin feature. The feature may comprise a tether. The structure configured for the airbag may comprise a housing. The structure configured for the airbag may comprise the housing and the feature. The structure configured for the airbag may comprise a molded housing with the feature. The structure configured for the airbag may be molded on the structural substrate. The structure configured for the airbag may be molded into the structural substrate. The structure configured for the airbag may comprise a resin material; the structural substrate may comprise a resin material; the structure may be molded into the structural substrate. The structure configured for the airbag may comprise a resin material; the structural substrate may comprise the resin material; the structure may be molded into the structural substrate. The structure configured for the airbag may comprise a resin material; the structural substrate may comprise the resin material; the structure may be bonded with the structural substrate. The structure configured for the airbag may comprise a resin material; the structural substrate may comprise the resin material; the structure may be pressed into the structural substrate. The structure configured for the airbag may comprise a resin material; the structural substrate may comprise the resin material; the structure may be configured to compress the structural substrate. The structure configured for the airbag may be configured to compress the structural substrate. The structure configured for the airbag may comprise a resin material; the structural substrate may comprise the resin material; the structure may be bonded with the structural substrate to provide the reinforcement area. The structure configured for the airbag may be bonded with the structural substrate to provide the hinge area. The structure configured for the airbag may be bonded onto the structural substrate to provide the reinforcement area. The structure configured for the airbag may comprise a molded housing with overmolding. The structure configured for the airbag may comprise a molded housing providing an airbag chute. The structure configured for the airbag may be configured to contain an airbag configured for deployment. The structure configured for the airbag may comprise a reinforcement feature configured to provide the reinforcement area. The structure configured for the airbag may comprise a reinforcement configured to provide the reinforcement area. The structure configured for the airbag may comprise a feature at the reinforcement area. The structure configured for the airbag may comprise a reinforcement at the reinforcement area. The reinforcement may comprise a molded feature. The structure configured for the airbag may comprise a housing. The structure may comprise an airbag chute. The structure may be coupled to the structural substrate. The composite structure may comprise a cover. A cover may be provided on the composite structure. The cover may be molded onto the structural substrate. The cover may be overmolded onto the structural substrate. The cover may comprise an injection-molded skin. The structural substrate may comprise a void; the void may be filled with material of the cover. The structural substrate may comprise a fiber panel. The structural substrate may comprise a panel comprising fibers. The fibers comprise natural fibers. The panel may comprise a resin material. The panel may comprise a compression-formed panel. The panel may comprise a fiber panel. The panel may be formed from a fiber mat. The structural substrate may comprise a seam configured to facilitate formation of the opening for deployment of the airbag. The structural substrate may comprise a seam configured to facilitate formation of a door for the opening for deployment of the airbag. The seam may comprise a groove. The seam may comprise a recess. The seam may comprise a line. The seam may comprise a line with a curved section. The seam may comprise a line with a stagger. The seam may comprise a tear line. The structure for the airbag may be configured to contain an airbag. The structure for the airbag may comprise a housing configured to contain an airbag. The housing may comprise an airbag chute coupled to the structural substrate. The reinforcement area may comprise a reinforcement configured to reinforce the hinge area during movement of a door at the opening during deployment of the airbag. The hinge area may be configured to form a hinge for a door for the opening for deployment of the airbag. The hinge area may comprise a variable thickness in the structural substrate. The hinge area may comprise a variable thickness in the composite structure. The reinforcement area may comprise an area of variable thickness in the structure for the airbag. The reinforcement area may comprise an area of variable thickness in the composite structure. The reinforcement may be configured to secure the at least one door to the structural substrate during deployment of the airbag. The structural substrate may be configured to provide (1) a door upon deployment of the airbag to facilitate deployment of the airbag and (2) the hinge area for the door. The structure for the airbag may comprise an airbag chute coupled to the structural substrate. The reinforcement area may comprise a reinforcement configured to reinforce the hinge area during movement of the door during deployment of the airbag. The reinforcement may be configured to secure the at least one door to the structural substrate during deployment of the airbag. The reinforcement area may be configured to retain the door to the airbag chute. The reinforcement area may comprise a tether; the structure for the airbag may comprise an airbag chute; the tether may comprise material of the structural substrate and/or material of the airbag chute. The reinforcement may comprise a shoulder of the airbag chute at the hinge area of the structural substrate. The reinforcement area may comprise a tapered wall of the airbag chute extended from the hinge area of the structural substrate along an underside of the structural substrate. The tapered wall of the airbag chute may be formed by molding the airbag chute on the structural substrate. The structure for the airbag may comprise a housing. The reinforcement may comprise an interface; the interface may be formed from material of the housing and material from the structural substrate. The material may comprise a resin. The reinforcement area may comprise a reinforcement comprising a rounded feature molded into the structural substrate. Material of the housing and material of the structural substrate intermingle during formation of the housing on the structural substrate. The housing may comprise an airbag chute. The reinforcement may comprise an interface; the interface may comprise a composite material; the composite material may comprise material of the airbag chute and material of the structural substrate. The interface may be formed by molding the airbag chute on the structural substrate. The airbag chute may comprise a wall structure configured to provide an enclosure for the airbag. The airbag chute may comprise an inner flange extending from the wall structure toward the enclosure and an outer flange extending from the wall structure away from the enclosure. The inner flange may be bonded to the structural substrate; The outer flange may be bonded to the structural substrate. The component may comprise a cover coupled to the structural substrate; the outer flange may be coupled to the cover. The wall structure and the inner flange and the outer flange are molded on the structural substrate. The airbag chute may comprise a set of tabs at the hinge area of the structural substrate. The set of tabs may comprise a first tab separated from a second tab by material of the airbag chute. The set of tabs may comprise a first tab separated from a second tab by material of the structural substrate. The set of tabs may be configured to facilitate flexure of the door. The set of tabs may comprise a set of ribs extending from a wall of the airbag chute toward the structural substrate. The set of tabs may comprise a set of ribs configured to strengthen an angle of the airbag chute. The set of tabs may comprise a set of gussets. The air bag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness less than the first thickness adjacent the hinge area. The fiber mat may be compressed to a thickness of between 1.0 mm and 1.7 mm. The fiber mat may be compressed to a thickness of between 1.7 mm and 1.8 mm. The structural substrate may comprise an injection molded component. The component may comprise a cover comprising an outer surface and an inner surface opposite the outer surface coupled to the structural substrate. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The cover may be molded on the structural substrate. The cover may be configured to cover a top side of the structural substrate and an edge of the structural substrate. The cover may extend along a top side of the structural substrate to an edge of the structural substrate and to an underside of the structural substrate. The cover may be bonded to material of the airbag hinge. The structural substrate may comprise an indentation configured to facilitate movement of the door during deployment of the airbag. The cover may be configured to fit in the indentation of the structural substrate. The indentation of the structural substrate may be adjacent the hinge area. The structural substrate may comprise an indentation configured to facilitate rupture of the structural substrate to form the door upon deployment of the airbag to facilitate deployment of the airbag. The cover may be configured to fit in the indentation of the structural substrate. The indentation may comprise a first indentation on an underside of the structural substrate and a second indentation; the cover may be configured to fit in the second indentation. The indentation may be configured to form a tear seam to form the door. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The reinforcement may comprise a protrusion of the airbag chute configured to fit in an indentation of the structural substrate. The protrusion of the airbag chute may be formed by molding the airbag chute into the indentation of the structural substrate. The airbag chute may comprise an indentation at the hinge area configured to facilitate movement of the door during deployment of the airbag. The indentation of the airbag chute may be formed by molding the airbag chute on a protrusion of the structural substrate. The reinforcement may comprise a protrusion of the structural substrate configured to fit in an indentation of the airbag chute. The component may comprise at least one of an instrument panel; a door panel; a trim panel; a trim component. The component may be formed from a process comprising the steps of (a) providing the structural substrate and (b) forming the composite structure with the structure for the airbag molded onto the structural substrate. The composite structure may be formed from a process comprising the steps of (a) providing the structural substrate and (b) forming the structure for the airbag molded onto the structural substrate. The composite structure may be formed from a process comprising the steps of (a) providing the structural substrate and (b) forming the structure for the airbag molded as a housing onto the structural substrate to provide the hinge area. The composite structure may be formed from a process comprising the steps of (a) providing the structural substrate and (b) forming the structure for the airbag molded as a housing onto the structural substrate to provide the hinge area and the reinforcement area. The composite structure may be formed from a process comprising the steps of (a) providing the structural substrate and (b) forming the structure for the airbag molded as a housing with at least one reinforcement feature onto the structural substrate to provide the hinge area and the reinforcement area. The composite structure may be formed from a process comprising the steps of (a) providing the structural substrate and (b) forming the structure for the airbag molded onto the structural substrate and (c) forming the cover onto the structural substrate.

According to an exemplary embodiment as shown schematically in the FIGURES, a method of producing a component for a vehicle interior comprising a composite structure configured to provide an opening for deployment of an airbag into the vehicle interior may comprise the steps of (a) providing a structural substrate, (b) forming a structure for the airbag molded as a housing with at least one reinforcement feature onto the structural substrate to provide a hinge area and a reinforcement area, and (c) providing a cover for the structural substrate. The step of forming the structure for the airbag molded as the housing with at least one reinforcement feature onto the structural substrate to provide the hinge area and the reinforcement area may comprise injection molding of the structure onto the structural substrate. The reinforcement area may be formed by molding of material of the structure into material the structural substrate. The reinforcement area may be formed by molding of resin material of the structure into resin material the structural substrate.

According to an exemplary embodiment as shown schematically in the FIGURES, a method of manufacturing a component configured to provide a door upon deployment of an airbag to facilitate deployment of the airbag into a vehicle interior may comprise forming a structural substrate, forming a housing onto the structural substrate, and forming a reinforcement area configured to reinforce a hinge area of the structural substrate during movement of the door during deployment of the airbag. The reinforcement area may be configured to secure the door to the structural substrate during deployment of the airbag.

According to an exemplary embodiment as shown schematically in the FIGURES, a method of manufacturing a component configured to provide a door upon deployment of an airbag to facilitate deployment of the airbag into a vehicle interior may comprise forming a structural substrate, forming a housing comprising an airbag chute configured to be coupled to the structural substrate, and forming a reinforcement area comprising a reinforcement configured to reinforce a hinge area of the structural substrate during movement of the door during deployment of the airbag. The reinforcement may be configured to secure the door to the structural substrate during deployment of the airbag. The reinforcement area may be configured to retain the door to the airbag chute. The reinforcement may comprise material of the structural substrate and/or material of the airbag chute. The step of forming the reinforcement may comprise forming a shoulder of the airbag chute at the hinge area of the structural substrate. The step of forming the reinforcement may comprise forming a tapered wall of the airbag chute extending from the hinge area of the structural substrate along an underside of the structural substrate. The step of forming the structural substrate may comprise forming an indentation in the structural substrate; the step of forming the reinforcement may comprise forming a protrusion of the airbag chute in the indentation of the structural substrate. The step of forming the airbag chute may comprise forming an indentation at the hinge area of the structural substrate configured to facilitate movement of the door during deployment of the airbag. The step of forming the indentation at the hinge area of the structural substrate may comprise molding the airbag chute on a protrusion of the structural substrate. The step of forming the structural substrate may comprise forming a protrusion in the structural substrate; the step of forming the airbag chute may comprise forming an indentation in the airbag chute; the reinforcement may comprise the protrusion of the structural substrate fit in the indentation of the airbag chute. The step of forming the reinforcement may comprise forming the reinforcement from a composite material; the composite material may comprise material of the airbag chute and material of the structural substrate. Material of the structural substrate and material of the airbag chute intermingle during forming of the airbag chute. Forming the reinforcement may comprise forming a rounded feature into the structural substrate. Forming the airbag chute may comprise forming a set of tabs at the hinge area of the structural substrate. The step of forming the structural substrate may comprise compressing a pre-form substrate between a first surface of a mold and a second surface of the mold to form the pre-form substrate into a compression-formed component having a shape corresponding to a first contour of the first surface and a second contour of the second surface. The step of forming the airbag chute may comprise molding the airbag chute onto the compression-formed component. The step of forming the airbag chute may comprise molding the airbag chute and welding the airbag chute onto the compression-formed component. The step of forming the structural substrate may comprise compressing a fiber mat in a mold. The step of forming the structural substrate may comprise compressing a first portion of a fiber mat in a mold to a first thickness and compressing a second portion of the fiber mat in the mold to a second thickness less than the first thickness adjacent the hinge area of the structural substrate. The step of forming the structural substrate may comprise injection molding the structural substrate. The method may comprise a step of molding a cover on the structural substrate. The step of molding the cover on the structural substrate may comprise molding the cover in an indentation in the structural substrate. The indentation of the structural substrate may be adjacent the hinge area of the structural substrate. The indentation of the structural substrate may be configured to facilitate rupture of the structural substrate to form the door upon deployment of the airbag to facilitate deployment of the airbag. The step of molding the cover on the structural substrate may comprise injection molding thermoplastic material. The thermoplastic material may comprise at least one of (a) a TPE material; (b) a TPV material; (c) a PU material. The structural substrate may comprise an underside configured for contact from the airbag to facilitate deployment of the airbag. The method may comprise a step of assembling an airbag module comprising the airbag to the underside of the structural substrate. The method may comprise a step of forming at least one feature on the underside of the structural substrate from at least one of (a) a resin; (b) a thermoplastic resin; (c) polypropylene; (d) acrylonitrile butadiene styrene; (e) polycarbonate.

According to an exemplary embodiment as shown schematically in the FIGURES, a component for a vehicle interior configured for deployment of an airbag into the vehicle interior may comprise a structural substrate configured to provide (1) a door upon deployment of the airbag to facilitate deployment of the airbag and (2) a hinge area for the door, a housing comprising an airbag chute coupled to the structural substrate, and a reinforcement area comprising a reinforcement configured to reinforce the hinge area during movement of the door during deployment of the airbag. The reinforcement may be configured to secure the at least one door to the structural substrate during deployment of the airbag. The reinforcement may be configured to retain the door to the airbag chute. The reinforcement may comprise a tether; the tether may comprise material of the structural substrate and/or material of the airbag chute. The reinforcement may comprise a shoulder of the airbag chute at the hinge area of the structural substrate. The reinforcement may comprise a tapered wall of the airbag chute extended from the hinge area of the structural substrate along an underside of the structural substrate. The tapered wall of the airbag chute may be formed by molding the airbag chute on the structural substrate. The reinforcement may comprise an interface; the interface may comprise a composite material; the composite material may comprise material of the airbag chute and material of the structural substrate. The interface may be formed by molding the airbag chute on the structural substrate. Material of the airbag chute and material of the structural substrate intermingle during formation of the airbag chute on the structural substrate. The reinforcement may comprise a rounded feature molded into the structural substrate. The airbag chute may comprise a wall structure configured to provide an enclosure for the airbag. The airbag chute may comprise an inner flange extending from the wall structure toward the enclosure and an outer flange extending from the wall structure away from the enclosure. The inner flange may be bonded to the structural substrate; the outer flange may be bonded to the structural substrate. The component may comprise a cover coupled to the structural substrate; the outer flange may be coupled to the cover. The wall structure and the inner flange and the outer flange are molded on the structural substrate. The airbag chute may comprise a set of tabs at the hinge area of the structural substrate. The set of tabs may comprise a first tab separated from a second tab by material of the airbag chute. The set of tabs may comprise a first tab separated from a second tab by material of the structural substrate. The set of tabs may be configured to facilitate flexure of the door. The set of tabs may comprise a set of ribs extending from a wall of the airbag chute toward the structural substrate. The set of tabs may comprise a set of ribs configured to strengthen an angle of the airbag chute. The set of tabs may comprise a set of gussets. The air bag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness less than the first thickness adjacent the hinge area. The fiber mat may be compressed to a thickness of between 1.0 mm and 1.7 mm. The fiber mat may be compressed to a thickness of between 1.7 mm and 1.8 mm. The structural substrate may comprise an injection molded component. The component may comprise a cover comprising an outer surface and an inner surface opposite the outer surface coupled to the structural substrate. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The cover may be molded on the structural substrate. The cover may be configured to cover a top side of the structural substrate and an edge of the structural substrate. The cover extends along a top side of the structural substrate to an edge of the structural substrate and to an underside of the structural substrate. The cover may be bonded to material of the airbag hinge. The structural substrate may comprise an indentation configured to facilitate movement of the door during deployment of the airbag. The cover may be configured to fit in the indentation of the structural substrate. The indentation of the structural substrate may be adjacent the hinge area. The structural substrate may comprise an indentation configured to facilitate rupture of the structural substrate to form the door upon deployment of the airbag to facilitate deployment of the airbag. The cover may be configured to fit in the indentation of the structural substrate. The indentation may comprise a first indentation on an underside of the structural substrate and a second indentation; the cover may be configured to fit in the second indentation. The indentation may be configured to form a tear seam to form the door. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The reinforcement may comprise a protrusion of the airbag chute configured to fit in an indentation of the structural substrate. The protrusion of the airbag chute may be formed by molding the airbag chute into the indentation of the structural substrate. The airbag chute may comprise an indentation at the hinge area configured to facilitate movement of the door during deployment of the airbag. The indentation of the airbag chute may be formed by molding the airbag chute on a protrusion of the structural substrate. The reinforcement may comprise a protrusion of the structural substrate configured to fit in an indentation of the airbag chute. The component may comprise at least one of an instrument panel; a door panel; a trim panel; a trim component.

Exemplary Embodiments B

According to an exemplary embodiment, a component C for a vehicle interior configured to facilitate deployment of an airbag may comprise an airbag chute CH, a structural substrate SB; and a cover T. According to an exemplary embodiment, substrate SB may be configured to support airbag chute CH.

Figure 7A:
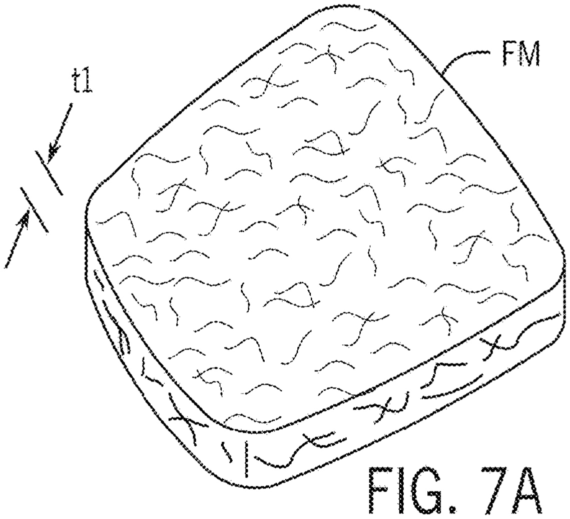
FIGS. 7A to 7B are schematic perspective views of a fiber mat being compressed into a consolidated mat according to an exemplary embodiment.
Figure 7B:
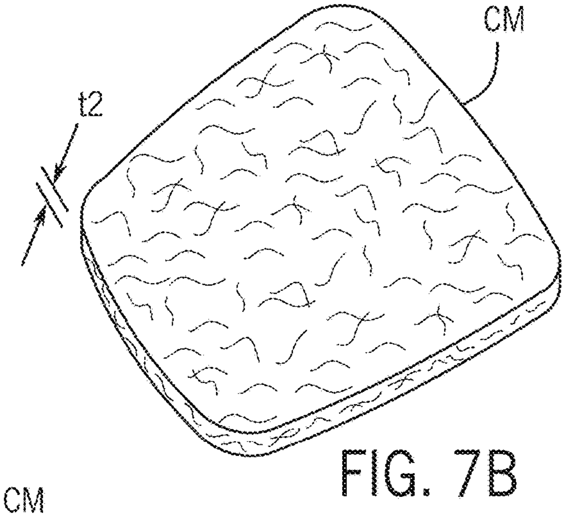

According to an exemplary embodiment as shown schematically in FIG. 7A, a fiber mat FM may include a combination of fibers (e.g. natural and/or synthetic fibers) and thermoplastic resin (e.g. polypropylene (PP), acrylonitrile butadiene styrene (ABS), polycarbonate (PC), etc.). According to an exemplary embodiment, fiber mat FM may have a thickness t1. According to an exemplary embodiment, fiber mat FM may be heated to induce the thermoplastic resin to liquefy. According to an exemplary embodiment as shown schematically in FIG. 7B, fiber mat FM may be heated and partially compressed into a consolidated mat CM. According to an exemplary embodiment, fiber mat FM may be placed into a low-temperature mold and compression molded into a desired shape. According to an exemplary embodiment, as the compressed fiber mat cools, the thermoplastic within the fiber mat may solidify to establish a substantially rigid composite panel. According to an exemplary embodiment, the consolidated mat may have a thickness t2, which may be smaller than thickness t1.

According to an exemplary embodiment, fiber mat FM may comprise a combination of structural fibers and thermoset resin (e.g. epoxy, polyester, etc.). According to an exemplary embodiment, fiber mat FM may be compressed within a heated mold to form a partially compressed fiber mat with a desired shape and to induce curing of the thermoset resin. According to an exemplary embodiment, a substantially rigid composite panel may be formed after the thermoset resin is cured.

Figure 7C:
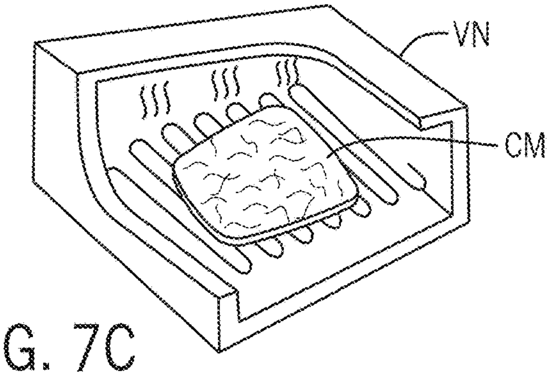
FIGS. 7C to 7F are schematic perspective views of a consolidated mat being formed into a component for a vehicle interior according to an exemplary embodiment.
Figure 7D:
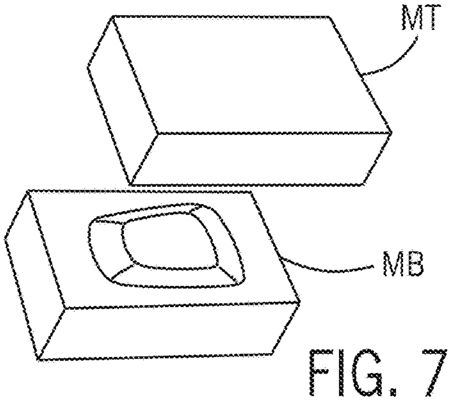
Figure 7E:
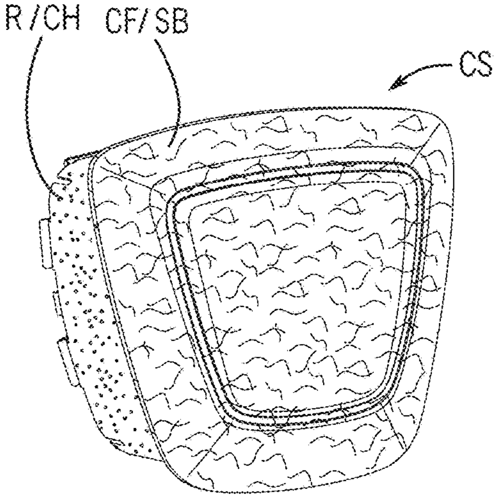
Figure 7F:
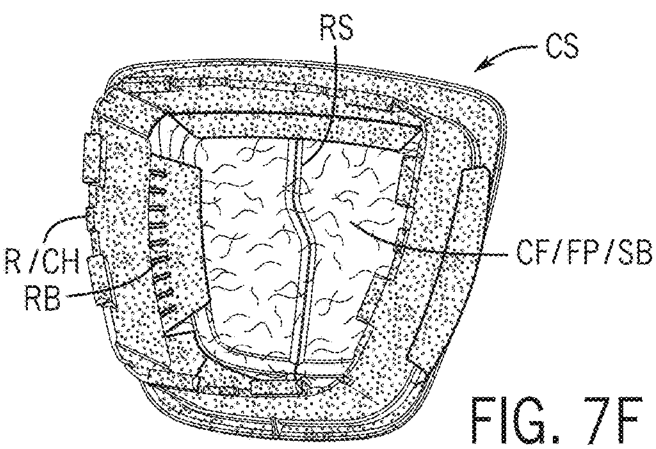
Figure 8A:
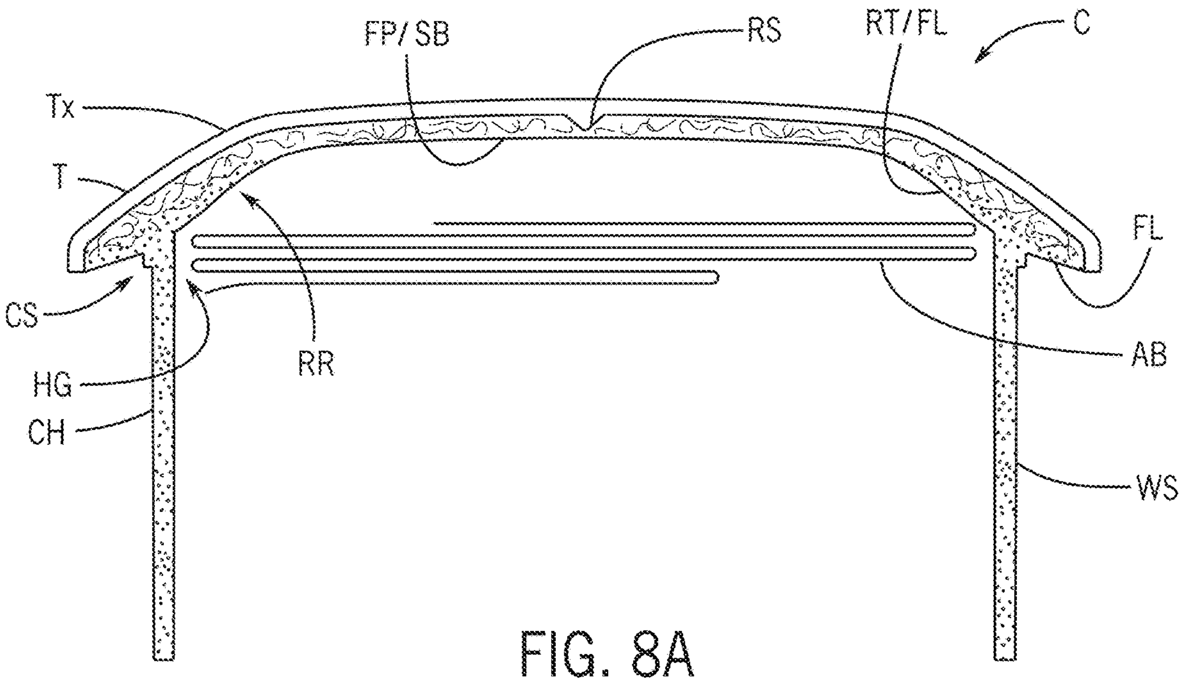
FIGS. 8A and 8B are schematic section views of a deployment of an airbag from a vehicle interior component according to an exemplary embodiment.
Figure 8B:
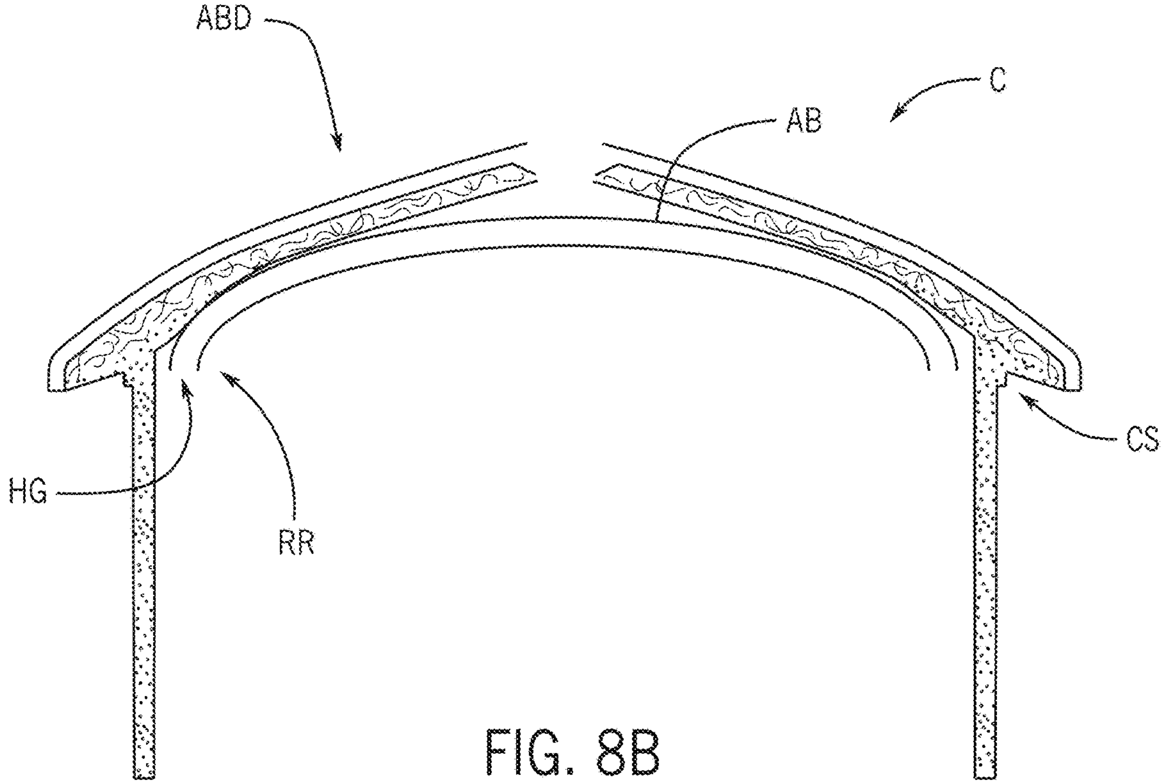
Figure 9A:
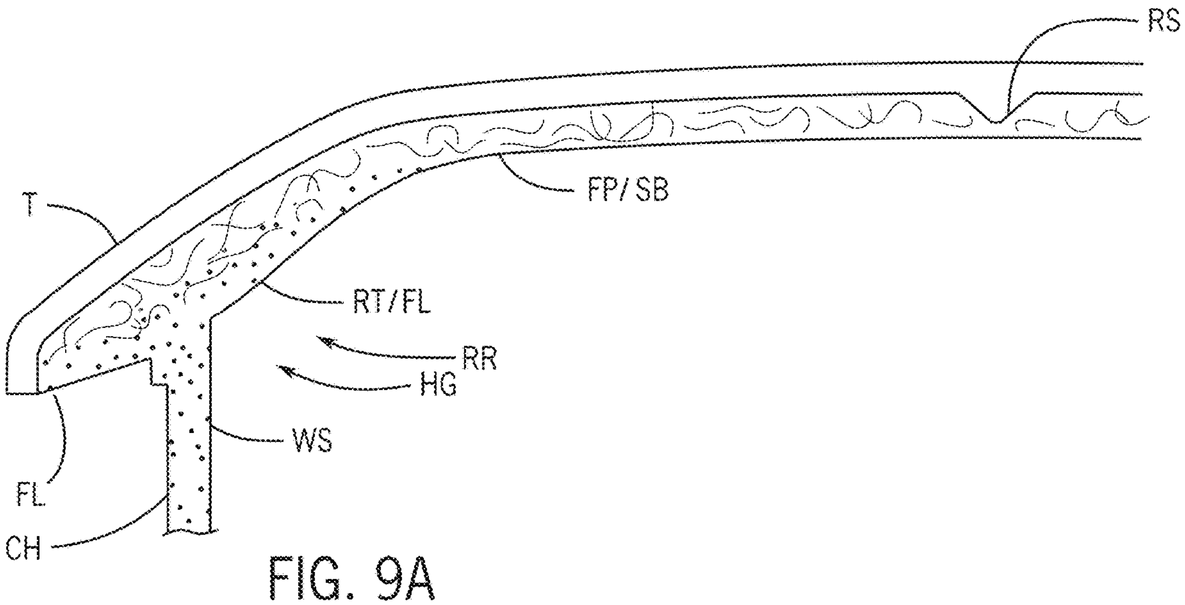
FIGS. 9A and 9B are schematic partial section views of a component for a vehicle interior according to an exemplary embodiment.
Figure 9B:
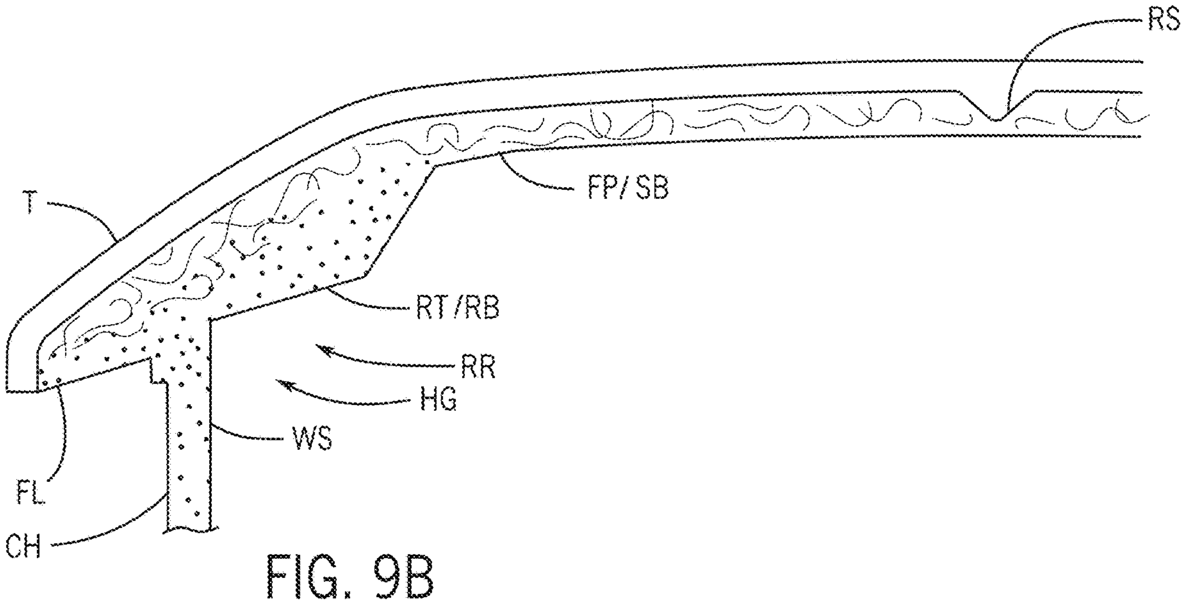
Figure 10A:
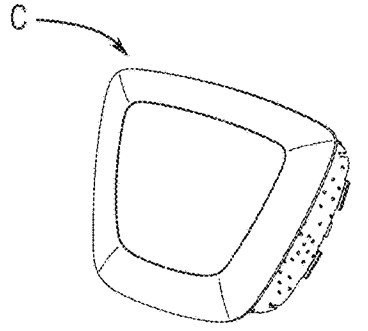
FIG. 10A is a schematic perspective view of a component for a vehicle interior according to an exemplary embodiment.
Figure 10B:
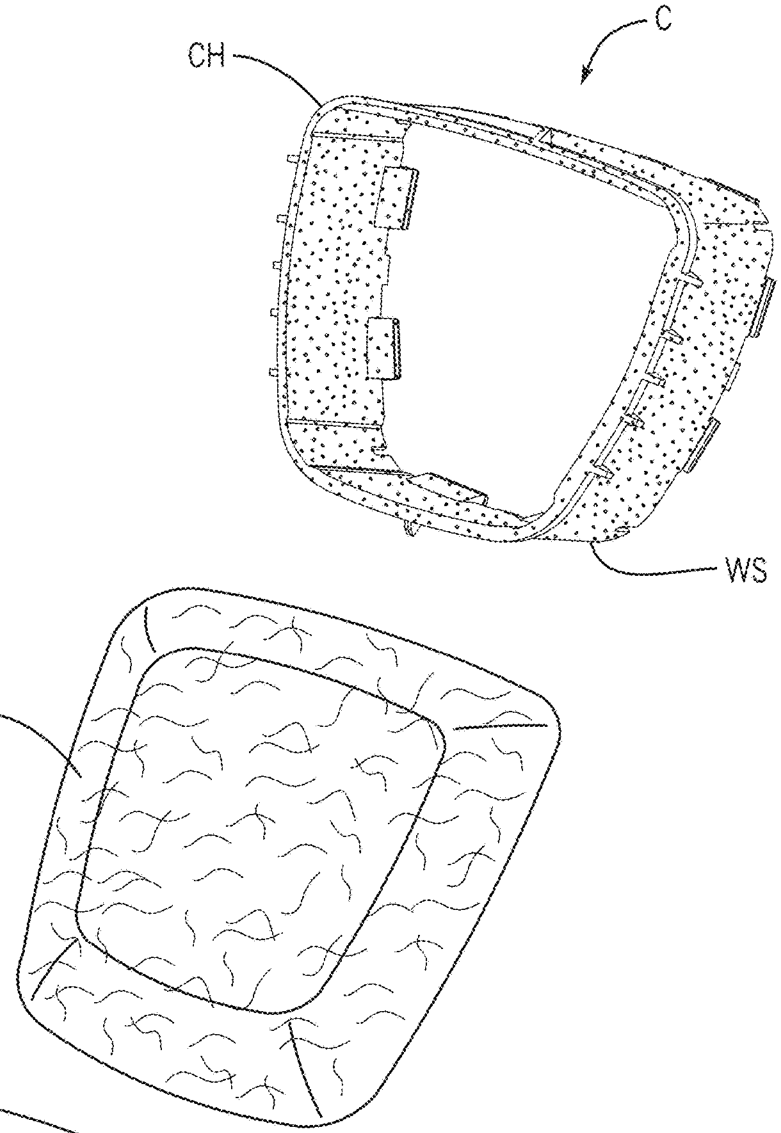
FIG. 10B is a schematic exploded perspective view of a component for a vehicle interior according to an exemplary embodiment.
Figure 10B:
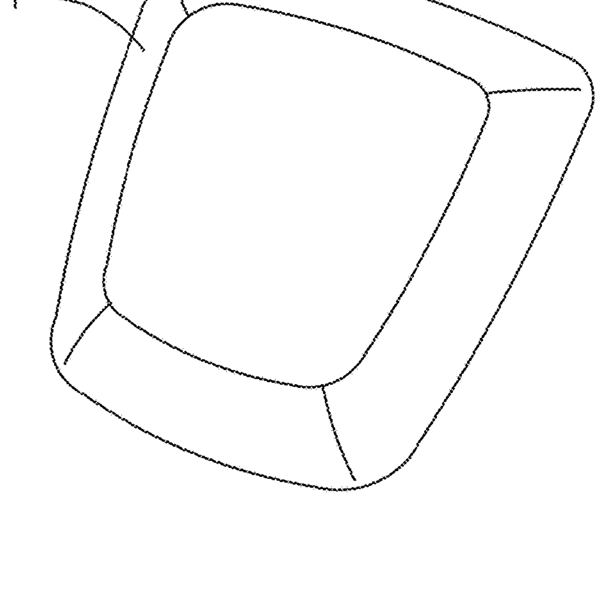
Figure 11A:
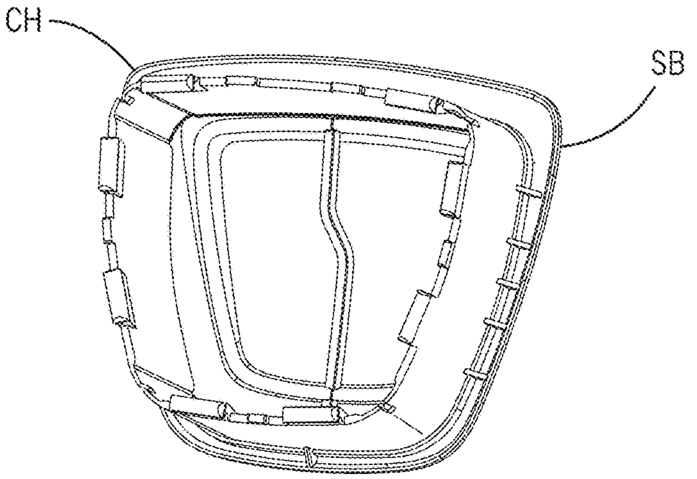
FIG. 11A is a schematic perspective view of a substrate and an airbag chute of a component for a vehicle interior according to an exemplary embodiment.
Figure 11B:
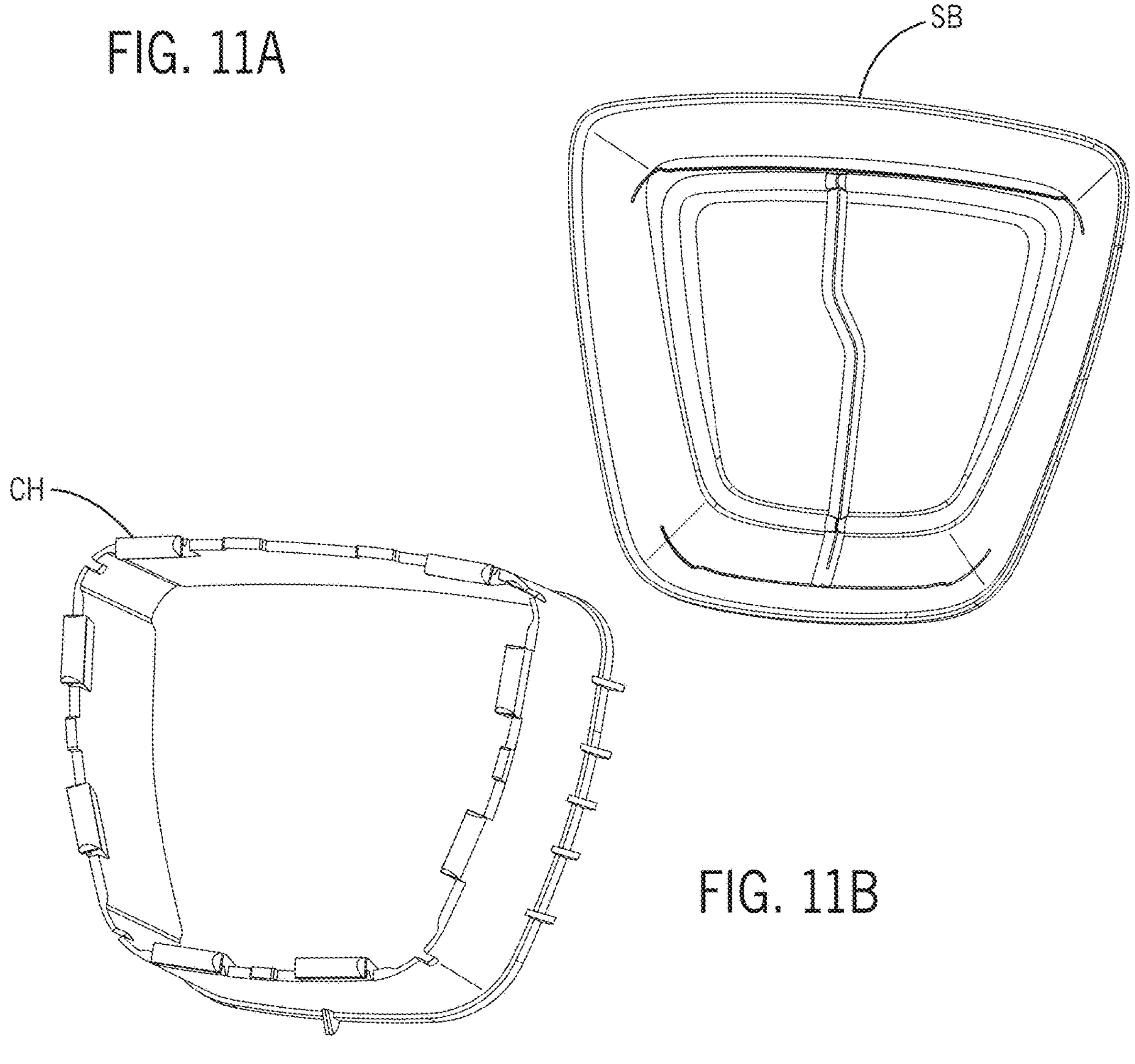
FIG. 11B is a schematic exploded perspective view of a substrate and an airbag chute of a component for a vehicle interior according to an exemplary embodiment.
Figure 12:
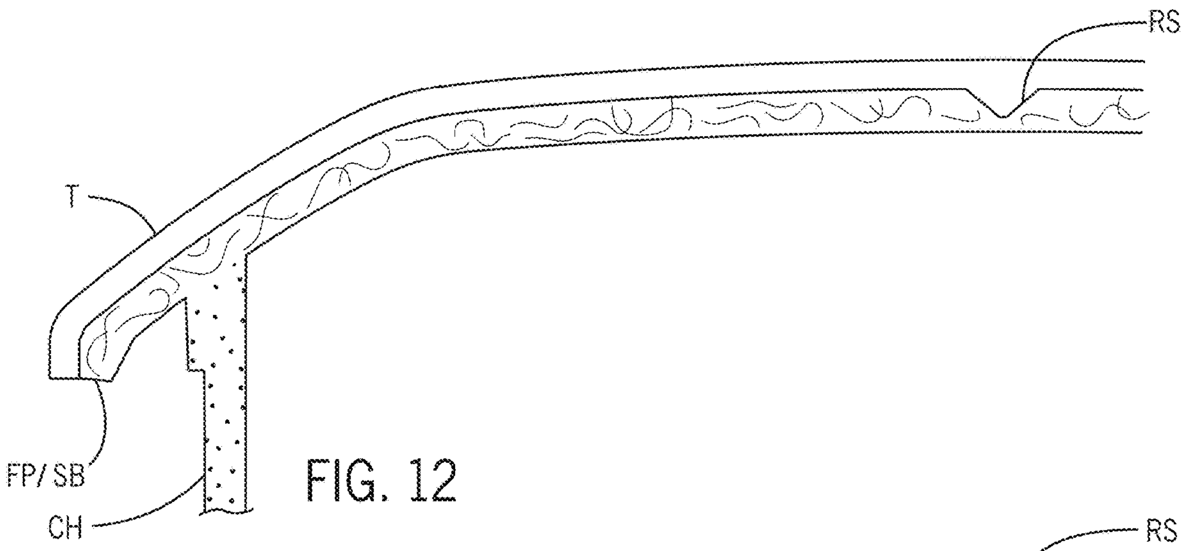
FIG. 12 is a schematic partial section view of a component for a vehicle interior according to an exemplary embodiment.
Figure 13:
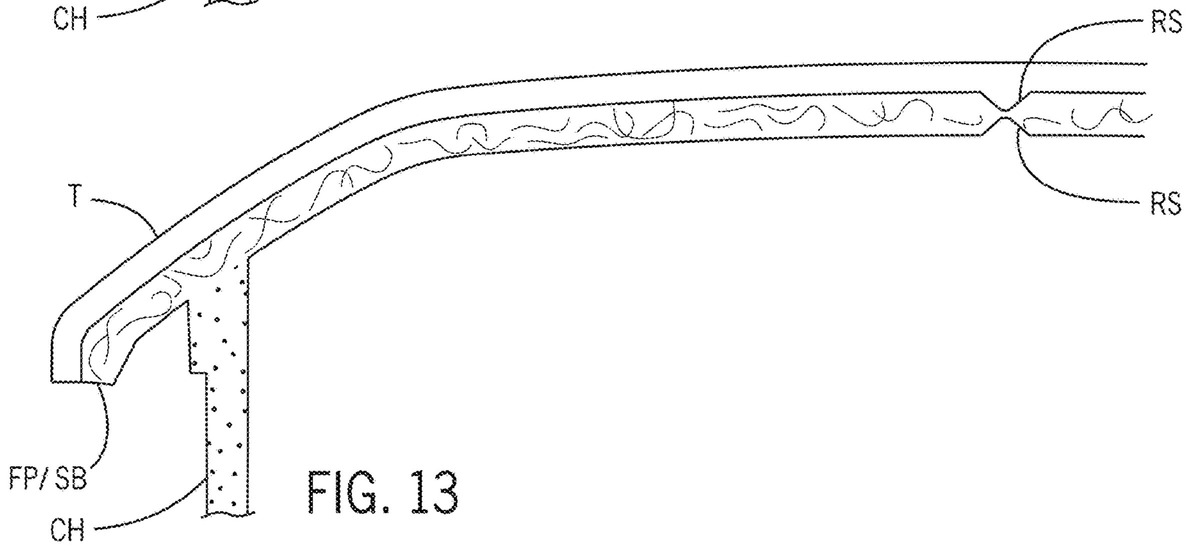
FIG. 13 is a schematic partial section view of a component for a vehicle interior according to an exemplary embodiment.
Figure 14:
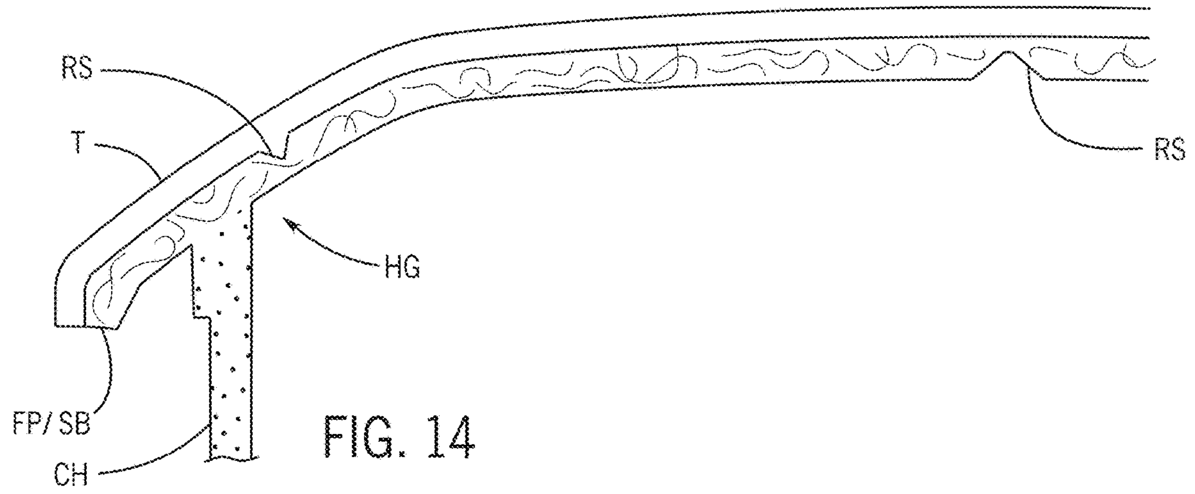
FIG. 14 is a schematic partial section view of a component for a vehicle interior according to an exemplary embodiment.
Figure 15:
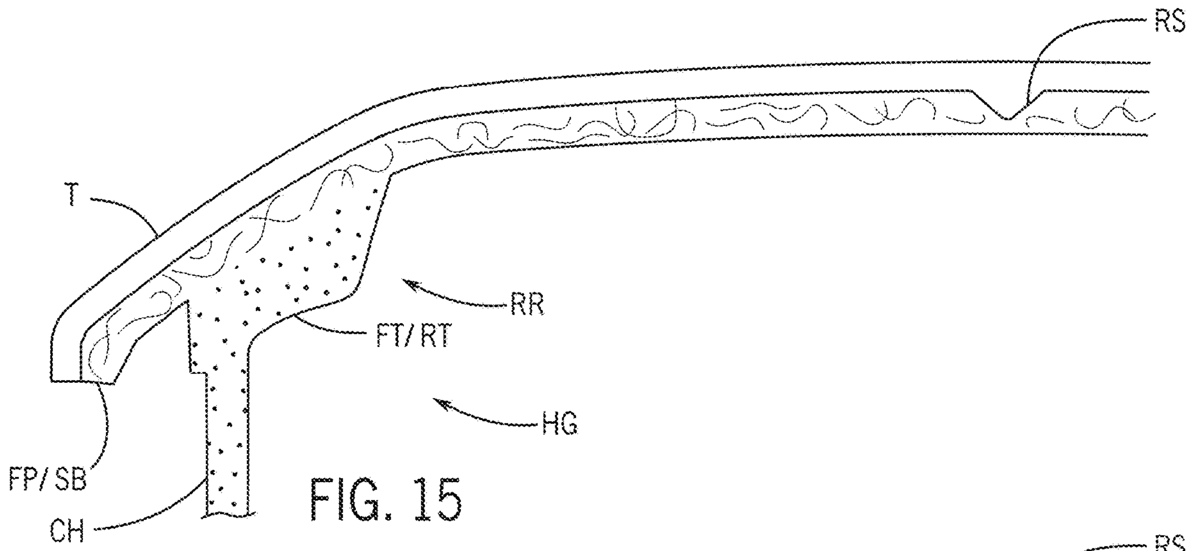
FIG. 15 is a schematic partial section view of a component for a vehicle interior according to an exemplary embodiment.
Figure 16:
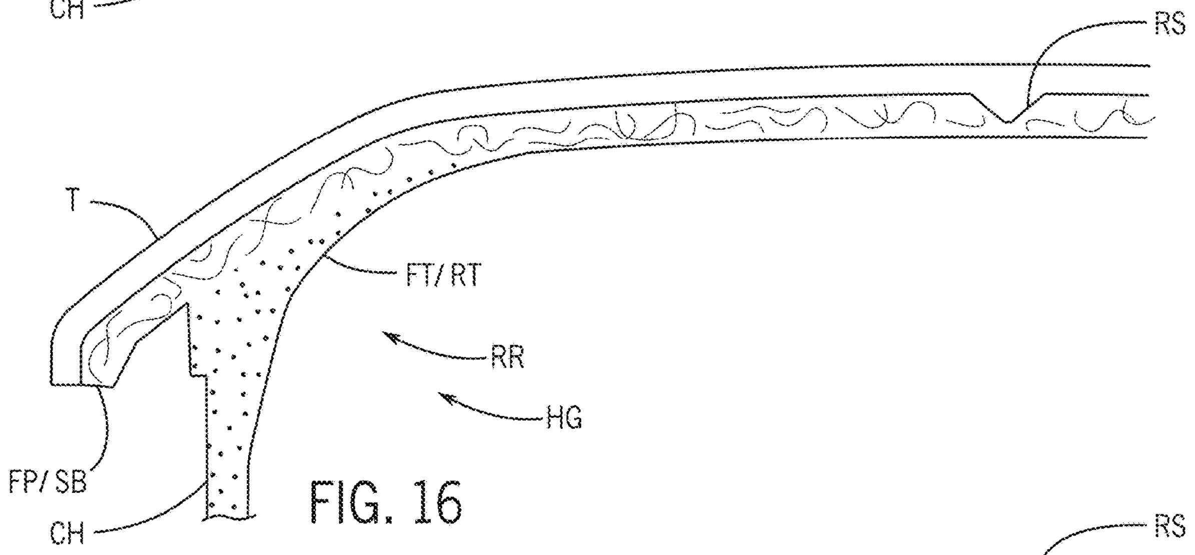
FIG. 16 is a schematic partial section view of a component for a vehicle interior according to an exemplary embodiment.
Figure 17:
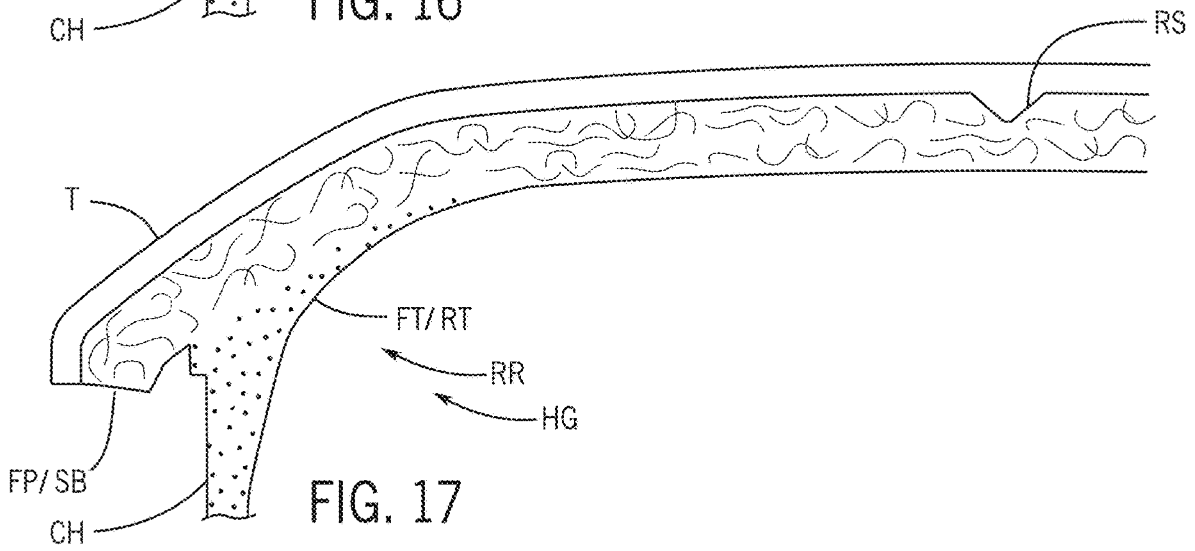
FIG. 17 is a schematic partial section view of a component for a vehicle interior according to an exemplary embodiment.
Figure 18:
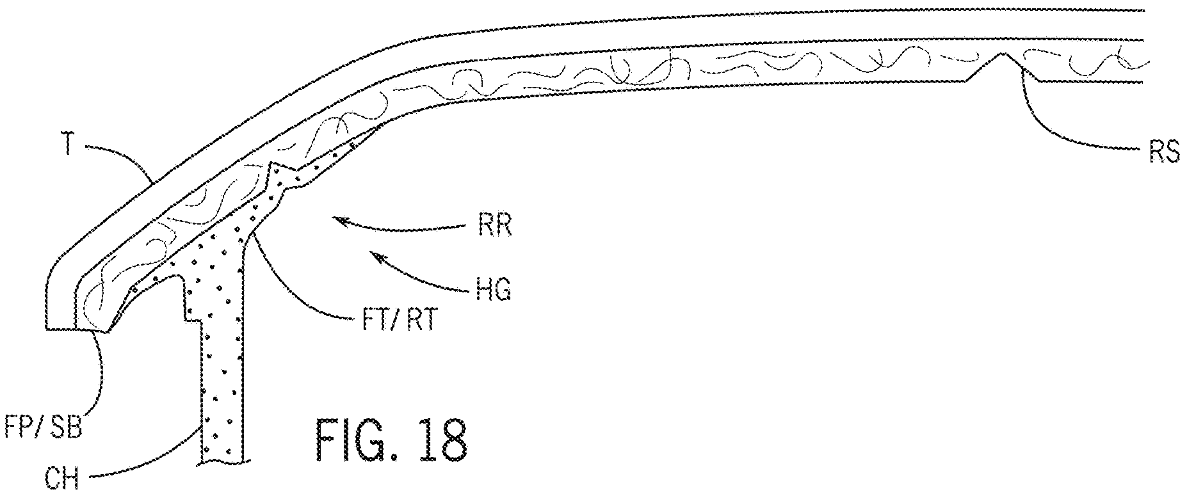
FIG. 18 is a schematic partial section view of a component for a vehicle interior according to an exemplary embodiment.
Figure 19:
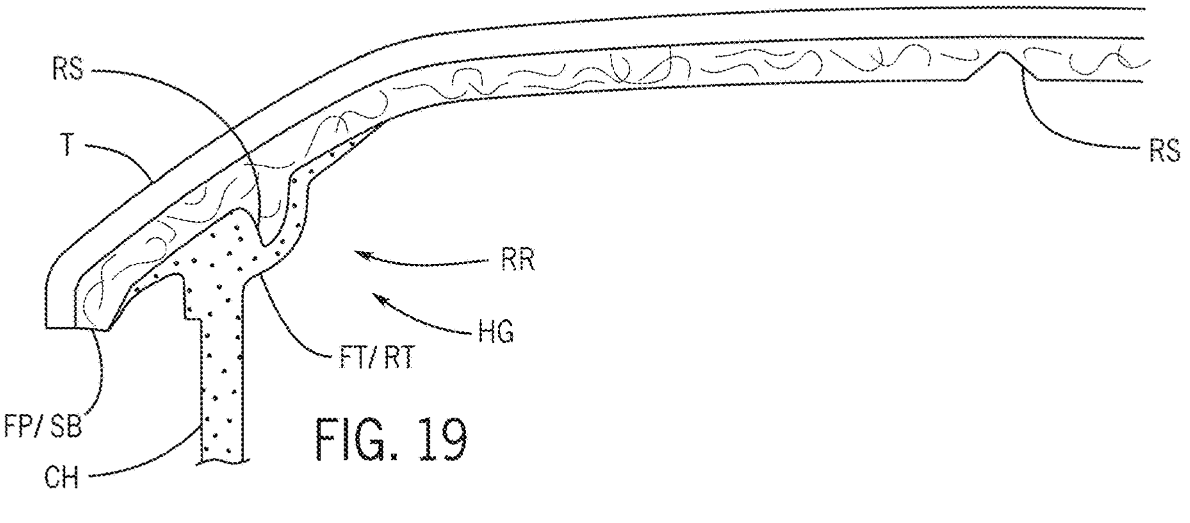
FIG. 19 is a schematic partial section view of a component for a vehicle interior according to an exemplary embodiment.
Figure 20:
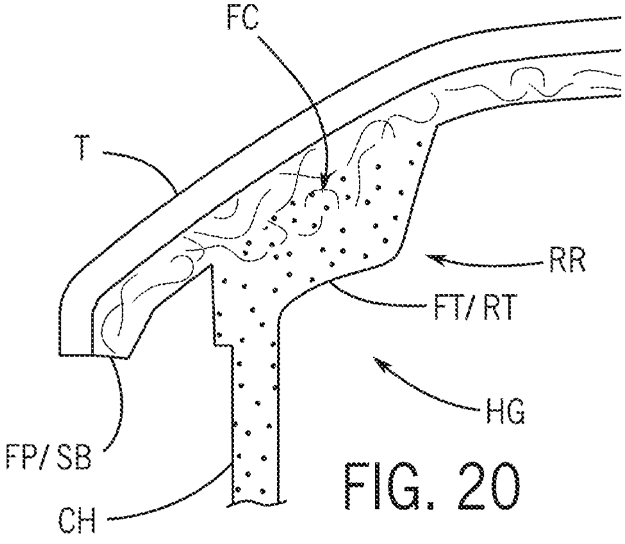
FIG. 20 is a schematic partial section view of a component for a vehicle interior according to an exemplary embodiment.
Figure 21:
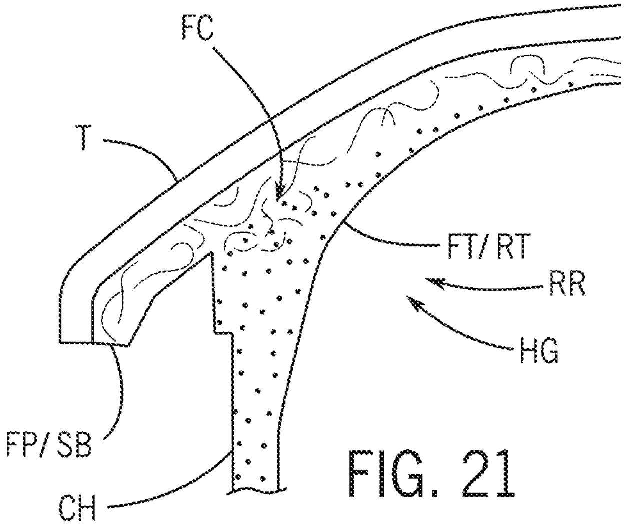
FIG. 21 is a schematic partial section view of a component for a vehicle interior according to an exemplary embodiment.
Figure 22:
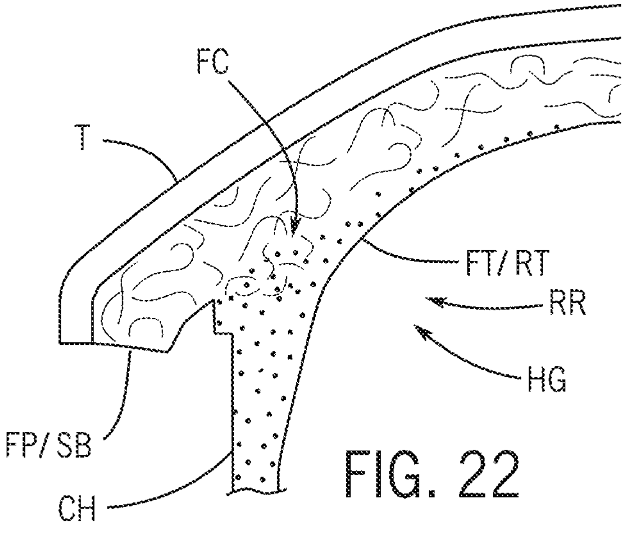
FIG. 22 is a schematic partial section view of a component for a vehicle interior according to an exemplary embodiment.
Figure 23A:
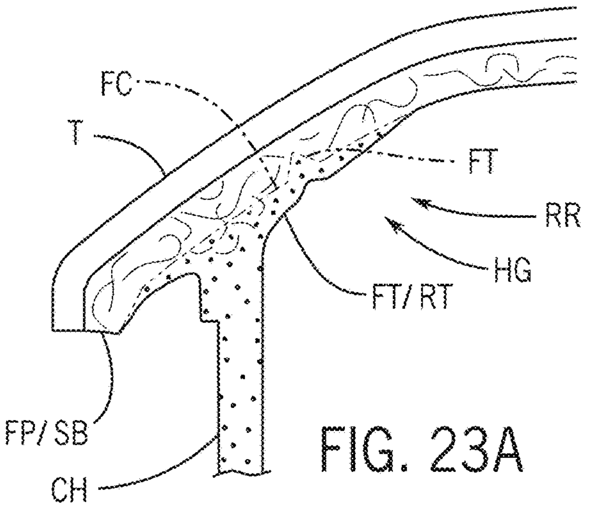
FIG. 23A is a schematic partial section view of a component for a vehicle interior according to an exemplary embodiment.
Figure 23B:
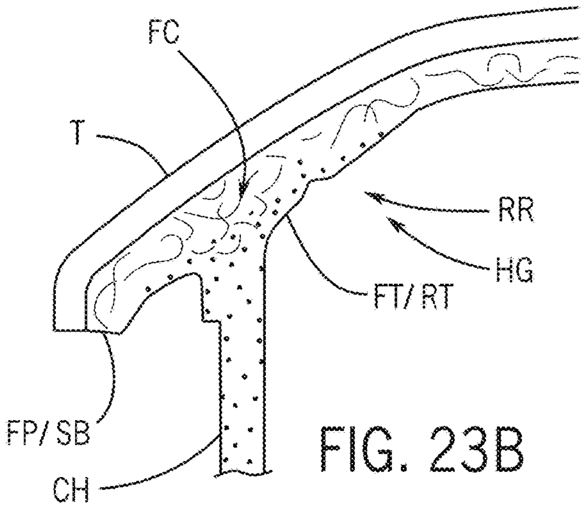
FIG. 23B is a schematic partial section view of a component for a vehicle interior according to an exemplary embodiment.
Figure 24A:
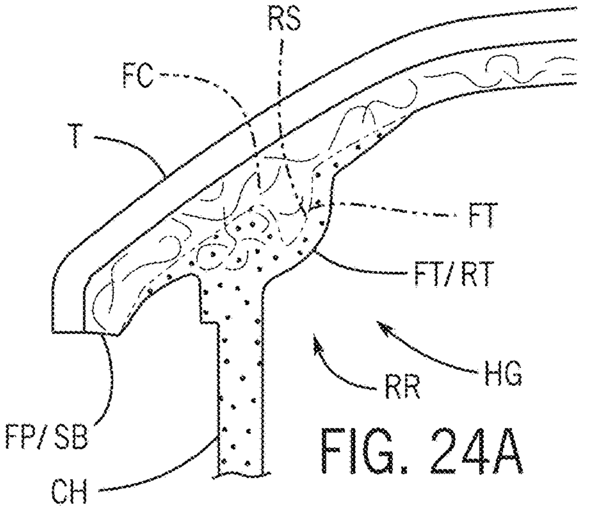
FIG. 24A is a schematic partial section view of a component for a vehicle interior according to an exemplary embodiment.
Figure 24B:
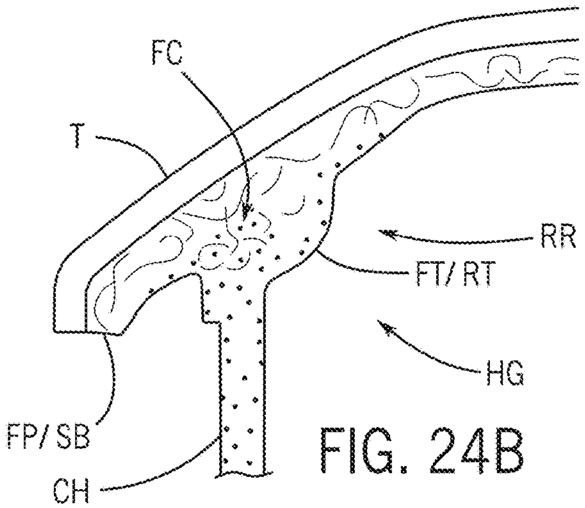
FIG. 24B is a schematic partial section view of a component for a vehicle interior according to an exemplary embodiment.

According to an exemplary embodiment as shown schematically in FIG. 7C, consolidated mat CM may be heated in an oven VN. As shown schematically in FIG. 7D, the heated consolidated mat may be transferred into a mold having a mold top MT and a mold bottom MB. According to an exemplary embodiment as shown schematically in FIGS. 7E and 5F, a compression-formed component CF shown as a substrate SB may be produced by a process of compression forming consolidated mat CM. The process may comprise compression forming. The process may also comprise injection molding. According to an exemplary embodiment, the heated consolidated mat may be further compressed into a fiber panel; plastic resin may be injected on the back side of fiber panel to form an ancillary feature.

According to an exemplary embodiment as shown schematically in the FIGURES, a component for a vehicle interior configured for deployment of an airbag into the vehicle interior may comprise (a) a structural substrate configured to provide (1) a door upon deployment of the airbag to facilitate deployment of the airbag and (2) a hinge area for the door; (b) an airbag chute coupled to the structural substrate; and (c) a reinforcement configured to reinforce the hinge area during movement of the door during deployment of the airbag. The reinforcement may be configured to secure the at least one door to the structural substrate during deployment of the airbag. The reinforcement may be configured to retain the door to the airbag chute. The reinforcement may comprise a tether; the tether may comprise material of the structural substrate and/or material of the airbag chute. The reinforcement may comprise a shoulder of the airbag chute at the hinge area of the structural substrate. (See FIGS. 15 and 20.) The reinforcement may comprise a tapered wall of the airbag chute extended from the hinge area of the structural substrate along an underside of the structural substrate. (See FIGS. 16, 17, 21 and 22.) The tapered wall of the airbag chute may be formed by molding the airbag chute on the structural substrate. (See FIGS. 16, 17, 21 and 22.) The reinforcement may comprise a protrusion of the airbag chute configured to fit in an indentation of the structural substrate. (See FIGS. 18, 23A and 23B.) The protrusion of the airbag chute may be formed by molding the airbag chute into the indentation of the structural substrate. (See FIGS. 18, 23A and 23B.) The airbag chute may comprise an indentation at the hinge area configured to facilitate movement of the door during deployment of the airbag. (See FIG. 19.) The indentation of the airbag chute may be formed by molding the airbag chute on a protrusion of the structural substrate. (See FIG. 19.) The reinforcement may comprise a protrusion of the structural substrate configured to fit in an indentation of the airbag chute. (See FIGS. 19, 24A and 24B.) The reinforcement may comprise an interface; the interface may comprise a composite material; the composite material may comprise material of the airbag chute and material of the structural substrate. (See FIGS. 20-22, 23A-23B and 24A-24B.) The interface may be formed by molding the airbag chute on the structural substrate. (See FIGS. 20-22, 23A-23B and 24A-24B.) Material of the airbag chute and material of the structural substrate may intermingle during formation of the airbag chute on the structural substrate. (See FIGS. 20-22, 23A-23B and 24A-24B.) The reinforcement may comprise a rounded feature molded into the structural substrate. (See FIGS. 19, 24A and 24B.) The airbag chute may comprise a set of tabs at the hinge area of the structural substrate. (See FIGS. 28A and 28B.) The set of tabs may comprise a first tab separated from a second tab by material of the structural substrate. The set of tabs may be configured to facilitate flexure of the door. The air bag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat in a mold. The fiber mat may be compressed to a first thickness; a portion of the fiber mat may be compressed to a second thickness less than the first thickness adjacent the hinge area. The fiber mat may be compressed to a thickness of between 1.0 mm and 1.7 mm. The fiber mat may be compressed to a thickness of between 1.7 mm and 1.8 mm. The structural substrate may comprise an injection molded component. The component may comprise a cover comprising an outer surface and an inner surface opposite the outer surface coupled to the structural substrate. The cover may be molded on the structural substrate. The structural substrate may comprise an indentation configured to facilitate movement of the door during deployment of the airbag. (See FIG. 14.) The cover may be configured to fit in the indentation of the structural substrate. (See FIG. 14.) The indentation of the structural substrate may be adjacent the hinge area. (See FIG. 14.) The structural substrate may comprise an indentation configured to facilitate rupture of the structural substrate to form the door upon deployment of the airbag to facilitate deployment of the airbag. (See FIGS. 12-14.) The cover may be configured to fit in the indentation of the structural substrate. (See FIGS. 12 and 13.) The indentation may comprise a first indentation on an underside of the structural substrate and a second indentation; the cover may be configured to fit in the second indentation. (See FIG. 13.) The indentation may be configured to form a tear seam to form the door. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The structural substrate may comprise an underside configured for contact from the airbag to facilitate deployment of the airbag. The underside of the structural substrate may be configured to support an airbag module comprising the airbag. The underside of the structural substrate may comprise at least one feature; the at least one feature may comprise at least one of (a) a resin; (b) a thermoplastic resin; (c) polypropylene; (d) acrylonitrile butadiene styrene; (e) polycarbonate. The component may comprise at least one of an instrument panel; a door panel; a trim panel; a trim component.

According to an exemplary embodiment as shown schematically in FIGS. 25A, 25B, 26A, 26B and 27A-27D, a component C for a vehicle interior configured for deployment of an airbag AB into the vehicle interior may comprise a structural substrate SB; an airbag chute CH coupled to the structural substrate; and a door ABD configured to facilitate deployment of the airbag. The airbag chute may be configured to provide a hinge HG for the door. The airbag chute may be configured to secure the door during deployment of the airbag. The airbag chute may be formed by molding the airbag chute on the structural substrate. The door may comprise material of the structural substrate and material of the airbag chute. The door may comprise a leading edge opposite the hinge, a top edge and a bottom edge. The structural substrate may be configured to provide the leading edge of the door. The structural substrate may be configured to provide the top edge of the door and the bottom edge of the door. The structural substrate may comprise a front side providing a surface and a rear side configured for contact from the airbag to establish an opening for deployment of the airbag. The structural substrate may comprise a recess RS formed as a depression in the rear side of the structural substrate to establish the opening for deployment of the airbag. The front side of the structural substrate may comprise a substantially continuous surface opposite the recess. The airbag chute may comprise a wall extending from the hinge of the airbag chute along the rear side of the structural substrate. The wall of the airbag chute may be formed by molding the airbag chute on the structural substrate. The door may comprise an interface NT between the structural substrate and the airbag hinge. The interface may comprise a composite material; the composite material may comprise material of the airbag chute and material of the structural substrate. The interface may be formed by molding the airbag chute on the structural substrate. Material of the airbag chute and material of the structural substrate may intermingle during formation of the airbag chute on the structural substrate. The structural substrate may be coupled to the airbag chute at a butt joint. The structural substrate may comprise a first thickness and a second thickness greater than the first thickness. The second thickness may comprise a thickness along an edge of the structural substrate at an interface with the airbag chute. The airbag chute may comprise a thickness at the interface; the thickness of the airbag chute may be greater than the second thickness of the structural substrate. The second thickness may be configured for bonding of the structural substrate and the airbag chute. The first thickness may be configured for an edge of the door. The structural substrate may comprise a void (VD); the airbag chute may comprise a protrusion configured to fit in the void in the structural substrate. The protrusion of the airbag chute may be configured to adhere the structural substrate to the airbag chute. The airbag chute may comprise a TPO material. The structural substrate may comprise at least one of (a) a compression-formed component; (b) a generally rigid fiber mat; (c) a panel comprised at least partially of fibers; (d) a fiber panel. The structural substrate may be formed by compressing a fiber mat (FM) in a mold. The fiber mat may be compressed to a first thickness; a portion of the fiber mat may be compressed to a second thickness greater than the first thickness adjacent the airbag chute. The structural substrate may comprise an injection molded component. The component may comprise a cover (T) comprising an outer surface and an inner surface opposite the outer surface coupled to the airbag chute. The inner surface of the cover may be coupled to the structural substrate. The component may comprise a cover (T) molded on the airbag chute. The cover may be molded on the structural substrate. The component may comprise a cover (T) configured to cover the structural substrate and the airbag chute. The cover may comprise an injection molded thermoplastic material. The cover may comprise at least one of (a) a TPE material; (b) a TPV material; (c) a PU material. The cover may be configured to provide an exterior surface of the component. The cover may be configured to provide a surface of the component visible in the vehicle interior. The structural substrate may comprise an underside configured for contact from the airbag to facilitate deployment of the airbag. The airbag chute may comprise a wall extending from the hinge configured for contact from the airbag to facilitate deployment of the airbag. At least one of the structural substrate and/or the airbag chute may be configured to support an airbag module comprising the airbag. The airbag chute and the hinge may comprise a unitary structure. The hinge may be formed as a unitary part of the airbag chute. The hinge may comprise at least one rib (RB) or protrusion extending from a rear surface of the airbag chute away from the interior of the vehicle. The hinge may comprise at least one rib (RB) or protrusion configured to reinforce the hinge. The hinge may comprise at least one rib (RB) or protrusion extending in a direction generally perpendicular to the hinge. The airbag chute may comprise a first wall, a second wall opposite the first wall, a first flange extending from the first wall toward the second wall, and a second wall extending from the second wall toward the first wall. The hinge may comprise a flange of the airbag chute extending from a wall of the airbag chute. The component may comprise at least one of an instrument panel; a door panel; a trim panel; a trim component.

According to an exemplary embodiment as shown schematically in the FIGURES, a method of manufacturing a component configured to provide a door upon deployment of an airbag to facilitate deployment of the airbag into a vehicle interior may comprise (a) forming a structural substrate; (b) forming an airbag chute configured to be coupled to the structural substrate; and (c) forming a reinforcement configured to reinforce a hinge area of the structural substrate during movement of the door during deployment of the airbag. The reinforcement may be configured to secure the door to the structural substrate during deployment of the airbag. The reinforcement may be configured to retain the door to the airbag chute. The reinforcement may comprise material of the structural substrate and/or material of the airbag chute. The step of forming the reinforcement may comprise forming a shoulder of the airbag chute at the hinge area of the structural substrate. (See FIGS. 15 and 20.) The step of forming the reinforcement may comprise forming a tapered wall of the airbag chute extending from the hinge area of the structural substrate along an underside of the structural substrate. (See FIGS. 16, 17, 21 and 22.) The step of forming the structural substrate may comprise forming an indentation in the structural substrate; the step of forming the reinforcement may comprise forming a protrusion of the airbag chute in the indentation of the structural substrate. (See FIGS. 18, 23A and 23B.) The step of forming the airbag chute may comprise forming an indentation at the hinge area of the structural substrate configured to facilitate movement of the door during deployment of the airbag. (See FIG. 19.) The step of forming the indentation at the hinge area of the structural substrate may comprise molding the airbag chute on a protrusion of the structural substrate. (See FIG. 19.) The step of forming the structural substrate may comprise forming a protrusion in the structural substrate; the step of forming the airbag chute may comprise forming an indentation in the airbag chute; the reinforcement may comprise the protrusion of the structural substrate fit in the indentation of the airbag chute. (See FIGS. 19, 24A and 24B.) The step of forming the reinforcement may comprise forming the reinforcement from a composite material; the composite material may comprise material of the airbag chute and material of the structural substrate. (See FIGS. 20-22, 23A-23B and 24A-24B.) Material of the structural substrate and material of the airbag chute may intermingle during forming of the airbag chute. (See FIGS. 20-22, 23A-23B and 24A-24B.) Forming the reinforcement may comprise forming a rounded feature into the structural substrate. (See FIGS. 19, 24A and 24B.) Forming the airbag chute may comprise forming a set of tabs at the hinge area of the structural substrate. (See FIGS. 28A and 28B.) The step of forming the structural substrate may comprise compressing a consolidated mat between a first surface of a mold and a second surface of the mold to form the consolidated mat into a compression-formed component having a shape corresponding to a first contour of the first surface and a second contour of the second surface. The step of forming the airbag chute may comprise molding the airbag chute onto the compression-formed component. The step of forming the airbag chute may comprise molding the airbag chute and welding the airbag chute onto the compression-formed component. The step of forming the structural substrate may comprise compressing a fiber mat in a mold. The step of forming the structural substrate may comprise compressing a first portion of a fiber mat in a mold to a first thickness and compressing a second portion of the fiber mat in the mold to a second thickness less than the first thickness adjacent the hinge area of the structural substrate. The step of forming the structural substrate may comprise injection molding the structural substrate. The method may comprise a step of molding a cover on the structural substrate. The step of molding the cover on the structural substrate may comprise molding the cover in an indentation in the structural substrate. (See FIG. 14.) The indentation of the structural substrate may be adjacent the hinge area of the structural substrate. (See FIG. 14.) The indentation of the structural substrate may be configured to facilitate rupture of the structural substrate to form the door upon deployment of the airbag to facilitate deployment of the airbag. (See FIGS. 12-14.) The step of molding the cover on the structural substrate may comprise injection molding thermoplastic material. The thermoplastic material may comprise at least one of (a) a TPE material; (b) a TPV material; (c) a PU material. The structural substrate may comprise an underside configured for contact from the airbag to facilitate deployment of the airbag. The method may comprise a step of assembling an airbag module comprising the airbag to the underside of the structural substrate. The method may comprise a step of forming at least one feature on the underside of the structural substrate from at least one of (a) a resin; (b)

a thermoplastic resin; (c) polypropylene; (d) acrylonitrile butadiene styrene; (e) polycarbonate.

According to an exemplary embodiment as shown schematically in FIG. 29, a process to manufacture a component for a vehicle interior may comprise providing a substrate (fiber panel), applying resin for a structure (housing) with a reinforcement section/feature, forming a composite structure (of substrate and structure) with a reinforcement area at a hinge area, applying a cover to the substrate, and providing a component/panel with structure and reinforcement area.

According to an exemplary embodiment as shown schematically in FIG. 30, a process to manufacture a component for a vehicle interior may comprise providing a fiber panel, applying resin for a housing with a reinforcement section/feature, forming a structural substrate with a reinforcement area at a hinge area, applying a cover, and providing a component/panel with structure and reinforcement area.

According to an exemplary embodiment as shown schematically in FIG. 31A, a process to manufacture a component for a vehicle interior may comprise providing a substrate (fiber panel), applying resin for a structure (housing) with a reinforcement section/feature, forming a composite structure (of substrate and structure) with a reinforcement area at a hinge area, and providing a component/panel with structure and reinforcement area.

According to an exemplary embodiment as shown schematically in FIG. 31B, a process to manufacture a component for a vehicle interior may comprise providing a fiber panel, applying resin for a housing with a reinforcement section/feature, forming a structural substrate with a reinforcement area at a hinge area, and providing a component/panel with structure and reinforcement area.

According to an exemplary embodiment as shown schematically in FIG. 31C, a process to manufacture a component for a vehicle interior may comprise providing a fiber panel, applying resin for a housing with a molded feature, forming a structural substrate with a molded feature reinforcement area at a hinge area, and providing a component/panel with a structure and a reinforcement area.

According to an exemplary embodiment as shown schematically in FIG. 31D, a process to manufacture a component for a vehicle interior may comprise providing a fiber panel, applying resin for a housing with a reinforcement section/feature, forming a structural substrate with a reinforcement area at a hinge area, providing a cover on a composite structure, and providing a component/panel with the cover and a structure and the reinforcement area for the hinge area.

According to an exemplary embodiment as shown schematically in FIG. 32A, a process to manufacture a component for a vehicle interior may comprise providing a substrate (compression formed panel/fiber panel), applying resin for a structure (housing/airbag chute) with a reinforcement section/feature, forming a composite structure (of structure/housing molded onto/into/with substrate) with the reinforcement section/feature at a reinforcement area at a hinge area for formation of a door/opening for deployment of an airbag, applying a cover for the composite structure (to substrate), and providing a component/panel with a structure and the reinforcement area at the hinge area.

According to an exemplary embodiment as shown schematically in FIG. 32B, a process to manufacture a component for a vehicle interior may comprise providing a substrate (compression formed panel/fiber panel), applying resin for molding of a structure (housing) with a reinforcement section/feature, forming a composite structure (of substrate and structure) with a reinforcement area at a hinge area, applying a cover for the composite structure (to substrate), and providing a component/panel with the structure and the reinforcement area and the cover.

Figure 33A:
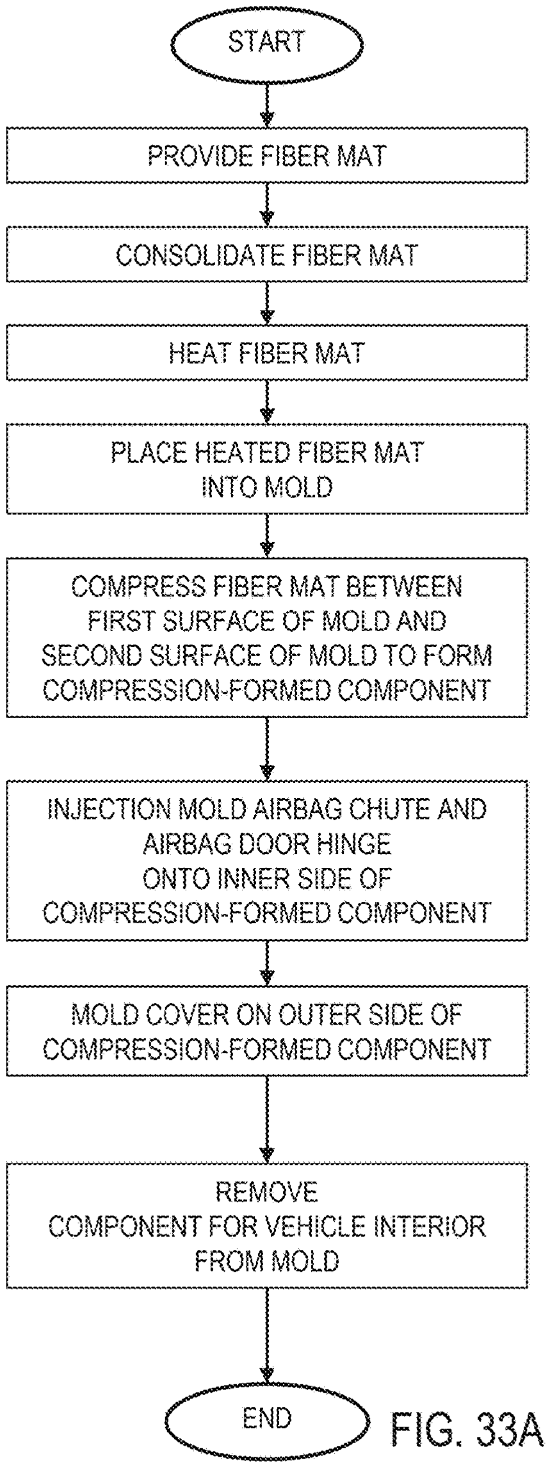
FIG. 33A is a schematic flow diagram of a process to manufacture a component for a vehicle interior according to an exemplary embodiment.

According to an exemplary embodiment as shown schematically in FIG. 33A, a process to manufacture a component for a vehicle interior may comprise providing a fiber mat, consolidating the fiber mat, heating the fiber mat, placing the heated fiber mat into a mold, compressing the fiber mat between a first surface of the mold and a second surface of the mold to form a compression-formed component, injection molding an airbag chute and an airbag door hinge onto an inner side of the compression-formed component, molding a cover on an outer side of the compression-formed component, and removing the component for a vehicle interior from the mold.

Figure 33B:
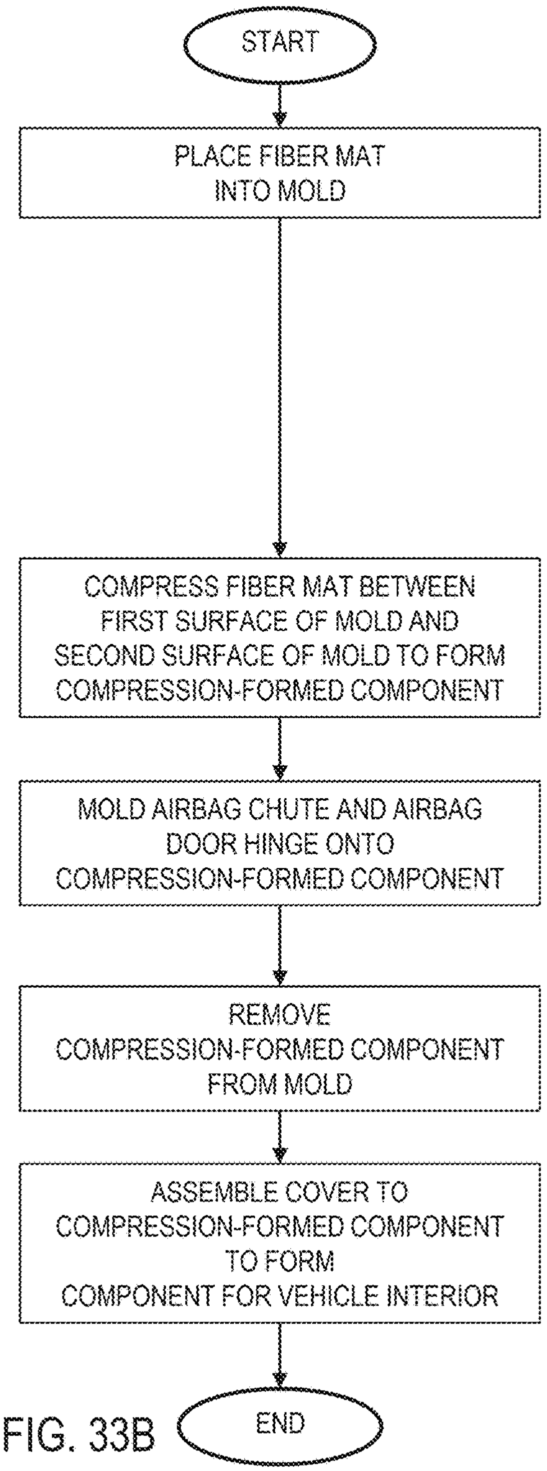
FIG. 33B is a schematic flow diagram of a process to manufacture a component for a vehicle interior according to an exemplary embodiment.

According to an exemplary embodiment as shown schematically in FIG. 33B, a process to manufacture a component for a vehicle interior may comprise placing a fiber mat into a mold, compressing the fiber mat between a first surface of the mold and a second surface of the mold to form a compression-formed component, molding an airbag chute and an airbag door hinge onto the compression-formed component, removing the compression-formed component from the mold, and assembling a cover to the compression-formed component to form the component for a vehicle interior.

Figure 34A:
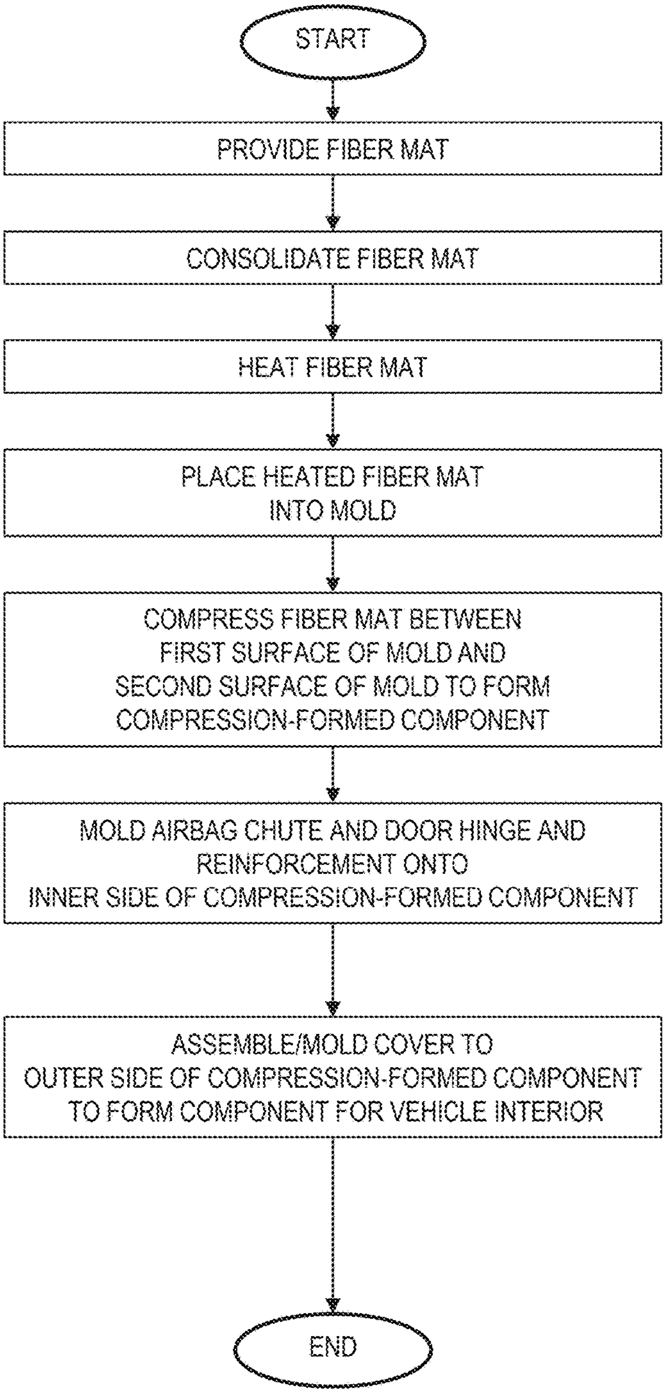
FIG. 34A is a schematic flow diagram of a process to manufacture a component for a vehicle interior according to an exemplary embodiment.

According to an exemplary embodiment as shown schematically in FIG. 34A, a process to manufacture a component for a vehicle interior may comprise providing a fiber mat, consolidating the fiber mat, heating the fiber mat, placing the heated fiber mat into a mold, compressing the fiber mat between a first surface of the mold and a second surface of the mold to form a compression-formed component, molding an airbag chute and a door hinge and a reinforcement onto an inner side of the compression-formed component, and assembling/molding a cover to an outer side of the compression-formed component to form the component for a vehicle interior.

Figure 34B:
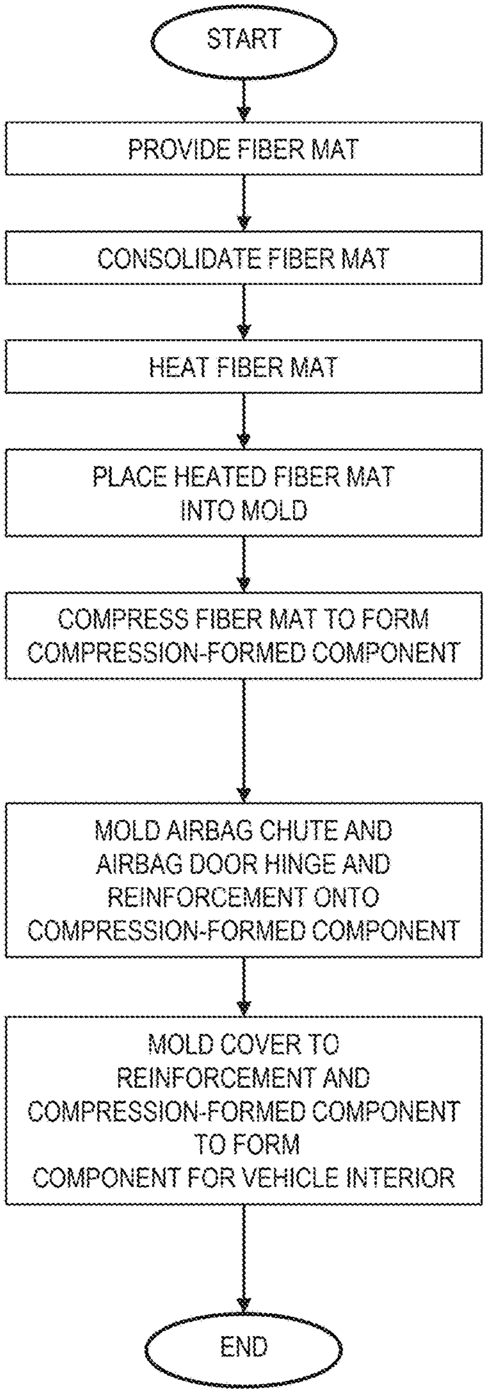
FIG. 34B is a schematic flow diagram of a process to manufacture a component for a vehicle interior according to an exemplary embodiment.

According to an exemplary embodiment as shown schematically in FIG. 34B, a process to manufacture a component for a vehicle interior may comprise providing a fiber mat, consolidating the fiber mat, heating the fiber mat, placing the heated fiber mat into a mold, compressing the fiber mat to form a compression-formed component, molding an airbag chute and an airbag door hinge and a reinforcement onto the compression-formed component, and molding a cover to the reinforcement and the compression-formed component to form the component for a vehicle interior.

Figure 35A:
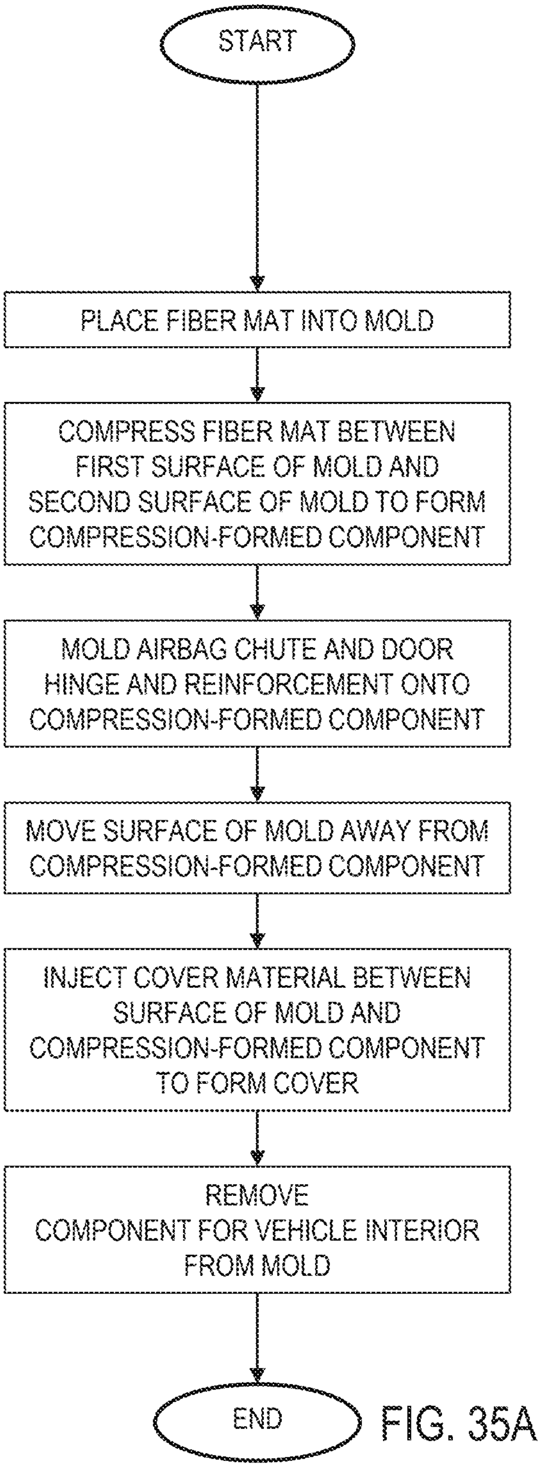
FIG. 35A is a schematic flow diagram of a process to manufacture a component for a vehicle interior according to an exemplary embodiment.

According to an exemplary embodiment as shown schematically in FIG. 35A, a process to manufacture a component for a vehicle interior may comprise placing a fiber mat into a mold, compressing the fiber mat between a first surface of the mold and a second surface of the mold to form a compression-formed component, molding an airbag chute and a door hinge and a reinforcement onto the compression-formed component, moving a surface of the mold away from the compression-formed component, injecting cover material between the surface of the mold and the compression-formed component to form a cover, and removing the component for a vehicle interior from the mold.

Figure 35B:
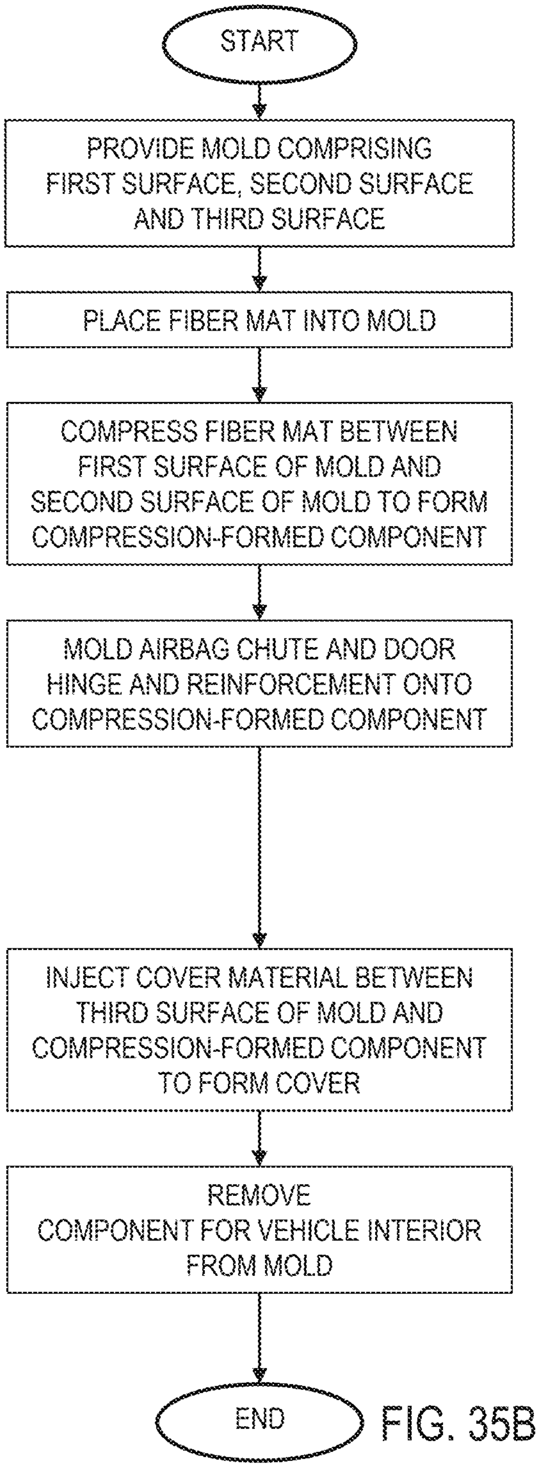
FIG. 35B is a schematic flow diagram of a process to manufacture a component for a vehicle interior according to an exemplary embodiment.

According to an exemplary embodiment as shown schematically in FIG. 35B, a process to manufacture a component for a vehicle interior may comprise providing a mold comprising a first surface, a second surface and a third surface, placing a fiber mat into the mold, compressing the fiber mat between the first surface of the mold and the second surface of the mold to form a compression-formed component, molding an airbag chute and a door hinge and a reinforcement onto the compression-formed component, injecting cover material between the third surface of the mold and the compression-formed component to form a cover, and removing the component for a vehicle interior from the mold.

TABLE A

REFERENCE SYMBOL LIST

| ELEMENT, PART OR COMPONENT | REFERENCE SYMBOL |
|---|---|
| Vehicle | V |
| Interior | I |
| Component | C |
| Door | DL |
| Instrument panel | IP |
| Steering wheel | SW |
| Composite structure | CS |
| Airbag Exit Area (component/panel) | ABX |
| Tear line/weakening line (seam) composite structure | TR |
| Airbag door | ABD |
| Airbag | AB |
| Cover | T |
| Exterior/Visible Surface (cover) | Tx |
| Structure/housing/chute (airbag chute) | CH |
| Feature (structure/housing) | FT |
| Flange | FL |
| Wall Structure | WS |
| Reinforcement | RT |
| Fiber Panel | FP |
| Feature | FT |
| Compression-formed component | CF |
| Substrate | SB |
| Resin | R |
| Reinforcement Area | RR |
| Interface | NT |
| Void | VD |
| Rib | RB |
| Fiber mat | FM |
| Oven | VN |
| Consolidated mat | CM |
| Mold top | MT |
| Mold bottom | MB |
| Recess | RS |
| Hinge/hinge area | HG |
| Interface | FC |
| Void | VD |
| Tab | TB |
| Thickness | t1 |
| Thickness | t2 |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to provide an opening for deployment of an airbag into the vehicle interior comprising:

a composite structure comprising a structural substrate configured to provide the opening for deployment of the airbag and a structure comprising a housing on the structural substrate configured for the airbag;

wherein the structural substrate is configured to provide a door for the opening in the composite structure during deployment of the airbag;

wherein the composite structure comprises a hinge area for the door and a reinforcement area for the hinge area;

wherein the reinforcement area is provided at an interface of the structural substrate and the structure comprising the housing for the airbag;

wherein the reinforcement area is configured to reinforce the hinge area for the door;

wherein the structure comprising the housing for the airbag comprises a feature configured to provide the reinforcement area;

wherein the feature comprises a tether.

2. The component of claim 1 wherein the structural substrate comprises a fiber panel comprising fibers and resin material.

3. The component of claim 1 wherein the feature comprises a molded feature; wherein the molded feature comprises at least one of (a) a tab; (b) a flange; (c) a web; (d) a rib; (e) a resin feature.

4. The component of claim 1 wherein the structure comprising the housing for the airbag comprises a resin material; wherein the structural substrate comprises a resin material; wherein the structure is molded to the structural substrate.

5. The component of claim 1 wherein the composite structure comprises a cover; wherein the cover comprises an injection-molded cover.

6. The component of claim 1 wherein the structure for the airbag comprising a housing comprises an airbag chute.

7. The component of claim 6 wherein the housing comprises a wall structure configured to provide an enclosure for the airbag.

8. The component of claim 7 wherein the housing comprises an inner flange extending from the wall structure toward the enclosure and an outer flange extending from the wall structure away from the enclosure; wherein the inner flange is bonded to the structural substrate; wherein the outer flange is bonded to the structural substrate; wherein the wall structure and the inner flange and the outer flange are molded on the structural substrate.

9. The component of claim 6 made by a method comprising the steps of:

(a) forming the structural substrate;

(b) forming the housing configured to be coupled to the structural substrate; and (c) forming the reinforcement area comprising a reinforcement configured to reinforce the hinge area of the structural substrate during movement of the door during deployment of the airbag;

wherein the reinforcement is configured to secure the door to the structural substrate during deployment of the airbag;

wherein material of the structural substrate and material of the airbag chute intermingle during forming of the airbag chute.

10. The component of claim 9 wherein the step of forming the structural substrate comprises injection molding the structural substrate.

11. The component of claim 9 wherein the method further comprises the step of forming an indentation at the hinge area of the structural substrate configured to facilitate movement of the door during deployment of the airbag.

12. The component of claim 9 wherein the method further comprises the step of forming the structural substrate comprising compressing a first portion of a fiber mat in a mold to a first thickness and compressing a second portion of the fiber mat in the mold to a second thickness less than the first thickness adjacent the hinge area of the structural substrate.

13. The component of claim 9 wherein the method further comprises the step of molding a cover on the structural substrate by injection molding thermoplastic material.

14. The component of claim 1 wherein the structural substrate is configured to provide (1) the door upon deployment of the airbag to facilitate deployment of the airbag and (2) the hinge area for the door; wherein the reinforcement area is configured to retain the door to the composite structure.

15. The component of claim 1 wherein the tether comprises material of the structural substrate.

16. The component of claim 1 wherein the structural substrate comprises an indentation configured to facilitate rupture of the structural substrate to form the door upon deployment of the airbag to facilitate deployment of the airbag.

17. The component of claim 16 wherein the indentation is on an underside of the structural substrate.

18. The component of claim 1 further comprising a cover comprising an outer surface and an inner surface opposite the outer surface coupled to the structural substrate.

19. The component of claim 18 wherein the cover is configured to fit in an indentation of the structural substrate.

20. A component for a vehicle interior configured to provide an opening for deployment of an airbag into the vehicle interior comprising a composite structure comprising a structural substrate configured to provide the opening for deployment of the airbag and a structure comprising a housing on the structural substrate configured for the airbag made by a process comprising the steps of:

(a) forming the structural substrate;

(b) forming the housing configured to be coupled to the structural substrate;

(c) forming a reinforcement area comprising a reinforcement configured to reinforce a hinge area of the structural substrate during movement of a door during deployment of the airbag;

wherein the structural substrate is configured to provide the door for the opening in the composite structure during deployment of the airbag;

wherein the composite structure comprises the hinge area for the door and the reinforcement area for the hinge area;

wherein the reinforcement area is provided at an interface of the structural substrate and the structure comprising the housing for the airbag;

wherein the reinforcement area is configured to reinforce the hinge area for the door;

wherein the structure comprising the housing for the airbag comprises a feature configured to provide the reinforcement area;

wherein the reinforcement is configured to secure the door to the structural substrate during deployment of the airbag;

wherein the housing comprises an airbag chute;

wherein material of the structural substrate and material of the airbag chute intermingle during forming of the airbag chute.

* * * * *